(12) United States Patent
Lidholm et al.

(10) Patent No.: US 12,539,330 B2
(45) Date of Patent: Feb. 3, 2026

(54) ALLERGEN

(71) Applicant: PHADIA AB, Uppsala (SE)

(72) Inventors: Jonas Lidholm, Knivsta (SE); Lars Mattsson, Uppsala (SE); Angelica Ehrenberg, Uppsala (SE); Håkan Larsson, Uppsala (SE); Jonas Östling, Uppsala (SE)

(73) Assignee: Phadia AB, Uppsala (SE)

( * ) Notice: Subject to any disclaimer, the term of this patent is extended or adjusted under 35 U.S.C. 154(b) by 1067 days.

(21) Appl. No.: 17/622,898

(22) PCT Filed: Jul. 2, 2020

(86) PCT No.: PCT/EP2020/068670
§ 371 (c)(1),
(2) Date: Dec. 27, 2021

(87) PCT Pub. No.: WO2021/004885
PCT Pub. Date: Jan. 14, 2021

(65) Prior Publication Data
US 2022/0241406 A1    Aug. 4, 2022

(30) Foreign Application Priority Data

Jul. 5, 2019 (SE) .................................. 1950853-0

(51) Int. Cl.
| | | |
|---|---|---|
| *A61K 39/35* | (2006.01) | |
| *C07K 14/415* | (2006.01) | |
| *G01N 33/68* | (2006.01) | |

(52) U.S. Cl.
CPC ............ *A61K 39/35* (2013.01); *C07K 14/415* (2013.01); *G01N 33/6893* (2013.01); *G01N 2800/24* (2013.01)

(58) Field of Classification Search
None
See application file for complete search history.

(56) References Cited

U.S. PATENT DOCUMENTS

2013/0149670 A1    6/2013    Francois

FOREIGN PATENT DOCUMENTS

| JP | 2001231580 A | 8/2001 |
|---|---|---|
| JP | 2006217896 A | 8/2006 |

(Continued)

OTHER PUBLICATIONS

Charpin, Denis et al., Cypress Pollinosis: from Tree to Clinic, Clinic Rev Allerg Immunol, vol. 56, No. 2, pp. 174-195 (Apr. 11, 2017).

(Continued)

*Primary Examiner* — Karl J Puttlitz
(74) *Attorney, Agent, or Firm* — BakerHostetler

(57) ABSTRACT

The present invention relates to the field of allergens and more specifically to a novel isolated allergen from the species Cupressaceae shown to be a primary sensitizer for severe peach allergy mediated by the protein Pru p7. The allergen is homologous with Pru P7 in peach, a protein belonging to the Gibberelin Regulating Proteins (GRPs). The novel allergen also 5 shares high sequence homology among other species from the Cupressaceae family and there is therefore also provided additional novel allergens in two other species of the Cupressaceae family. The novel allergens find use in the in vitro diagnosis of, treatment and/or prevention of Type 1 Cupressaceace pollen allergy and Cupressaceace pollen-associated food allergies.

15 Claims, 22 Drawing Sheets
Specification includes a Sequence Listing.

(56) References Cited

FOREIGN PATENT DOCUMENTS

| JP | 2013527846 A | 7/2013 | |
|---|---|---|---|
| JP | 2017079742 A | 5/2017 | |
| WO | WO-2022152803 A1 * | 7/2022 | ............... A61P 37/08 |

OTHER PUBLICATIONS

Ehrenberg, Angelica E. et al., Characterization of a 7 kDa pollen allergen belonging to the gibberellin-regulated protein family from three *Cupressaceae* species, Clin Exp Allergy, vol. 50, No. 8, pp. 964-972 (Jun. 25, 2020).
Inomata, Naoko, Gibberellin-regulated protein allergy: Clinical features and cross-reactivity, Allergology International, vol. 69, No. 1, pp. 11-18 (Jan. 1, 2020).
Search Report from corresponding Swedish Application No. 1950853.0 dated Jul. 5, 2019.
Klingebiel, Caroline et al., Pru p 7 sensitization is a predominant cause of severe, cypress pollen-associated peach allergy, Clin Exp Allergy, vol. 49, No. 4, pp. 1-11 (Feb. 19, 2019).
Sénéchal, Héléne et al., A new allergen family involved in pollen food-associated syndrom: Snakin/gibberrellin-regulated proteins, J Allergy Clin Immunol, vol. 141, No. 1, pp. 411-414 (Aug. 4, 2017).
Sénéchal, H. et al., Gibberellin-regulated proteins and the enigma of the "missing link", Revue Française d'Allergologie, vol. 58, No. 1, pp. 66-67 (Feb. 2018), with English Translation.
Sénéchal, Héléne et al., Pollen/Fruit Syndrome: Clinical Relevance of the Cypress Pollen Allergenic Gibberellin- Regulated Protein, Allergy Asthma Immunol Res., vol. 11, No. 1, pp. 143-151 (Jan. 2019).
Sénéchal, H. et al., BP14, an allergen from Cupressus sempervirens pollen related to the family of snakin/gibberellin-regulated proteins, p. 1, EAACI Helsinki (2017).
International Search Report for PCT/EP2020/068670 dated Sep. 23, 2020.
Sequence, Cryptomeria japonica cDNA clone: CMFL012_D01, 3' end sequence, Database accession No. BY900480, p. 1 (2008).
Shahali, Y. et al., Complementarity between Microarray and Immunoblot for the Comparative Evaluation of IgE Repertoire of French and Italian Cypress Pollen Allergic Patients, Folia Biologica (Praha), vol. 60, pp. 192-201 (2014).
Tuppo, Lisa et al., Isolation of cypress gibberellin-regulated protein: Analysis of its structural features and IgE binding competition with homologous allergens, Molecular Immunology, vol. 114, pp. 189-195 (Jul. 31, 2019).
Futamura, Norihiro et al., Characterization of expressed sequence tags from a full-length enriched cDNA library of Cryptomeria japonica male strobili, BMC Genomics, vol. 9, No. 383, pp. 1-14 (Aug. 11, 2008).
Pablos et al.; "Pollen Allergens for Molecular Diagnosis"; Current Allergy Asthma Rep; vol. 16; 2016; 12 pages.
Valenta et al.; "Recombinant allergens for immunotherapy"; Journal of Allergy and Clinical Immunology; vol. 19 No. 4; Apr. 2007; p. 826-830.
Shahali et al.; "Differential IgE sensitization to cypress pollen associated to a basic allergen of 14kDa"; The FEBS Journal; vol. 279; 2012; p. 1445-1455.
Alessandri et al.; "Diagnosing allergic sensitizations in the third millennium: why clinicians should know allergen molecule structures"; Clinical and Translational Allergy; vol. 7; 2017; 9 pages.
Matricardi et al.; "EAACI Molecular Allergology User's Guide"; EAACI Molecular Allergology User's Guide; vol. 27 (Suppl. 23); 2016; 250 pages.
C. Akdis; "Allergy and hypersensitivity: Mechanism of allergic disease"; Current Opinion in Immunology; vol. 18; Dec. 2006; p. 718-726.
Wainstein et al.; "Combining skin prick, immediate skin application and specific-IgE testing in the diagnosis of peanut allergy in children"; Pediatric Allergy and Immunology; vol. 18; May 2007; p. 231-239.

Valenta et al.; "The recombinant allergen-based concept of component-resolved diagnostics and immunotherapy (CRD and CRIT)"; Clinical & Experimental Allergy; vol. 29; Jul. 1999; p. 896-904.
Asarnoj et al.; "IgE to peanut allergen components: relation to peanut symptoms and pollen sensitization in 8-year-olds"; Allergy; vol. 65; 2010; p. 1189-1195.
Asarnoj et al.; "Peanut component Ara h 8 sensitization and tolerance to peanut"; Journal of Allergy and Clinical Immunology; vol. 130; Aug. 2012; p. 468-472.
Matsuo et al.; "Sensitivity and specificity of recombinant x-5 gliadin-specific IgE measurement for the diagnosis of wheat-dependent exercise-induced anaphylaxis"; Allergy; vol. 63; 2008; p. 233-236.
Nicolaou et al.; "Allergy or tolerance in children sensitized to peanut: Prevalence and differentiation using component-resolved diagnostics"; Journal of Allergy and Clinical Immunology; vol. 125; Jan. 2010; p. 191-197.
Codreanu et al.; "A Novel Immunoassay Using Recombinant Allergens Simplifies Peanut Allergy Diagnosis"; Int'l Archives of Allergy and Immunology; vol. 154; 2011; p. 216-226.
Ebisawa et al.; "Measurement of Ara h 1-, 2-, and 3-specific IgE antibodies is useful in diagnosis of peanut allergy in Japanese children"; Pediatric Allergy and Immunology; vol. 23; 2012; p. 573-581.
Masthoff et al.; "Sensitization to Cor a 9 and Cor a 14 is highly specific for a hazelnut allergy with objective symptoms in Dutch children and adults"; Journal of Allergy and Clinical Immunology; vol. 132; Aug. 2013; p. 393-399.
Savvatianos et al.; "Sensitization to cashew nut 2S albumin, Ana o 3, is highly predictive of cashew and pistachio allergy in Greek children"; Journal of Allergy and Clinical Immunology; vol. 136; Jul. 2015; p. 192-194.
Lange et al.; "Ana o 3-specific IgE is a good predictor for clinically relevant cashew allergy in children"; Allergy; vol. 72; Apr. 2017; p. 598-603.
Stumvoll et al.; "Identification of cross-reactive and genuine Parietaria judaica pollen allergens"; Journal of Allergy and Clinical Immunology; vol. 111; May 2003; p. 974-979.
Jutel et al.; "Allergen-specific immunotherapy with recombinant grass pollen allergens"; Journal of Allergy and Clinical Immunology; vol. 116; Sep. 2005; p. 608-613.
Cromwell et al.; "Strategies for Recombinant Allergen Vaccines and Fruitful Results from First Clinical Studies"; Immunology & Allergy Clinics North America; vol. 26; May 2006; p. 261-281.
Nony et al.; "Development and evaluation of a sublingual tablet based on recombinant Bet v 1 in birch pollen-allergic patients"; Allergy; vol. 70; Jul. 2015; p. 795-804.
Gronlund et al.; "The Major Cat Allergen, Fel d 1, in Diagnosis and Therapy"; Int'l Arch Allergy Immunology; vol. 151; 2010; p. 265-274.
Akdis et al.; "Mechanisms of allergen-specific immunotherapy"; Journal of Allergy and Clinical Immunology; vol. 119; 2007; p. 780-789.
Uermosi et al.; "Mechanisms of allergen-specific desensitization"; Journal of Allergy and Clinical Immunology; Journal of Allergy and Clinical Immunology; vol. 126; Aug. 2010; p. 375-383.
Uermosi et al.; "IgG-mediated down-regulation of IgE bound to mast cells: a potential novel mechanism of allergen-specific desensitization"; Allergy; vol. 69; Mar. 2014; p. 338-347.
Asam et al.; "Tree pollen allergens—an update from a molecular perspective"; Allergy; vol. 70; Oct. 2015; p. 1201-1211.
Scala et al.; "Cross-sectional survey on immunoglobulin E reactivity in 23 077 subjects using an allergenic molecule-based microarray detection system"; Clinical & Experimental Allergy; vol. 40; 2010; p. 911-921.
Aceituno et al.; "Molecular cloning of major allergen from Cupressus arizonica pollen: Cup a 1"; Clinical & Experimental Allergy; vol. 30; Dec. 2000; p. 1750-1758.
Cortegano et al.; "Cloning and expression of a major allergen from Cupressus arizonica pollen, Cup a 3, a PR-5 protein expressed under polluted environment"; Allergy; vol. 59; May 2004; p. 485-490.

(56) References Cited

OTHER PUBLICATIONS

Pico de Coana et al.; "Molecular cloning and characterization of Cup a 4, a new allergen from Cupressus arizonica"; Biochemical and Biophysical Research Communications; vol. 401; 2010; p. 451-457.

Mattsson et al.; "Molecular and immunological characterization of Can f 4: a dog dander allergen cross-reactive with a 23 kDa odorant-binding protein in cow dander"; Clinical & Experimental Allergy; vol. 40; Aug. 2010; p. 1276-1287.

Rashid et al.; "Pollen-food syndrome is related to Bet v 1/PR-10 protein sensitisation, but not all patients have spring rhinitis"; Allergy; vol. 66; Oct. 2011; p. 1391-1392.

Worm et al.; "Food allergies resulting from immunological cross-reactivity with inhalant allergens—Guidelines from the German Society for Allergology and Clinical Immunology (DGAKI), the German Dermatology Society (DDG), the Association of German Allergologists (AeDA) and the Society for Pediatric Allergology and Environmental Medicine (GPA)"; Allergo Journal Int'l; vol. 23; 2014; 16 pages.

Rosace et al.; "Profilin-mediated food-induced allergic reactions are associated with oral epithelial remodeling"; Journal of Allergy and Clinical Immunology; vol. 143; Feb. 2019; p. 681-690.

Hugues et al.; "Cross-reactivity between cypress pollen and peach: a report of seven cases"; Allergy; vol. 61; Oct. 2006; p. 1241-1243.

Tuppo et al.; "Peamaclein—A new peach allergenic protein: similarities, differences and misleading features compared to Pru p 3"; Clinical & Experimental Allergy; vol. 43; 2013; p. 128-140.

Inomata et al.; "Identification of peamaclein as a marker allergen related to systemic reactions in peach allergy"; Annals of Allergy, Asthma & Immunology; vol. 112; Feb. 2014; p. 175-177.

Altschul et al.; "Basic local alignment search tool"; Journal of Molecular Biology; vol. 215; 1990; p. 403-410.

Altschul et al.; "Gapped BLAST and PSI-BLAST: a new generation of protein database search programs"; Nucleic Acids Research; vol. 25 No. 17; 1997; p. 3389-3402.

Marknell et al.; "Molecular and immunological characterization of a novel timothy grass (*Phleum pratense*) pollen allergen, Phl p 11"; Clinical & Experimental Allergy; vol. 32; Sep. 2022; p. 1329-1340.

Mattsson et al.; "Prostatic kallikrein: A new major dog allergen"; Journal of Allergy and Clinical Immunology; vol. 123 No. 2; 2009; p. 362-368.

Johnson et al.; "An extended IUPAC nomenclature code for polymorphic nucleic acids"; Bioinformatics; vol. 26 No. 10; 2010; p. 1386-1389.

Madeira et al.; "The EMBL-EBI search and sequence analysis tools APIs in 2019"; Nucleic Acids Research; vol. 47; Apr. 2019; p. W636-W641.

Kelley et al.; "The Phyre2 web portal for protein modelling, prediction and analysis"; Nature Protocols; vol. 10; Jun. 2015; p. 845-858.

Scheurer et al.; "Cross-reactivity within the profilin panallergen family investigated by comparision of recombinant profilins from pear (Pyr c 4), cherry (Pru av 4) and celery (Api g 4) with birch pollen profilin Bet v 2"; Journal of Chromatography B: Biomedical Sciences and Applications; vol. 756; May 2001; p. 315-325.

Villalta et al.; "Sensitization to the Pollen Pan-Allergen Profi lin. Is the Detection of Immunoglobulin E to Multiple Homologous Proteins From Different Sources Clinically Useful?"; Journal of Investig Allergol Clin Immunol; vol. 20; 2010; p. 591-595.

Xiao et al.; "Distinguishing between Leucine and Isoleucine by Integrated LC-MS Analysis Using an Orbitrap Fusion Mass Spectrometer"; Analytical Chemistry; vol. 88; 2016; p. 10757-10766.

* cited by examiner

Fig 11a

```
BY878079 Cryptomeria japonica male strobilus
GCCAGTTGTATGTTTTCAATTTTGAAGTTGAAGCATAGTTTGGATGCCAATGGACTGCTT    60
TCACCCTCGTTATCCCATCTTTGTATTCCTCACCCTGCTGATCATAGTGCAGGCTTGGAA   120
AGTATCCACACATGCAGTCGAGGATGATGTGAAGTATGTAGAGCCTCAGATTGATGTGGG   180
TGAAAACAGTTATAGAGGAGTGAAGGCTCAGATCGACTGTGATAAGGAGTGCAAGAGGAG   240
ATGCTCCAAGGCTTCATTGCATGATAGGTGTCTCAAGTACTGTGGAATATGCTGTGAGAA   300
ATGAAACTGTGTTCCACCGGGTACATCTGGCAACGAAGATGTGTGCCCTTGCTATGCCAA   360
TTTGAAAAACTCTAAGGGTGGACACAAATGCCCTTAGCACATACTCATACGCATATAATA   420
ATCCCCATTGCTTCCTCAGAATAATGGATTATGTGTTATGTTACAAAGAAATGCTATAAT   480
CCCCATTCTTTCCTTGAGAATGGATTATATACTATTGAATTTAT                   524
```

Fig 11b

```
ORF     MPMDCFHPRYPIFVFLTLLIIVQAWKVSTHAVEDDVKYVEPQIDVGENSYRGVKAQIDCD   60
Pep 1                                                               AQIDCD

ORF     KECKRRCSKASLHDRCLKYCGICCEK*NCVPPGTSGNEDVCPCYANLKNSKGGHKCP*   117
Pep 1   K
Pep 2       CSKASLHDRCLKY
Pep 3                                   GNEDVCPCYANLK
Pep 4                                              ANLKNSKGGHKCP
```

Fig 11c

```
                          L                               H
Cup s GRP   AQIDCDKECNRRCSKASAHDRCLKYCGICCEKCHCVPPGTAGNEDVCPCYANLKNSKGGH   60
            KCP                                                          63
```

Fig 11d

```
Cup s GRPa  AQIDCDKECNRRCSKASAHDRCLKYCGICCEKCHCVPPGTAGNEDVCPCYANLKNSKGGH   60
            ....||.:..||||||...:|||||||||||||||.||.||:|.||||.:||||||..
Pru p 7     GSSFCDSKCGVRCSKAGYQERCLKYCGICCEKCHCVPSGTYGNKDECPCYRDLKNSKGNP   60

Cup s GRPa  KCP                                                          63
            |||
Pru p 7     KCP                                                          63
```

Fig 14a

```
Amended version of record BY878079
GCCAGTTGTATGTTTTCAATTTTGAAGTTGAAGCATAGTTTGGATGCCAATGGACTGCTT  60
TCACCCTCGTTATCCCATCTTTGTATTCCTCACCCTGCTGATCATAGTGCAGGCTTGGAA 120
AGTATCCACACATGCAGTCGAGGATGATGTGAAGTATGTAGAGCCTCAGATTGATGTGGG 180
TGAAAACAGTTATAGAGGAGTGAAGGCTCAGATCGACTGTGATAAGGAGTGCAAGAGGAG 240
ATGCTCCAAGGCTTCATTGCATGATAGGTGTCTCAAGTACTGTGGAATATGCTGTGAGAA 300
ATGYAACTGTGTTCCACCGGGTACATCTGGCAACGAAGATGTGTGCCCTTGCTATGCCAA 360
TTTGAAAAACTCTAAGGGTGGACACAAATGCCCTTAGCACATACTCATACGCATATAATA 420
ATCCCCATTGCTTCCTCAGAATAATGGATTATGTGTTATGTTACAAAGAAATGCTATAAT 480
CCCCATTCTTTCCTTGAGAATGGATTATATACTATTGAATTTAT                524
```

Fig 14b

```
ORF    MPMDCFHPRYPIFVFLTLLIIVQAWKVSTHAVEDDVKYVEPQIDVGENSYRGVKAQIDCD  60
Pep 1                                                              AQIDCD

ORF    KECKRRCSKASLHDRCLKYCGICCEKCNCVPPGTSGNEDVCPCYANLKNSKGGHKCP*  117
Pep 1  KE
Pep 2            DRCLKY
Pep 3                                      GNEDVCPCYANL
Pep 4                                                 ANLKNSKGGHKCP
```

Fig 14c

```
Jun a GRP    AQIDCDKECNRRCSKASAHDRCLKYCGICCKKCHCVPPGTAGNEDVCPCYANLKNSKGGH  60
             KCP                                                           63
```

Fig 14d

```
Jun a GRP    AQIDCDKECNRRCSKASAHDRCLKYCGICCKKCHCVPPGTAGNEDVCPCYANLKNSKGGH  60
             ....||.:|..|||||...:||||||||||:||||||.||.||:|.||||.:|||||..
Pru p 7      GSSFCDSKCGVRCSKAGYQERCLKYCGICCEKCHCVPSGTYGNKDECPCYRDLKNSKGNP  60

Jun a GRP    KCP                                                           63
             |||
Pru p 7      KCP                                                           63
```

Fig 15a

```
BY900480 Cryptomeria japonica male strobilus
GAAGCATAATTTGGATGCCAATGGCCTGCTTTCACCCTCATTCTTCCATGTTTGTATTCC   60
TCACCCTACTGCTCATAGTGCAGGCTTGGAAAGTATCCACACATGTAGTTGAGGATGATG  120
TGAAGTATGTAGAGCTGCAGACTGCTGTGGGTGACAAAAGTTACGGAGGGGTGAAAGCTC  180
ACATTGACTGTGATAAGGAATGCAATAGGAGATGCTCCAAGGCATCAGCTCATGATAGGT  240
GTCTCAAGTATTGTGGAATATGTTGTGAGAAATGTAACTGCGTTCCACCTGGTACATATG  300
GCAACGAAGATTCTTGCCCTTGCTATGCCAATTTGAAGAACTCCAAGGGTGGACACAAAT  360
GCCCTTAGCACATTGTCATACTGATACTATAATGCCCATTGCTTGGGCAAAATAATGGAT  420
TATGTTTCTAGATAGCAATGCTATAATCCCCATTCTTTCCCAGAGAATGGATGATATGTT  480
ATTGAATTTATCATGAATCTAAATTATAATTTTATT                         516
```

Fig 15b

```
ORF     MPMACFHPHSSMFVFLTLLLIVQAWKVSTHVVEDDVKYVELQTAVGDKSYGGVKAHIDCD   60
Pep 1                                                              AHIDCD

ORF     KECNRRCSKASAHDRCLKYCGICCEKCNCVPPGTYGNEDSCPCYANLKNSKGGHKCP*  117
Pep 1   KECNRRCSKASAHDRCLKY
Pep 2                      YCGICCEK
Pep 3                         CGICCEKCNCVPP
Pep 4                                  CNCVPPGTYGNEDSCPCYANL
Pep 5                                             GNEDSCPCYANLKNSKGGHKCP
```

Fig 15c

```
Cry j GRP    AHIDCDKECNRRCSKASAHDRCLKYCGICCEKCNCVPPGTYGNEDSCPCYANLKNSKGGH   60
             KCP                                                            63
```

Fig 15d

```
Cry j GRP    AHIDCDKECNRRCSKASAHDRCLKYCGICCEKCNCVPPGTYGNEDSCPCYANLKNSKGGH   60
             ....||.:|..|||||...:||||||||||||:|||.|||||:|.||||..:|||||..
Pru p 7      GSSFCDSKCGVRCSKAGYQERCLKYCGICCEKCHCVPSGTYGNKDECPCYRDLKNSKGNP   60

Cry j GRP    KCP                                                            63
             |||
Pru p 7      KCP                                                            63
```

Fig 16a

```
Cup s GRPa    AQIDCDKECNRRCSKASAHDRCLKYCGICCEKCHCVPPGTAGNEDVCPCYANLKNSKGGH  60
Cup s GRPb    AQIDCDKECNRRCSKASLHDRCLKYCGICCEKCHCVPPGTAGNEDVCPCYAHLKNSKGGH  60
Jun a GRP     AQIDCDKECNRRCSKASAHDRCLKYCGICCKKCHCVPPGTAGNEDVCPCYANLKNSKGGH  60
Cry j GRP     AHIDCDKECNRRCSKASAHDRCLKYCGICCEKCNCVPPGTYGNEDSCPCYANLKNSKGGH  60
              *:****************.************:**:****** **** *****:********

Cup s GRPa    KCP  63
Cup s GRPb    KCP  63
Jun a GRP     KCP  63
Cry j GRP     KCP  63
              ***
```

Fig 16b

|              | Cup s GRPa | Cup s GRPb | Jun a GRP | Cry j GRP |
|--------------|------------|------------|-----------|-----------|
| Cup s GRPa   | 100        |            |           |           |
| Cup s GRPb   | 97         | 100        |           |           |
| Jun a GRP    | 98         | 95         | 100       |           |
| Cry j GRP    | 94         | 90         | 92        | 100       |

Fig 16c

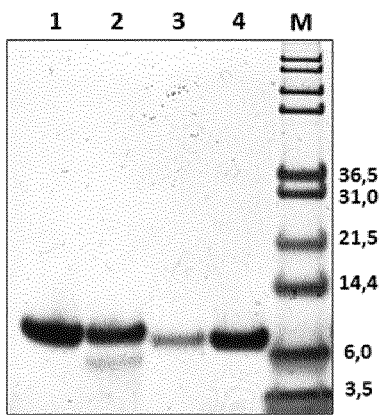

Fig 17

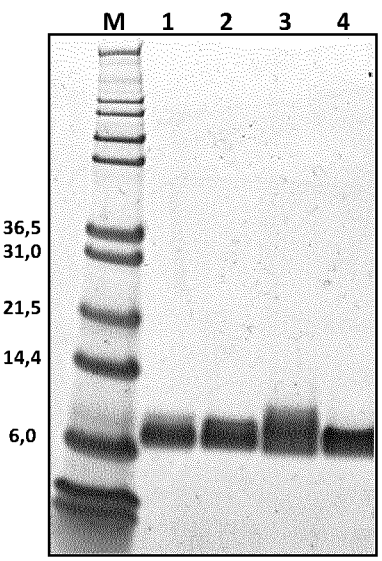

Fig 23b

|  | Bet v 2 | Cor a 2 | Mal d 4 | Pru av 4 | Pyr c 4 | Api g 4 | Dau c 4 | Phl p 12 |
|---|---|---|---|---|---|---|---|---|
| Bet v 2 | 100% | 77,6% | 78,4% | 76,1% | 82,7% | 79,9% | 80,6% | 79,1% |
| Cor a 2 |  | 100% | 76,3% | 77,9% | 82,4% | 80,6% | 79,9% | 77,1% |
| Mal d 4 |  |  | 100% | 93,1% | 83,2% | 78,4% | 78,4% | 76,3% |
| Pru av 4 |  |  |  | 100% | 85,5% | 76,9% | 76,9% | 74,0% |
| Pyr c 4 |  |  |  |  | 100% | 82,1% | 82,8% | 77,1% |
| Api g 4 |  |  |  |  |  | 100% | 91,0% | 76,1% |
| Dau c 4 |  |  |  |  |  |  | 100% | 76,1% |
| Phl p 12 |  |  |  |  |  |  |  | 100% |

Fig 24

| | Position | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| Cupressaceae pollen GRP consensus sequence | | A | X | I | D | C | D | K | E | C | N | R | R | C | S | K | A | S | X | H | D | R | C | L | K | Y | C | G | I | C | C |
| Cup s GRPa | Seq ID 4 | A | Q | I | D | C | D | K | E | C | N | R | R | C | S | K | A | S | A | H | D | R | C | L | K | Y | C | G | I | C | C |
| Cup s GRPb | Seq ID 5 | | | | | | | | | | | | | | | | | | L | | | | | | | | | | | | |
| Jun a GRP | Seq ID 6 | | | | | | | | | | | | | | | | | | | | | | | | | | | | | | |
| Cry j GRP | Seq ID 8 | | H | | | | | | | | | | | | | | | | | | | | | | | | | | | | |

| | Position | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|---|---|---|
| Cupressaceae pollen GRP consensus sequence | | X | K | C | X | C | V | P | P | G | T | X | G | N | E | D | X | C | P | C | Y | A | X | L | K | N | S | K | G | G | H | K | C | P |
| Cup s GRPa | Seq ID 4 | E | K | C | H | C | V | P | P | G | T | A | G | N | E | D | V | C | P | C | Y | A | N | L | K | N | S | K | G | G | H | K | C | P |
| Cup s GRPb | Seq ID 5 | | | | | | | | | | | | | | | | | | | | | | H | | | | | | | | | | | |
| Jun a GRP | Seq ID 6 | K | | | | | | | | | | | | | | | | | | | | | | | | | | | | | | | | |
| Cry j GRP | Seq ID 8 | | | | N | | | | | Y | | | | | | S | | | | | | | | | | | | | | | | | | |

Fig 25

```
ABK25287.1                MEIKKA-VHACILLVMLFGLLNLVVCSVEDEINGFSLGQPQTLHKDRHLLALNCGSACGK    59
PHT57516.1                ---MKL-SFATLVLGTIL-L----TSFFIQP----TI----AGSVGIVFLEAFCDSKCNF    43
XP_004252297.1            ---MKL-SFATLLLVTLF-L----TTFFIPA----TI----AGS-------DFCDSKCNV    36
PHT81083.1                ---MKL-SFATLLLVTLV-L----TSFFIPA----II----ADS-------DFCDSKCNV    36
XP_016554341.1            --MMKL-SFATLLLVTLV-L----TSFFIPH----II----ADS-------DFCDSKCNV    37
NP_181486.1               ---MKL-VVVQFFIISLL-L----TSSFSV-----LS----SAD-------SSCGGKCNV    35
XP_015935110.1            ---MKV-VLASVLLLCLL-L----SSSFLDV----SM----AGS-------DFCDSKCGE    36
XP_016163935.1            ---MKV-VLASVLLLCLL-L----SSSFLDV----SM----AGS-------DFCDSKCGE    36
XP_027356238.1            ---MKL-VFANALLVCLLL-----SSSMLQI----SM----AGS-------AFCDSKCGE    37
XP_007136735.1            --MMKL-VFANALLVCLI-L----SSSFLEI----SM----AGS-------GFCDSKCAR    37
XP_003525918.1            ---MKL-EFANVLLLCLV-L----SSSFLEI----SM----AGS-------PFCDSKCAQ    36
XP_006433597.1            ---MKL-ALVTFLLVSLV-V----TSTFFEV----SM----AGS-------DFCDSKCAV    36
XP_006472264.1            ---MKL-ALVTFLLVSLV-L----TSTFFEV----SM----AGS-------DFCDSKCAV    36
XP_018833823.1            ---MKP-VFASFLLVCLI-L----GSSFFEA----TE----AGS-------SFCDSKCAA    36
PON54241.1                ---MKL-VFVTFLLVCLV-L----SSTFFEA----SM----AGS-------EFCDSKCKV    36
XP_023904864.1            ---MKL-AFATFLLVCLV-L----SSSFFEA----TM----AGS-------SFCDSKCQV    36
XP_023904872.1            ---MKL-AFATFLLVCLV-L----SSSFFEA----TM----AGS-------SFCDSKCQV    36
XP_004501536.1            ---MKL-PFA-LLFLCLL-L----SSS-LD-----ISL---AGS-------TFCDTRCGE    34
GAV84534.1                ---MKP-VFAAFLIVFIV-L----TSTFFDV----TN----AGS-------PFCDSKCEV    36
XP_021661207.1            ---MKP-FFAILLLACIV-L----TSSFFEL----TV----AGS-------AFCDSKCKV    36
XP_006374850.1            ---MKP-VFAAIFLLCLV-F----SSSLFEV----TM----AAS-------GFCDSKCSV    36
PSS19450.1                ---MKL-VSASFLLVALI-I----SSCFLET----TM----SGS-------DFCDSKCAK    36
PWA82195.1                ---MKPFVVASMLMALLL-L----TSTLLQV----TL----AGS-------SFCDSKCAV    37
KZV35119.1                MGKMKV-ATLVL---VSL--VSSLLET--TFAQ----GGS-------PFCDSKCAV    38
XP_010688303.1            ---MKI-AFATLLVVTLV------VSTLVDS----TN----AGS-------DFCDSKCNV    35
XP_011069570.1            MDKMKS-RILVFAIVLIM-I----TSA---M----GD----DDS-------SFCDGKCSV    36
XP_008377985.1            ---MKL-VFATFMLVCLV-L----TSSFFEA----SM----AGS-------PFCDSKCGV    36
XP_008360977.1            ---MKL-VFATFMLVCLV-L----SSSFFEA----SM----AGS-------PFCDSKCGV    36
XP_024166695.1            ---MKL-VVATFMLVCLV-L----GSSVFET----TM----AGS-------PFCDSKCGV    36
ONI33472.1                ---MKL-GFATFLLVCLL-L----SSSVFEA----TM----A---------AFCDSKCGV    34
XP_021820299.1            ---MKL-GFATFLLVCLL-L----SSSVFEV----TM----AGS-------SFCDSKCGV    36
XP_007223838.1            ---MKL-GFATFLLVCLL-L----SSSVFEA----TM----AGS-------SFCDSKCGV    36
sp|P86888.1|PMLN_PRUPE    -----------------------------------------GS-------SFCDSKCGV    11
XP_010063765.1            MASAKTSILFVILCVVL--VHEVLVFGG-E-------------QLQAEAQTIDCKSKCNY    44
EFJ12900.1                ------------------------------------------MYPTPSLLIDCAAACDY    17
XP_024515710.1            MAKYQMLLLAIFIATLV--CLEIAAAGATEQLEQTEK-QGALVGSKNRSPYLNCAAACDY    57
XP_024542674.1            MAKYQMLLLAIFIATLV--CLEIAAAGATEQLEQTEK-QGALVGSKNRSPYLNCAAACDY    57
                                                                                *   *

ABK25287.1                RCALASVKDRCLKYCGICCSSCQCVPPGTYGNKNACPCYRDLKNAKGKPKCP    111
PHT57516.1                RCSKAGRKDRCLKYCGICCADCNCVPSGTFGNKDECPCYRDKKNSKGGPKCP     95
XP_004252297.1            RCSKAGRQDRCLKYCGICCEECHCLPSGTYGHKDECPCYRDKKNSKGGPKCP     88
PHT81083.1                RCSKASAHDRCLKYCGICCAECNCVPSGTFGNKDECPCYRDKKNSKGGPKCP     88
XP_016554341.1            RCSKASAHDRCLKYCGICCAECNCVPSGTFGNKDECPCYRDKKNSKGSPKCP     89
NP_181486.1               RCSKAGQHEECLKYCNICCQKCNCVPSGTFGHKDECPCYRDMKNSKGGSKCP     87
XP_015935110.1            RCAKAGVKDRCLKYCGICCQKCNCVPSGTYGNKDECPCYRDMKNSKGQGKCP     88
XP_016163935.1            RCAKAGVKDRCLKYCGICCQKCNCVPSGTYGNKDECPCYRDIKNSKGQGKCP     88
XP_027356238.1            RCAKAGVQDRCLKFCGICCEKCKCVPSGTYGNKHECPCYRDLKNSKGKDKCP     89
XP_007136735.1            RCAKAGVKDRCLKYCGICCEKCHCVPSGTYGNKDECPCYRDLKNSKGKGKCP     89
XP_003525918.1            RCAKAGVQDRCLRFCGICCEKCNCVPSGTYGNKDECPCYRDMKNSKGKDKCP     88
XP_006433597.1            RCSKAGREDRCLKYCGICCDKCHCVPSGTYGHKDECPCYRDLKNSKGKPKCP     88
XP_006472264.1            RCSKAGREDRCLKYCGICCDKCHCVPSGTYGHKDECPCYRDLKNSKGKPKCP     88
XP_018833823.1            RCAKAGVQDRCLKYCGICCEKCQCVPSGTYGNKHECPCYRDLKNSKGKSKCP     88
PON54241.1                RCSKAGMQDRCLKYCGICCDKCHCVPSGTYGHKDECPCYRDLKNSKGQSKCP     88
XP_023904864.1            RCSKAGIQDRCLKYCGVCCEKCQCVPSGTYGNKDECPCYRDLKNSKGKNKCP     88
XP_023904872.1            RCSKAGVQDRCLKYCGICCEKCHCVPSGTYGNKDECPCYRDLKNSKGKSKCP     88
XP_004501536.1            RCSKASFQDRCLKYCGICCEKCNCVPSGTYGNKDECPCYRDMKNSKGQGKCP     86
GAV84534.1                RCSKAGVHDRCLKYCGICCAKCHCVPSGTYGNHQCPCYMDLKNSKGKSKCP      88
XP_021661207.1            RCAKAGVKDRCLKYCGICCEKCKCVPSGTYGNKNECPCYRDMKNSKGKPKCP     88
XP_006374850.1            RCSKAGIKDRCLKYCGICCEKCKCVPSGTYGNKHECPCYRDMKNSKGKPKCP     88
PSS19450.1                RCSKAGRRDRCLKYCGICCEKCHCVPSGTFGNKDECPCYRDMKNSKGKPKCP     88
PWA82195.1                RCSKAGRQDRCLKYCGICCEECQCVPSGTYGNKDECPCYRDKKNSKGGSKCP     89
KZV35119.1                RCSKAHLQKRCLKYCGICCEKCNCVPSGTYGNKDECPCYRDLKNSKGGSKCP     90
XP_010688303.1            RCSKAGYQDRCLKYCGICCEACQCVPSGTYGNKDECPCYRDKKNSKGKPKCP     87
XP_011069570.1            RCSKAGRQDRCLKYCGICCEKCHCVPSGTYGNKDECPCYRDMKNSKGNPKCP     88
XP_008377985.1            RCSKAGFKNRCLRFCGICCEKCQCVPSGTYGNKDECPCYRDLKNSKGEDKCP     88
XP_008360977.1            RCSKAGYKERCLKYCGICCEKCHCVPSGTYGNKDECPCYRDLKNSKGEDKCP     88
XP_024166695.1            RCSKAGYMDRCLKYCGICCEKCNCVPSGTYGNKDECPCYRDLKNSKGNPKCP     88
ONI33472.1                RCSKAGYQERCLKYCGICCEKCHCVPSGTYGNKDECPCYRDLKNSKGNPKCP     86
XP_021820299.1            RCSKAGYKERCLKYCGICCEKCNCVPSGTYGNKDECPCYRDLKNSKGNPKCP     88
XP_007223838.1            RCSKAGYQERCLKYCGICCEKCHCVPSGTYGNKDECPCYRDLKNSKGNPKCP     88
sp|P86888.1|PMLN_PRUPE    RCSKAGYQERCLKYCGICCEKCHCVPSGTYGNKDECPCYRDLKNSKGNPKCP     63
XP_010063765.1            RCSKASRHKMCIRACNTCCKRCNCVPPGTSGNEDVCPCYANMTTHGGRHKCP     96
EFJ12900.1                RCSKAGLHKRCLKYCNICCGKCQCVPPGTAGNREVCPCYNEMKNSRGGHKCP     69
XP_024515710.1            RCSKAGLHKRCLKYCNICCGKCQCVPPGTAGNREVCPCYNEMKNSRGGHKCP    109
XP_024542674.1            RCSKAGLHKRCLKYCNICCGKCQCVPPGTAGNREVCACYNEMRNSRGGHKCP    109
                          **:  *    . *:: *_  ** *:*:* ** *:... *   * *  ***
```

Fig 26

| Position | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| SEQ ID NO: 9 | A | X | I | D | C | D | K | E | C | N | R | R | C | S | K | A | S | X | H | D | R | C | L | K | Y | C | G | I | C | C |
| A | Z |   | Z | Z |   |   | Z | Z |   | Z | Z |   |   |   |   |   |   | Z |   | Z | Z |   |   |   |   |   |   |   |   |   |
| B |   |   |   | D |   |   |   |   |   |   |   |   |   | S | K |   |   |   |   | R |   | L | K | Y |   | G | I |   |   |   |
| C |   |   |   |   | C |   |   |   | C |   | R | C |   |   |   | A |   |   |   |   |   |   | C |   |   | C |   | C | C |   |
| Pru p 7 | G | S | S | F | C | D | S | K | C | G | V | R | C | S | K | A | G | Y | Q | E | R | C | L | K | Y | C | G | I | C | C |
| SEQ ID NO: 52 | X | X | X | X | C | D | X | X | C | X | X | R | C | S | K | A | X | X | X | X | R | C | L | K | Y | C | G | I | C | C |

| Position | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|---|---|
| SEQ ID NO: 9 | X | K | C | X | C | V | P | P | G | T | X | G | N | E | D | X | C | P | C | Y | A | X | L | K | N | S | K | G | G | H | K | C | P |
| A |   |   |   |   |   |   |   |   |   |   |   |   |   | Z |   |   |   |   |   | Z |   |   |   |   |   |   |   |   |   | Z | Z |   |   |
| B |   | K |   |   |   | V |   | S |   |   |   |   | N |   | D |   |   | P |   |   |   |   | L | K | N | S | K |   |   |   |   |   |   |
| C |   |   | C |   | C |   | P |   | G | T |   | G |   |   |   |   | C |   | C | Y |   |   |   |   |   |   |   |   | G |   | K | C | P |
| Pru p 7 | E | K | C | H | C | V | P | S | G | T | Y | G | N | K | D | E | C | P | C | Y | R | D | L | K | N | S | K | G | N | P | K | C | P |
| SEQ ID NO: 52 | X | K | C | X | C | V | P | S | G | T | X | G | N | X | D | X | C | P | C | Y | X | X | L | K | N | S | K | G | X | X | K | C | P |

ALLERGEN

The Sequence Listing submitted herewith, entitled "Dec-27-2021-Sequence-Listing_ST25.txt", created Nov. 19, 2021 and having a size of 24,488 bytes, is incorporated herein by reference.

FIELD OF THE INVENTION

The present invention relates to the field of allergy. More specifically, the invention relates to the identification of a novel allergen from pollen of species belonging to the Cupressaceae family and to diagnosis and treatment of allergy to such pollen and to specifically related food allergies.

BACKGROUND OF THE INVENTION

Approximately 20% of the population in the industrialized world becomes hypersensitive (allergic) upon exposure to antigens from a variety of environmental biological substances or foods. Antigens that induce immediate and/or delayed types of hypersensitivity are primarily proteins or glycoproteins and referred to as allergens [1] which can be found in a variety of sources, such as pollens, dust mites, animal dander, insect venoms and foods of plant or animal origin. The fundamental immunological mechanism of allergic disease is the formation of allergen-specific immunoglobulin E (IgE) antibodies against such allergens, commonly referred to as sensitization. IgE antibodies bind to basophils, mast cells and dendritic cells via the specific high affinity IgE receptor, FcεRI. Upon exposure to an allergen, allergen-specific IgE antibodies on the cell surface become crosslinked through the recognition of at least two different epitopes of each allergen molecule, leading to the release of inflammatory mediators such as histamine and leukotrienes from these cells. As a result, tissue inflammation and physiological manifestations of allergy arise [2].

In clinical practice, a doctor's diagnosis of allergy is usually based on a compelling clinical history of hypersensitivity to an allergen in combination with evidence of sensitization to the same allergen. A diagnostic test procedure for allergen sensitization can either utilize an in vitro immunoassay for the detection of allergen-specific IgE antibodies in a patient's blood sample, or a skin prick test (SPT) performed by topical application of an allergen extract on the patient's skin [3]. In both modalities, an allergen reagent comprising a protein extract from an allergen source is traditionally used. While such a test may have a high sensitivity and thereby a high negative predictive value, sensitization to constituents in a natural allergen extract does not necessarily imply that clinical manifestations of allergy will occur. Such a dissociation between detectable sensitization and clinical allergy is in part due to the unequal significance of different allergenic proteins present in a natural extract. The fact that sensitization to certain proteins in an allergen source is more closely associated with clinical disease than others has opened an avenue towards the development of diagnostic tests with improved clinical utility by employing such specific proteins in a pure form for diagnostic testing. In vitro diagnostic testing for IgE antibodies to individual allergenic proteins is often referred to as component-resolved diagnostics (CRD) [4].

It is now widely recognised that CRD has several distinct advantages as compared to conventional IgE analysis using allergen extracts. One important feature of CRD is its ability to distinguish primary sensitisation to an allergen source from sensitisation due to cross-reactivity, where the former is characteristically associated with more severe symptoms and the latter with milder symptoms or clinical tolerance. In food allergy, primary sensitization is typically directed to abundant and often stable proteins. As a consequence, accidental intake of even a small amount of the food in question will bring about exposure to a significant dose of such a food protein and a high risk of a severe reaction in a sensitized individual. In contrast, food proteins homologous to and cross-reactive with pollen allergens are typically only present in small amounts and therefore rarely provoke severe symptoms [5, 6]. Analysis of IgE antibodies to relevant food allergen components has been shown to significantly increase the diagnostic value and clinical utility the testing, as exemplified by allergies to wheat, peanut, hazelnut and cashew [7-13]. By the use of CRD, patients at high risk of a severe and potentially life-threatening allergic reaction can be identified and instructed to strictly avoid any exposure to the food and to always carry an adrenaline autoinjector for emergency treatment while patients at no risk of such a severe reaction can be relieved from unjustified anxiety and benefit from an improved quality of life. Similarly, in respiratory allergy, the ability of CRD to distinguish between primary and cross-reactive sensitization can facilitate an optimal choice of allergen immunotherapy treatment (AIT), targeting the true cause of allergic symptoms rather than cross-reactive sensitizations of minor importance [14]

Another application of purified natural or recombinant allergen components is their use as spiking reagents to counteract an imbalance or shortage of the corresponding protein in a natural allergen extract. This may be particularly important in miniaturized or non-laboratory immunoassay, such as an allergen microarray or a doctor's office test where the combination of less favourable assay conditions, lower capacity for antibody-binding allergen reagent and natural allergen extract of limited potency, may cause insufficient diagnostic sensitivity.

In 2016, the European Academy of Allergy and Clinical Immunology (EAACI) launched "EAACI Molecular Allergology—a User's Guide" [1]. It has been a milestone in the recognition of the importance of testing allergic patients with allergen components for a more reliable diagnosis. By using this guide, allergists and other health care professionals can better understand cross-reactions and the level of risk associated with particular sensitization patterns and thereby provide more adequate management of the patient, including appropriate allergen avoidance strategies.

The most common treatment of allergy is pharmacological (e.g. antihistamine) which acts to temporarily alleviate symptoms but is not curative. Long-lasting and curative treatment of allergy can be achieved with allergen immunotherapy (AIT) which causes an immunological desensitization of the patient. The treatment comprises the administration of gradually increasing doses of an extract of the offending allergen, either subcutaneously or sublingually, from a very low level to a 100-1000 fold higher maintenance dose. This controlled and gradually increasing allergen exposure causes a specific activation of a protective immune response to the allergenic proteins which is sometimes referred to as a re-education of the immune system. A possible further development of the established forms of immunotherapy is the use of one or several purified allergenic proteins instead of a natural allergen extract. Such immunotherapy trials have been successfully performed for grass [15, 16] and birch [17] pollen allergy and it has also been suggested for treating allergy against pet animals [4, 18].

Although the disease-modifying mechanisms of AIT are not fully understood, it is well known that it induces an allergen-specific IgG response that mainly consists of the IgG4 subclass. These IgG antibodies may modulate the effect of IgE antibodies, either directly by blocking the allergen or indirectly by acting via Fc receptors [19-21]. Since the IgG antibody response is considered to be part of the mechanism of successful immunotherapy [20, 21], the analysis of allergen specific IgG may be a way to monitor relevant immunological effects of the treatment. In conclusion, the measurement of allergen-specific IgG levels may reflect natural or induced tolerance to the allergen through environmental exposure or immunotherapy treatment and may, in combination with IgE measurements, increase the clinical relevance of the diagnostic workup in allergy.

Pollen allergens are a major cause of respiratory allergy in industrialized countries and pollinosis has steadily been increasing during the past decades, in part possibly as a result of climate changes [22]. Pollinosis presents with a variety of symptoms such as seasonal rhinitis, conjunctivitis and asthma. Pollen grains are released from flowers of grasses, weeds or trees and are dispersed either by the wind or by insects. Most allergenic pollen from trees are windborne and produced by species belonging to the orders Fagales, Lamiales, Proteales and Pinales. Pinales are gymnosperms and characterised by having separate male and female flowers. The Pinales species relevant to allergy belong primarily to the Cupressaceae family and are predominantly found in relatively warm climates [23]. In Mediterranean areas, *Cupressus sempervirens* (Mediterranean or Italian cypress) is an important cause of winter pollinosis and the prevalence of sensitisation to cypress pollen has increased dramatically in the past few decades. In certain geographic areas, the sensitization rate may reach as high as 42% among atopic individuals [24, 25]. The Mediterranean cypress is closely related to Arizona cypress (*Cupressus arizonica*) and somewhat more distantly to Mountain cedar (*Juniperus ashei*, synonymous name *J. sabinoides*), Japanese cypress (*Chamaecyparis obtusa*) and Japanese cedar (*Cryptomeria japonica*), found in North America and Japan, respectively. The major allergen in these species, Cup s 1, Cup a 1, Jun a 1, Cha o 1 and Cry j 1, respectively, are sensitizing more than 90% of Cupressaceae pollen allergic patients. These allergens are all glycoproteins, have a molecular weight of 40-50 kDa and belong to the pectate lyase protein family. The allergens are highly cross-reactive and share 70%-95% sequence identity [26, 27]. The group 2 allergens (Cup s 2, Cup a 2, Jun a 2, Cha o 2 and Cry j 2) belong to the polygalacturonase family and exhibit 71%-97% sequence identity. The rate of sensitisation may be as high as 80% among Cupressaceae pollen allergic patients and they can thus also be considered major allergens [24]. Group 3 and group 4 Cupressaceae pollen allergens belong to the thaumatin-like protein family and polcalcin protein family, respectively, and have been described as minor allergens [27, 28]. Beyond these four groups, around 15 other allergenic proteins in Cupressaceae pollen have been reported.

Sensitisation to pollen is often associated with allergy to different plant foods due to cross-reactivity between homologous pollen and food proteins. Such cross-reactivity occurs as a consequence of structural similarity between homologous proteins present in pollen and plant-derived foods. The higher the level of amino acid sequence identity and three-dimensional structural similarity between such pairs of related proteins, the higher the probability and strength of cross-reactivity. Extensive cross-reactivity can be expected between proteins having a sequence identity to one another of 60% or higher but may occur between less closely related proteins [29].

Pollen-related food allergy is believed to be driven predominantly or entirely by pollen sensitization. It typically causes oral symptoms and is thus referred to as the oral allergy syndrome (OAS). The most well-known and widespread example of pollen-related food allergy is caused by birch pollen and involves the so-called PR-10 protein Bet v 1 and homologous proteins in a variety of fruits and vegetables [30]. Another example is profilin-mediated food allergy which can be driven by any pollen sensitization, it is less frequent and may cause allergy to food such as melon, banana and other fruits [31, 32].

In yet another example, several patient cases indicating an association between Cupressaceae pollen sensitization and peach allergy were reported [33]. In that investigation, a 45 kDa peach allergen was identified by immunoblot inhibition experiments as a possible cross-reactive culprit. More recently, a novel peach allergen named Pru p 7 or peamaclein was reported as a major allergen among peach allergic patients from southern Italy [34]. Pru p 7 is a 7 kDa, cystein-rich protein belonging to the gibberellin regulated protein (GRP) family which has also been reported as an important cause of fruit allergy in Japan [35]. A significant association between severe peach allergy characterized by Pru p 7 sensitization and Cupressaceae pollinosis has been observed in southern France [36]. By performing inhibition experiments, cypress pollen extract was found to outcompete IgE binding to Pru p 7, demonstrating the presence of a protein cross-reactive with Pru p 7 in cypress pollen. A 14 kDa protein from cypress pollen, referred to as BP14, has been reported to contain a peptide of 13 amino acid residues with sequence homology to potato protein snakin-1 [37], another member of the GRP family. This sequence stretch comprises a highly conserved GRP segment that is identical in GRPs from more than 40 plant species as evidenced by Blast searching using the 13-residue BP14 sequence, however not including any other available sequence from a Cupressaceae species. Hence, the reported BP14 peptide includes no sequence information characteristic and distinguishing of a Cupressaceae pollen GRP and therefore provides no guidance towards specific features of such proteins. So far no Cupressaceae pollen protein corresponding to Pru p 7 has been identified and characterized.

Accordingly, there is still a need in the art to identify further Cupressaceae pollen allergens, which can be used in the diagnosis, prognosis, treatment and/or prevention of Type 1 allergies, in particular allergens that display cross-reactivity with proteins in foods and may elicit sensitization causing food allergic reactions.

SUMMARY OF THE INVENTION

The above mentioned needs have now been met, or at least mitigated by the identification and provision herein of a novel isolated 7 kDa allergen of Cupressaceae pollen (herein also referred to as Cup s GRP). The allergen is homologous with Pru p 7 in peach, a 7 kDa basic cysteine-rich protein belonging to the family Gibberellin regulating proteins (GRPs), and was shown herein to be a likely primary sensitizer in severe peach allergy mediated by Pru p 7. The finding of such an allergen will meet a great need within the field of Type 1 allergy diagnosis and the identification of Cupressaceae pollen allergic individuals at risk of developing severe allergy to fruits and potentially other plant foods.

The herein identified allergen, Cup s GRP, shares high sequence homology with the corresponding pollen proteins in other species from the Cupressaceae family. Therefore, it is also described herein the identification of allergens, including Cup s GRP, in three species from the Cupressaceae family. The identified allergens from *Cupressus sempervirens, Cryptomeria japonica* and *Juniperus ashei* are herein named as Cups GRP, Cry j GRP and Jun a GRP, respectively. The three pollen GRP allergens are also alternatively named Cup s 7, Jun a 7 and Cry j 7.

We also present herein two protein isoforms of Cup s GRP, named Cup s GRPa and Cup s GRPb, respectively.

Accordingly, there is in a first aspect provided herein an isolated allergenic protein (i.e. the herein identified allergen(s)), said protein comprising an amino acid sequence according to SEQ ID NO:4 (i.e. Cup s GRPa), or a functionally equivalent protein fragment or variant thereof having a sequence identity to SEQ ID NO:4 of at least 85%. There is also provided herein an isolated allergenic protein or a functionally equivalent protein fragment or variant thereof having a sequence identity to SEQ ID NO:4 of at least 90%, such as at least 91%, 92%, 93%, 94%, 95%, 96%, 97%, 98% or 99%.

There is also provided herein an isolated allergenic protein comprising or consisting of an amino acid sequence according to any one of SEQ ID NO:4, SEQ ID NO:5, SEQ ID NO:6, or SEQ ID NO:8 (i.e. Cups GRPa, Cups GRPb, Jun a GRP, and Cry j GRP, respectively).

There is also provided herein an isolated allergenic protein or a functionally equivalent protein fragment or variant thereof having a sequence identity to any one of SEQ ID NO:4, SEQ ID NO:5, SEQ ID NO:6, or SEQ ID NO:8, respectively, of at least 90%, such as at least 91%, 92%, 93%, 94%, 95%, 96%, 97%, 98% or 99% sequence identity.

In a further aspect, there is provided isolated nucleic acid molecules encoding the respective isolated proteins presented herein. Such isolated nucleic acid molecules are represented by the sequence according to SEQ ID NO:10 presenting a degenerated DNA sequence for pollen GRP comprising synonym codons and variants according to IUPAC ambiguity codes.

In a further aspect there is provided an expression vector (also simply referred to herein as a vector) comprising an isolated nucleic acid molecule comprising an isolated nucleic acid sequence as disclosed elsewhere herein.

In yet a further aspect there is provided an isolated host cell comprising an expression vector described herein. Said host cell is used for expressing the protein of interest encoded by the expression vector.

In yet a further aspect there is provided a method for producing an allergen composition, said method comprising the step of adding an isolated protein, or fragment or variant thereof, as described herein, to a composition comprising an allergen extract and/or at least one purified allergen component.

In yet a further aspect there is provided an allergen composition obtainable by a method for producing an allergen composition as described herein, said allergen composition comprising an isolated protein, or fragment or variant thereof, as further defined elsewhere herein.

There is also provided an allergen composition comprising an isolated protein, or fragment or variant thereof, as described herein, and an allergen extract and/or at least one purified allergen component.

In yet a further aspect there is provided the use of an isolated protein, or fragment or variant thereof, as disclosed herein, for the in vitro diagnosis or assessment of Type 1 allergy.

In yet another aspect there is provided herein a method for an in vitro diagnosis or assessment of Type 1 allergy, said method comprising the steps of: contacting an immunoglobulin-containing body fluid sample from a subject suspected of having Type 1 allergy with an isolated protein, or fragment or variant thereof, as disclosed herein; and in said sample, determining the presence of antibodies specifically binding to said protein, fragment or variant, such as IgE antibodies, or functionally equivalent fragments thereof; wherein the presence of antibodies or functionally equivalent fragments thereof in said sample specifically binding to said protein, fragment or variant is indicative of a Type 1 allergy in said subject.

In yet another aspect, there is provided a kit of parts comprising an isolated protein, or a fragment or variant thereof, as disclosed herein, immobilized to a soluble or a solid support, said kit optionally further comprising a detection reagent and/or instructions for use.

In another aspect there is provided an isolated protein, or fragment or variant thereof, as disclosed herein, for use in the treatment or prevention of Type 1 allergy.

In yet another aspect, there is provided a pharmaceutical composition comprising an isolated protein, or fragment or variant thereof, as disclosed herein, and a pharmaceutically acceptable carrier and/or excipient.

In yet a further aspect, there is provided a method for the treatment or prevention of a Type 1 allergy, said method comprising administering a pharmaceutically effective amount of an isolated protein, or fragment or variant thereof, as provided herein, or an allergen composition, or a pharmaceutical composition, to a subject in need thereof.

BRIEF DESCRIPTION OF DRAWINGS

FIG. 11 illustrates the amino acid sequence determination of nCup s GRP by MS/MS. a) Nucleotide sequence of EST record BY878079 (a cDNA sequence from male strobilus of *Cryptomeria japonica*) representing the best database match with the MS/MS data obtained from the purified 7 kDa *Cupressus sempervirens* protein. The start codon (ATG) and stop codons (TGA and TAG) of an interrupted, hypothetical open reading frame are underlined. b) Alignment of four peptides (Pep 1-4), identified by the MS/MS analysis, with the amino acid sequence hypothetically encoded by BY878079. A predicted signal peptide is underlined and stop codons are represented by asterisks. c) Amino acid sequence of Cup s GRP determined by MS/MS, with amino acids deviating from the sequence hypothetically encoded by an amended version of BY878079 underlined and alternative amino acids identified at two polymorphic sites indicated above the sequence. d) Alignment of the amino acid sequences of Cup s GRP and Pru p 7. Vertical lines, colons and periods indicate identical, conserved and semiconserved positions, respectively.

FIG. 14 illustrates the amino acid sequence determination of nJun a GRP by MS/MS. a) Nucleotide sequence of an amended version of EST record BY878079, the best database match with the MS/MS data obtained from the purified 7 kDa *Juniperus ashei* protein. The start codon (ATG), corrected previous stop codon (TGY) and terminal stop codon (TAG) of a hypothetical open reading frame are underlined. b) Alignment of four peptides (Pep 1-4), identified by the MS/MS analysis, with the amino acid sequence hypothetically encoded by an amended version of BY878079. A predicted signal peptide is underlined and a stop codon is represented by an asterisk. c) Amino acid sequence of Jun a GRP determined by MS/MS, with amino acids deviating from the sequence hypothetically encoded by the amended BY878079 indicated by underlining. d) Alignment of the amino acid sequences of Jun a GRP and Pru p 7. Vertical lines, colons and periods indicate identical, conserved and semiconserved positions, respectively.

FIG. 15 illustrates the amino acid sequence determination of nCry j GRP by MS/MS. a) Nucleotide sequence of EST record BY900480 (a cDNA sequence from male strobilus of *Cryptomeria japonica*) representing the best database match with the MS/MS data obtained from the purified 7 kDa *Cryptomeria japonica* protein. The start (ATG) and stop (TAG) codons of a hypothetical open reading frame are underlined. b) Alignment of five peptides (Pep 1-5), identified by the MS/MS analysis, with the amino acid sequence hypothetically encoded by BY900480. A predicted signal peptide is underlined and a stop codon is represented by an asterisk. c) Amino acid sequence of Cry j GRP determined by MS/MS. d) Alignment of the amino acid sequences of Cry j GRP and Pru p 7. Vertical lines, colons and periods indicate identical, conserved and semiconserved positions, respectively.

FIG. 16 shows sequence and eletrophoretic comparisons of the Cupressaceae pollen-derived GRPs. a) Multialignment of Cup s GRPa, Cup s GRPb, Jun a GRP and Cry j GRP amino acid sequences. Positions with identical amino acids in all sequences are indicated by asterisks. b) Matrix comparison of the amino acid sequences shown above, showing percent sequence identity. c) SDS-PAGE of the three 7 kDa proteins purified from *C. sempervirens* (lane 1), *J. ashei* (lane 2) and *C. japonica* (lane 3) pollen and recombinant Pru p 7 (lane 4). Molecular weights of marker proteins (lane M) are indicated to the right.

FIG. 17 shows an SDS-PAGE analysis of rCup s GRPa (lane 1), rCup s GRPb (lane 2), purified native Cup s GRP (lane 3) and rPru p 7 (lane 4). Molecular weights of marker proteins (lane M) are indicated to the left.

FIG. 24 shows an alignment of Cup s GRPa, Cup s GRPb, Jun a GRP and Cry j GRP sequences and a Cupressaceae consensus sequence based on those four sequences. Only amino acids deviating from those of Cup s GRPa are shown in the sequences of Cup s GRPb, Jun a GRP and Cry j GRP. Amino acid positions that show variability are indicated by an X in the Cupressaceae pollen GRP consensus sequence (SEQ ID NO: 9) aligned on top of the other sequences.

FIG. 25 shows a multiple sequence alignment of 37 known GRP sequences. Asterisk indicates a phylogenetically conserved amino acid among all the compared sequences.

FIG. 26 shows a sequence alignment of the Cupressaceae pollen GRP consensus sequence, SEQ ID NO: 9, and Pru p 7. In row A, amino acid positions indicated with Z differ between Cupressaceae pollen GRP and Pru p 7. In row B, those amino acids are indicated that are conserved between Cupressaceae pollen and Pru p 7 but differ among the 37 sequences that were aligned as shown in FIG. 25. In row C, those amino acids are indicated that are conserved among all the 37 aligned sequences. SEQ ID NO: 52 is a consensus sequence among Cupressaceae pollen GRP sequences and Pru p 7 where X represents amino acids that are non-conserved in this comparison.

DETAILED DESCRIPTION OF THE INVENTION

Definitions

Figure 1:
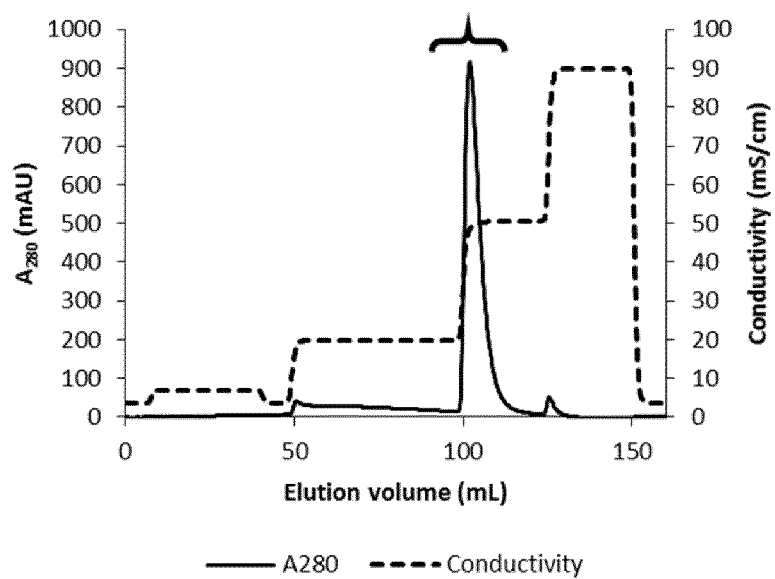
FIG. 1 shows the first purification step of native Pru p 7 by cation exchange chromatography. Absorbance at 280 nm ($A_{280}$) and conductivity are indicated by solid and hatched lines, respectively. Bracket indicates fractions pooled for further purification.

Details of the present invention are set forth below. Although any materials and methods similar or equivalent to those described herein can be used in the practice or testing of the present invention, the preferred materials and methods are now described. Other features, objects and advantages of the invention will be apparent from the description. In the description, the singular forms also include the plural unless the context clearly dictates otherwise. Unless defined otherwise, all technical and scientific terms used herein have the same meaning as commonly understood by one of ordinary skill in the art to which this invention belongs.

The terms "protein" and "peptide" should be construed to have their usual meaning in the art. The terms are used interchangeably herein, if not otherwise stated.

An "isolated" protein refers to a protein that has been isolated or removed from its natural environment. It also indicates that it has been produced through human intervention and has been substantially separated from the materials co-existing in a protein production environment.

Whenever an "isolated protein" or "protein" is referred to herein, this may also refer to a fragment or a variant of said isolated protein, having a sequence identity to the isolated protein as further explained herein, and being functionally equivalent to the original full length protein. "Functionally equivalent" is further defined elsewhere herein.

Herein, the terms "protein", "isolated protein", "allergenic protein", "fragment or variant thereof", "fragment or variant of an isolated allergenic protein", and "allergen" may be used interchangeably and are envisaged in all contexts and aspects of the present disclosure.

"Sequence identity" relates to the extent to which two (nucleotide or amino acid) sequences have the same residues at the same positions in an alignment, expressed as a percentage. "Alignment" in this regard relates to the process or result of matching up the nucleotide or amino acid residues of two or more biological sequences to achieve maximal levels of identity and, in the case of amino acid sequences, conservation, for the purpose of assessing the degree of similarity and the possibility of homology. The amino acid sequences of the respective isolated proteins as compared to the fragments or variants thereof, or the nucleic acid sequences encoding them may be used in an alignment in order to determine an "overall" sequence identity [38, 39].

The "length" of a protein is the number of amino acid residues in the protein.

Herein, a "fragment" of a protein should be construed as meaning a fragment having at least 85% sequence identity to the amino acid sequence of the original protein, as calculated over the entire length of the original protein. In other words, at least 85% of the amino acid residues of the full length original protein are present in a fragment according to the present disclosure. As disclosed herein, the original protein may have an amino acid sequence according to SEQ ID NO:4. Consequently, a "fragment" as disclosed herein may have at least 85% identity to the amino acid sequence of SEQ ID NO: 4, as calculated over the entire length of SEQ ID NO:4. Protein fragments may further comprise additional amino acids as a result of their production, such as a hexahistidine tag, linker sequences, or vector derived amino acids.

A "variant" of a protein relates to a variant having a sequence identity of at least 85% to the amino acid sequence of said original protein, as calculated over the entire length of the variant protein. The original protein may have an amino acid sequence according to SEQ ID NO: 4. Consequently, a "variant" as disclosed herein may have at least 85% identity to the amino acid sequence of SEQ ID NO: 4. A number of software tools for aligning an original and a variant protein and calculating sequence identity are commercially available, such as Clustal Omega provided by the European Bioinformatics Institute (Cambridge, United Kingdom). Protein variants may further comprise additional amino acids as a result of their production, such as a hexahistidine tag, linker sequences, or vector derived amino acids.

Herein, whenever referring to a "functionally equivalent protein fragment or variant" of a protein, or a "functionally equivalent fragment or variant" of a protein, this is intended to mean that the protein and a fragment or variant thereof have comparable IgE binding properties. More particularly, in order to be a functionally equivalent variant or fragment of an original, isolated allergenic protein:

(a) The variant or fragment inhibits the binding, by the original allergenic protein, of IgE antibodies from a serum sample of a representative patient sensitized to the original allergenic protein, by at least 50% as compared to a mock inhibition with buffer alone (IgE diluent, Thermo Fisher Scientific). This property of a variant or fragment can be assayed by using any suitable inhibition assay as known in the art, e.g. as described in Example 9.

(b) The variant or fragment binds IgE antibodies at substantially the same level as the original allergenic protein. Binding levels can be measured by immobilising the variant or fragment on a solid phase and measuring the IgE reactivity of individual sera, as is described for example in Example 8, and comparing the measured IgE reactivity to the IgE reactivity of the original isolated allergenic protein. For the purposes of this definition, "substantially the same level" should be construed as meaning that the binding level of the variant differs from the binding level of the original protein by at the most 25%, 20%, 15%, 10%, or 5%.

(c) The variant or fragment contains all conserved amino acids of the Cupressaceae GRP consensus sequence (i.e. SEQ ID NO:9; see FIG. 26 for conserved amino acids); and (d) (i) If it is a variant, the variant has a maximum of 9 amino acid residues exchanged as compared to SEQ ID NO:4, such as 9, 8, 7, 6, 5, 4, 3, 2, or 1 amino acid residue(s) exchanged compared to the SEQ ID NO:4, or (ii) If it is a fragment, the fragment has a maximum of 9 amino acid residues deleted compared to SEQ ID NO:4, such as 9, 8, 7, 6, 5, 4, 3, 2, or 1 amino acid residue(s) deleted compared to SEQ ID NO:4, or (iii) If it is a combined variant and fragment, the combined variant and fragment has a maximum of 9 amino acid residues exchanged or deleted compared to SEQ ID NO:4.

Examples 10 and 12 demonstrate that IgE binding of allergenic proteins, due to cross reactivity, is very similar among closely related allergenic proteins within the same protein family. Homologous proteins which have a sequence identity to each other of at least 80%, such as 90% or higher, show remarkably similar IgE reactivity.

An amino acid residue in a certain position of an amino acid sequence is "phylogenetically conserved", sometimes simply worded "conserved", among different proteins of the same protein family if the amino acid residue in said position is identical among the aligned protein sequences compared. It follows that an amino acid residue which is "non-conserved" among different proteins is not identical among the protein sequences compared. A non-conserved amino acid residue may be "phylogenetically restricted", or have "phylogenetically restricted variability", across the protein sequences compared, which is intended to mean that the amino acid in a particular position is selected from a group consisting of a restricted number of amino acids which are found in a phylogenetic comparison of a group of similar proteins, e.g. from the GRP protein family.

The term "vector" or "expression vector" relates to a DNA molecule used as a vehicle to artificially carry foreign genetic material into another cell, where it can be replicated and/or expressed.

A "host cell" relates to a bacterial, yeast, insect or mammalian cell which has been transformed by a vector as disclosed herein to express the protein, fragment or variant of interest.

A protein "isoform" is a member of a group of proteins with a high similarity and that originate from allelic variants of a single gene or non-identical members of a gene family and is a result of genetic differences. Many isoforms perform the same or similar biological functions.

Detailed Description

As previously mentioned herein, the present inventors have for the first time succeeded in identifying a Cupressaceae pollen protein corresponding to Pru p 7, believed to be a primary sensitizer for severe peach allergy mediated by Pru p 7 (see the results presented in Example 8). The isolation of highly pure Pru p 7 from a native source was a prerequisite for obtaining a truly specific anti-Pru p 7 rabbit antiserum. Since the Pru p 7 protein has similar biochemical properties as Pru p 3, as evidenced by the demonstration of Pru p 7 contamination in a commercially available preparation of Pru p 3 [34], an elaborate purification method was developed for this purpose, including biospecific affinity adsorption for removal Pru p 3 and a step of reversed phase chromatography (RPC) to remove other co-purifying proteins (see Example 1). The anti-Pru p 7 antiserum obtained by immunization of a rabbit with the highly purified natural Pru p 7 preparation could further be used to detect a Pru p 7 homologue in eluted fractions of *Cupressus sempervirens, Cryptomerica japonica* and *Juniperus ashei* pollen extracts. Contrary what might have been expected in consideration of the previously reported 14 kDa BP14 protein from *C. sempervirens* previously referred to herein, the rabbit anti-Pru p 7 IgG antibodies only detected a 7 kDa protein (i.e. a protein half the size of BP-14) in *C. sempervirens* pollen extract, as well as in pollen extracts of *Juniperus ashei* and *Cryptomeria japonica*. Once identified, these proteins could be purified to homogeneity for analysis by mass spectrometry and for biochemical and immunological characterization.

By combining N-terminal sequencing data, MS/MS data from different enzymatic digestions of each preparation and interrupted/incomplete EST sequences from *Cryptomeria japonica* in an iterative process, the complete amino acid sequence of a 7 kDa protein could be deduced/puzzled together from *Cupressus sempervirens* and *Juniperus ashei*. The complete sequence of the Pru p 7 homologue from *Cryptomeria japonica* was determined by analysing MS/MS data in an EST database. The immunological similarities between the three native Cupressaceae pollen allergens are proven and discussed in Example 10.

Another prerequisite for this project was the development of a methodology to produce practically useful amounts of correctly folded and immunoreactive recombinant GRP allergens. This involved exploration of different expression systems, vector cloning variants and fermentation strategies for production of rPru p 7 and rCup s GRP. While several initial attempts following different standard procedures generated protein products that were biochemically and immunologically defective, the methodology eventually elaborated was highly successful with respect both to quality and yield.

Based on the sequence of Cup s GRP established and disclosed herein, recombinant Cup s GRP was produced in *Pichia pastoris* and shown to have similar biochemical properties and IgE reactivity as the natural purified protein. The recombinant protein inhibited the IgE binding to Pru p 7, demonstrating that there is cross-reactivity between the peach protein Pru p 7 and Cup s GRP of which the latter may act as the primary sensitizer.

The identification of this protein and the subsequent recombinant production thereof, paves the way for new and improved diagnosis of Type 1 allergy. As a connection has been established between severe peach allergy and Cupressaceae pollinosis, the presently disclosed findings will find applications in the diagnosing, treatment and/or prevention of both pollen and food allergies.

As mentioned herein, throughout the years, there have been many attempts at identifying, isolating and characterizing allergenic proteins of the gibberellin-regulated protein family from pollen. Despite the inferred understanding of the importance of pollen allergens of this protein family, no one has until the present disclosure successfully managed to isolate and state the full sequence of such a protein. As mentioned herein, a fragment of sequence information has previously been reported but the full sequence, a prerequisite for understanding the structure of the protein and how it compared to other members of the same protein family, as well as for generating a recombinant protein for diagnostic and therapeutic applications, had not yet been revealed.

This lack of progress until now illustrates the difficulties in identifying and isolating proteins from this protein family from pollen. Notably, the inventors herein found a way to solve this problem. As an example, it required substantial inventive gist to identify a functional experimental protocol and a way to obtain and apply the findings obtained throughout the process of isolation and characterization resulting in the provision of the full details of the proteins described herein. However, finally, the allergenic proteins were isolated, evaluated and utilized as further shown and described herein.

Accordingly, there is provided herein an isolated allergenic protein comprising an amino acid sequence according to SEQ ID NO:4, or a functionally equivalent protein fragment or variant thereof having a sequence identity to SEQ ID NO:4 of at least 85%. Further, said sequence identity to SEQ ID NO:4 may be at least 90%, such as 90%, 91%, 92%, 93%, 94%, 95%, 96%, 97%, 98% or 99%.

The isolated protein is represented and exemplified herein by the highly homologous proteins Cup s GRP (protein isoform a (SEQ ID NO:4) and protein isoform b (SEQ ID NO:5)), Jun a GRP (SEQ ID NO:6) and Cry j GRP (SEQ ID NO:8).

```
The amino acid sequence of Pru p 7 (Pru p7) comprises the following sequence:
(nPru p 7)
                                                                SEQ ID NO: 1
GSSFCDSKCGVRCSKAGYQERCLKYCGICCEKCHCVPSGTYGNKDECPCYRDLKNSKGNP 60

KCP                                                             63

The amino acid sequence of Cup s GRPa comprises the following sequence:
(Cup s GRPa)
                                                                SEQ ID NO: 4
AQIDCDKECNRRCSKASAHDRCLKYCGICCEKCHCVPPGTAGNEDVCPCYANLKNSKGGH 60

KCP                                                             63

The amino acid sequence of Cup s GRPb comprises the following sequence:
(Cup s GRPb)
                                                                SEQ ID NO: 5
AQIDCDKECNRRCSKASLHDRCLKYCGICCEKCHCVPPGTAGNEDVCPCYAHLKNSKGGH 60

KCP                                                             63

The amino acid sequence of Jun a GRP comprises the following sequence:
(Jun a GRP)
                                                                SEQ ID NO: 6
AQIDCDKECNRRCSKASAHDRCLKYCGICCKKCHCVPPGTAGNEDVCPCYANLKNSKGGH 60

KCP                                                             63

The amino acid sequence of Cry j GRP comprises the following sequence:
(Cry j GRP)
                                                                SEQ ID NO: 8
AHIDCDKECNRRCSKASAHDRCLKYCGICCEKCNCVPPGTYGNEDSCPCYANLKNSKGGH 60

KCP                                                             63
```

As explained and shown in Example 13 below, a Cupressaceae—Pru p 7 GRP consensus sequence (SEQ ID NO:52) has been designed and is disclosed herein. In said consensus sequence according to SEQ ID NO:52, the positions in which amino acids vary among the different Cupressaceae pollen GRP disclosed herein (i.e. Cup s GRPa, Cup s GRPb, Jun a GRP, and Cry j GRP) as well as the positions in which amino acids vary between the Cupressaceae pollen GRP and the peach GRP disclosed herein (i.e. Pru p 7) are indicated by X (FIG. 26). In row A of FIG. 26, the positions in which amino acids vary between the Cupressaceae pollen GRP and the peach GRP disclosed herein (i.e. Pru p 7) are indicated by Z.

SEQ ID NO: 52:

| X | X | X | X | C | D | X | X | C | X | X | R | C | S | K |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |

| A | X | X | X | X | R | C | L | K | Y | C | G | I | C | C |
|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 |

| X | K | C | X | C | V | P | P | G | T | X | G | N | X | D |
|---|---|---|---|---|---|---|---|---|---|---|---|---|---|---|
| 31 | 32 | 33 | 34 | 35 | 36 | 37 | 38 | 39 | 40 | 41 | 42 | 43 | 44 | 45 |

| X | C | P | C | Y | X | X | L | K | N | S | K | G | X | X |
|---|---|---|---|---|---|---|---|---|---|---|---|---|---|---|
| 46 | 47 | 48 | 49 | 50 | 51 | 52 | 53 | 54 | 55 | 56 | 57 | 58 | 59 | 60 |

| K | C | P |
|---|---|---|
| 61 | 62 | 63 |

Accordingly, the present disclosure provides an isolated allergenic protein, wherein said protein comprises the following amino acid sequence according to SEQ ID NO:52:

| X | X | X | X | C | D | X | X | C | X | X | R | C | S | K |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |

| A | X | X | X | X | R | C | L | K | Y | C | G | I | C | C |
|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 |

| X | K | C | X | C | V | P | P | G | T | X | G | N | X | D |
|---|---|---|---|---|---|---|---|---|---|---|---|---|---|---|
| 31 | 32 | 33 | 34 | 35 | 36 | 37 | 38 | 39 | 40 | 41 | 42 | 43 | 44 | 45 |

| X | C | P | C | Y | X | X | L | K | N | S | K | G | X | X |
|---|---|---|---|---|---|---|---|---|---|---|---|---|---|---|
| 46 | 47 | 48 | 49 | 50 | 51 | 52 | 53 | 54 | 55 | 56 | 57 | 58 | 59 | 60 |

| K | C | P |
|---|---|---|
| 61 | 62 | 63 | wherein a maximum of 9, such as 9, 8, 7, 6, 5, 4, 3, 2, or 1, of positions X contain any amino acid as defined in Table 3, and wherein in the remaining positions X, the amino acids are identical to the amino acids in the corresponding positions of SEQ ID NO:4.

Particularly, the present disclosure provides an isolated allergenic protein, wherein said protein comprises the following amino acid sequence according to SEQ ID NO:52:

| X | X | X | X | C | D | X | X | C | X | X | R | C | S | K |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |

| A | X | X | X | X | R | C | L | K | Y | C | G | I | C | C |
|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 |

| X | K | C | X | C | V | P | P | G | T | X | G | N | X | D |
|---|---|---|---|---|---|---|---|---|---|---|---|---|---|---|
| 31 | 32 | 33 | 34 | 35 | 36 | 37 | 38 | 39 | 40 | 41 | 42 | 43 | 44 | 45 |

| X | C | P | C | Y | X | X | L | K | N | S | K | G | X | X |
|---|---|---|---|---|---|---|---|---|---|---|---|---|---|---|
| 46 | 47 | 48 | 49 | 50 | 51 | 52 | 53 | 54 | 55 | 56 | 57 | 58 | 59 | 60 |

| K | C | P |
|---|---|---|
| 61 | 62 | 63 | wherein a maximum of four of positions X contain any amino acid as defined in Table 3, and wherein in the remaining positions X, the amino acids are identical to the amino acids in the corresponding positions of SEQ ID NO:4.

It is to be noted that the amino acid residues listed in Table 3 are amino acid residues having phylogenetically restricted variability in positions X of SEQ ID NO:52.

Further provided are functionally equivalent protein fragments or variants of SEQ ID NO:5, 6, of 8, respectively, said fragments or variants having a sequence identity to SEQ ID NO:5, SEQ ID NO:6, or SEQ ID NO:8, of at least 85%, respectively. Further, said sequence identity to SEQ ID NO:5, 6 or 8, respectively, may be at least 90%, such as 90%, 91%, 92%, 93%, 94%, 95%, 96%, 97%, 98% or 99%.

The amino acid sequences of these exemplified isolated proteins from the Cupressaceae family differ from each other only in a maximum of seven amino acid positions as illustrated in SEQ ID NO:9. A sequence alignment illustrating the differences and similarities between the above-mentioned family members is shown in FIG. 24. It was proven in Example 10 herein that varying the amino acids residues at least in these positions did not affect the functionality of the proteins for their intended purpose. Accordingly, it is thereby illustrated a certain degree of structural flexibility in the amino acid sequence, meaning that functionally equivalent variants or fragments of an isolated protein illustrated by SEQ ID NO:4 are envisaged and proven useful in the context of the present disclosure. A definition of a functionally equivalent variant or fragment of an isolated protein according to SEQ ID NO:4 presented herein is described elsewhere herein.

Accordingly, there is also provided herein an isolated allergenic protein, wherein said protein comprises the following amino acid sequence according to SEQ ID NO:9:

| | | | | | | | | | | | | | | |
|---|---|---|---|---|---|---|---|---|---|---|---|---|---|---|
| A | X | I | D | C | D | K | E | C | N | R | R | C | S | K |
| 1 | 2 | 3 | 4 | 5 | 6 | 7 | 8 | 9 | 10 | 11 | 12 | 13 | 14 | 15 |
| A | S | X | H | D | R | C | L | K | Y | C | G | I | C | C |
| 16 | 17 | 18 | 19 | 20 | 21 | 22 | 23 | 24 | 25 | 26 | 27 | 28 | 29 | 30 |
| X | K | C | X | C | V | P | P | G | T | X | G | N | E | D |
| 31 | 32 | 33 | 34 | 35 | 36 | 37 | 38 | 39 | 40 | 41 | 42 | 43 | 44 | 45 |
| X | C | P | C | Y | A | X | L | K | N | S | K | G | G | H |
| 46 | 47 | 48 | 49 | 50 | 51 | 52 | 53 | 54 | 55 | 56 | 57 | 58 | 59 | 60 |
| K | C | P | | | | | | | | | | | | |
| 61 | 62 | 63 | | | | | | | | | | | | | wherein any position X contains any amino acid, with the proviso that X is not C.

Herein, where stating that (any of) the positions X in SEQ ID NO:9 or in SEQ ID NO:52 may contain "any amino acid", this expression is intended to mean any naturally or non-naturally occurring amino acid. In particular, it is disclosed herein that (any of) the positions X in SEQ ID NO:9 or in SEQ ID NO:52 may contain any naturally occurring amino acid.

SEQ ID NO:9 may be considered an example of a Cupressaceae pollen GRP consensus sequence representing the isolated proteins identified herein, wherein in said maximum of seven amino acid positions (positions 2, 18, 31, 34, 41, 46 and 52), the amino acid residues may be varied, i.e. exchanged, in one or more positions, for any other amino acid, with the proviso that X is not C, and provided that such a protein maintains an activity that is functionally equivalent to the original protein with regard to its intended purposes as described elsewhere herein. It is also envisaged herein other variants of SEQ ID NO:4 with the same sequence similarity but wherein additional or alternative amino acid residues are varied and wherein said variants maintain the same functional activity as the original protein, i.e. said variants being functionally equivalent to the original protein, or a protein where the amino acids at the above mentioned seven positions have been varied as further described herein. There is also provided herein a functionally equivalent fragment of an isolated protein according to SEQ ID NO:9.

It is envisaged that in said seven amino acid positions X, the amino acid is selected from a group consisting of phylogenetically restricted amino acids, as demonstrated in Example 13.

According to FIG. 25, the following amino acids are phylogenetically preferred in each position X of SEQ ID NO:9:

Pos 2:
AESDTLY

Pos 18:
YLIVFMR

Pos 31:
EDQAGSK

Pos 34:
QNHK

Pos 41:
YFAS

Pos 46:
EVAQ

Pos 52:
DEN

All of the above-disclosed preferred amino acid residues in the positions X have phylogenetically restricted variability with respect to each other, and are in accordance with those found in the previously known GRP sequences aligned in FIG. 25.

Furthermore, in accordance with the sequences of the Cupressaceae pollen GRP proteins, the following amino acids are phylogenetically preferred in each position X of SEQ ID NO:9:
X in position 2 is Q or H;
X in position 18 is A or L;
X in position 31 is K or E;
X in position 34 is H or N;
X in position 41 is A or Y;
X in position 46 is V or S; and/or
X in position 52 is H or N.

Said above-disclosed amino acid residues have phylogenetically restricted variability and are in accordance with those found in Cupressaceae pollen GRP, i.e. Cup s GRPa, Cup s GRPb, Jun a GRP and Cry j GRP as shown in the alignment in FIG. 24.

Accordingly, herein is provided an isolated allergenic protein, comprising an amino acid sequence according to SEQ ID NO:9, wherein a maximum of 6, such as 5, 4, 3, 2, or 1, of said positions X of SEQ ID NO:9 contain any amino acid, with the proviso that X is not C;
and wherein in the remaining position(s) X, the amino acids are selected from the following groups of amino acids:
X in position 2 is selected from any one of Q, H, A, E, S, D, T, L, or Y;
X in position 18 is selected from any one of A, L, Y, I, V, F, M, or R;
X in position 31 is selected from any one of K, E, D, Q, A, G, or S;
X in position 34 is selected from any one of H, N, Q or K;
X in position 41 is selected from any one of A, Y, F or S;
X in position 46 is selected from any one of V, S, E, V, A, or Q; and/or
X in position 52 is selected from any one of H, N, D, or E.

Particularly, herein is provided an isolated allergenic protein, comprising an amino acid sequence according to SEQ ID NO:9, wherein a maximum of 4, such as 3, 2, or 1, of said positions X of SEQ ID NO:9 contain any amino acid, with the proviso that X is not C;
and wherein in the remaining position(s) X, the amino acids are selected from the following groups of amino acids:
X in position 2 is selected from any one of Q, H, A, E, S, D, T, L, or Y;
X in position 18 is selected from any one of A, L, Y, I, V, F, M, or R;
X in position 31 is selected from any one of K, E, D, Q, A, G, or S;
X in position 34 is selected from any one of H, N, Q or K;
X in position 41 is selected from any one of A, Y, F or S;
X in position 46 is selected from any one of V, S, E, V, A, or Q; and/or
X in position 52 is selected from any one of H, N, D, or E.

Also provided herein is an isolated allergenic protein comprising an amino acid sequence according to SEQ ID NO:9, wherein a maximum of 6, such as 5, 4, 3, 2, or 1, of said positions X of SEQ ID NO:9 contain any amino acid, with the proviso that X is not C;
and wherein in said remaining positions X, said amino acids are selected from the following groups of amino acids:
X in position 2 is selected from any one of Q or H;
X in position 18 is selected from any one of A or L;
X in position 31 is selected from any one of K or E;
X in position 34 is selected from any one of H or N;
X in position 41 is selected from any one of A or Y;
X in position 46 is selected from any one of V or S; and
X in position 52 is selected from any one of H or N.

Particularly, herein is provided an isolated allergenic protein comprising an amino acid sequence according to SEQ ID NO:9, wherein a maximum of 4, such as 3, 2, or 1, of said positions X of SEQ ID NO:9 contain any amino acid, with the proviso that X is not C;
and wherein in said remaining positions X, said amino acids are selected from the following groups of amino acids:
X in position 2 is selected from any one of Q or H;
X in position 18 is selected from any one of A or L;
X in position 31 is selected from any one of K or E;
X in position 34 is selected from any one of H or N;
X in position 41 is selected from any one of A or Y;
X in position 46 is selected from any one of V or S; and
X in position 52 is selected from any one of H or N.

More particularly, there is provided herein an isolated allergenic protein comprising an amino acid sequence according to SEQ ID NO:9, wherein in positions X, said amino acids are selected from the following groups of amino acids:
X in position 2 is selected from any one of Q, H, A, E, S, D, T, L, or Y;
X in position 18 is selected from any one of A, L, Y, I, V, F, M, or R;
X in position 31 is selected from any one of K, E, D, Q, A, G, or S;
X in position 34 is selected from any one of H, N, Q or K;
X in position 41 is selected from any one of A, Y, F or S;
X in position 46 is selected from any one of V, S, E, V, A, Q; and/or
X in position 52 is selected from any one of H, N, D, or E.

There is furthermore provided herein an isolated allergenic protein comprising an amino acid sequence according to SEQ ID NO:9, wherein:
X in position 2 is Q or H;
X in position 18 is A or L;
X in position 31 is K or E;
X in position 34 is H or N;
X in position 41 is A or Y;

X in position 46 is V or S; and/or

X in position 52 is H or N.

Further provided herein is an isolated allergenic protein comprising an amino acid sequence according to SEQ ID NO:9, wherein a maximum of 4, such as 3, 2, or 1, of said positions X of SEQ ID NO:9 contain an amino acid selected from the following groups of amino acids:

X in position 2 is selected from any one of Q, H, A, E, S, D, T, L, or Y;

X in position 18 is selected from any one of A, L, Y, I, V, F, M, or R;

X in position 31 is selected from any one of K, E, D, Q, A, G, or S;

X in position 34 is selected from any one of H, N, Q or K;

X in position 41 is selected from any one of A, Y, F or S;

X in position 46 is selected from any one of V, S, E, V, A, Q; and/or

X in position 52 is selected from any one of H, N, D, or E;

and wherein in the remaining positions X, the amino acids are identical to the amino acids in the corresponding positions of SEQ ID NO:4.

More particularly, herein is provided an isolated allergenic protein comprising an amino acid sequence according to SEQ ID NO:9, wherein a maximum of 4, such as 3, 2, or 1, of said positions X of SEQ ID NO:9 contain an amino acid selected from the following groups of amino acids:

X in position 2 is Q or H;

X in position 18 is A or L;

X in position 31 is K or E;

X in position 34 is H or N;

X in position 41 is A or Y;

X in position 46 is V or S; and/or

X in position 52 is H or N.

Specifically, the present disclosure further provides an isolated allergenic protein comprising or consisting of an amino acid sequence according to SEQ ID NO:4, SEQ ID NO:5, SEQ ID NO:6, or SEQ ID NO:8, respectively.

A protein described herein can also have chemically modified amino acids added to the original sequence, which refers to an amino acid whose side chain has been chemically modified. For example, a side chain may be modified to comprise a signalling moiety, such as a fluorophore or a radiolabel. A side chain may be modified to comprise a new functional group, such as a thiol, carboxylic acid, or amino group. Post-translationally modified amino acids are also included in the definition of chemically modified amino acids.

An isolated protein, variant or fragment thereof as disclosed throughout herein may have been recombinantly produced. In general, practical utilization of allergenic proteins in research, diagnostic or other applications is greatly facilitated by their availability in recombinant form. Once an allergenic protein has been identified and its amino acid sequence established, it can be produced as a recombinant protein using well-known methods [40]). However, in difficult cases, which do not behave as textbook examples, the expression system configuration, cultivation method and/or purification strategy may need to be extensively adapted or even newly developed in order to reach the goal of obtaining a functional protein in a useful quantity. How to achieve such an extensive adaption is not easily foreseeable even for the skilled person in the art. A gene encoding the protein can either be cloned in the form of a cDNA derived from mRNA prepared from the allergenic source material, or synthesized according to the desired DNA sequence. Due to the redundancy of the genetic code, with up to six different codons specifying the same amino acid, a given amino acid sequence can be encoded by a large number of synonymous DNA sequences. If required, functional additions or modifications to the protein can be introduced through the design of a synthetic gene, by site-specific mutagenesis or as part of the cloning strategy. A gene encoding the allergen of interest can be cloned in any of a variety of different expression vectors and introduced into any of a variety of prokaryotic or eukaryotic expression hosts [40]. Common expression hosts include but are not limited to the gram negative bacterium *Escherichia coli*, the yeasts *Saccharomyces cerevisiae* and *Pichia pastoris*, insect cell lines derived from Spodoptera frugiperda or Drosophila melanogaster, and mammalian cell lines.

The recombinant protein may be expressed intracellularly in soluble or insoluble form or secreted into the culture medium. Recovery and purification of the recombinant protein can be performed by a variety of well-known methods or combinations thereof. Common chromatographic techniques include immobilized metal ion affinity chromatography (IMAC), anion and cation exchange chromatography, hydrophobic interaction chromatography, reversed phase chromatography and size exclusion chromatography.

An isolated protein as presented herein, when recombinantly produced, may be intentionally modified for a specific purpose, thereby resulting in a non-naturally occurring protein, without functionally affecting the protein in regard to e.g. antibody binding properties. A non-naturally occurring protein can be a recombinant protein which has been fused with another protein to enhance expression level or solubility. Examples of such fusion partners include thioredoxin (TRX), maltose binding protein (MBP) and glutathione-S-transferase (GST). Another example is the addition of a signal peptide enabling the secretion of the protein into the culture medium from which it can be easily recovered in a soluble form. A non-naturally occurring protein may also be a recombinant protein where a short peptide tag has been genetically grafted onto said protein for the purpose of enabling affinity purification. Examples of such peptide tags include hexahistidine for conferring metal ion affinity or a peptide epitope for a specific antibody such as anti-hemagglutinin, anti-c-myc or anti-Flag monoclonal antibody.

To enable separation and removal of any such addition to a recombinant protein, a short peptide sequence for site-specific proteolytic cleavage may be inserted between the protein of interest and the fusion partner or peptide tag. Examples of such target sites for proteolytic enzymes include DDDDK for enterokinase, IEGR for factor Xa, ENLYFQA for TEV protease and EKREAEAEF for Kex2/Ste13 for in vivo processing in *P. pastoris*. A few amino acid residues of such a target sequence may remain following cleavage, for example EAEFEF or a part thereof in the case of secreted expression in *P. pastoris*.

There is also provided herein an isolated nucleic acid molecule encoding an isolated protein, fragment or variant as disclosed herein. The isolated nucleic acid may be encoded by SEQ ID NO:10. SEQ ID NO:10 is a degenerated DNA sequence encoding the consensus Cupressaceae amino acid sequence (i.e. SEQ ID NO:9), which is based on the Cup s GRPa, Cups GRPb, Jun a GRP and Cry j GRP sequences described herein, i.e. an isolated protein as disclosed herein, comprising synonymous codons and variants according to the ambiguity codes of IUPAC (International Union of Pure and Applied Chemistry; hftps://iupac.orq/). The consensus Cupressaceae nucleic acid sequence according to SEQ ID NO:10 was constructed starting from the Cup s GRPa amino acid sequence (i.e. SEQ ID NO:4), back-translated and including synonymous codons and taking into account the seven amino acid positions in which Cup s GRPb, Jun a GRP and/or Cry j GRP differ from the Cup s GRPa amino acid sequence. The nucleotides encoding the seven variable amino acid positions are marked-up in bold text below.

SEQ ID NO:10, i.e. the Cupressaceae consensus nucleic acid sequence:

```
GCN CAN ATH GAY TGY GAY AAR GAR TGY AAY MGN MGN TGY WSN AAR GCN WSN BYN CAY GAY   60

MGN TGY YTN AAR TAY TGY GGN ATH TGY TGY RAR AAR TGY MAY TGY GTN CCN CCN GGN ACN  120

KMN GGN AAY GAR GAY DBN TGY CCN TGY TAY GCN MAY YTN AAR AAY WSN AAR GGN GGN CAY  180

AAR TGY CCN                                                                      189
``` wherein:
N=T, C, A or G;
R=A or G;
H=T, C or A;
Y=T or C;
M=C or A;
W=T or A;
S=G or C;
B=C, G or T;
K=G or T; and
D=A, G or T.

There are also provided herein the following nucleic acid sequences:

SEQ ID NO:50, i.e. Cup s GRPa backtranslated and taking into account synonymous codons:

```
GCN CAR ATH GAY TGY GAY AAR GAR TGY AAY MGN MGN TGY WSN AAR GCN WSN GCN CAY GAY   60

MGN TGY YTN AAR TAY TGY GGN ATH TGY TGY GAR AAR TGY CAY TGY GTN CCN CCN GGN ACN  120

GCN GGN AAY GAR GAY GTN TGY CCN TGY TAY GCN AAY YTN AAR AAY WSN AAR GGN GGN CAY  180

AAR TGY CCN                                                                      189
```

SEQ ID NO:51, i.e. Cups GRPa backtranslated, in which the nucleotides encoding the seven variable amino acid positions (marked-up in bold text) have been changed to those nucleotides encoding the amino acids present in Cup s GRPb, Jun a GRP and/or Cry j GRP:

```
GCN CAY ATH GAY TGY GAY AAR GAR TGY AAY MGN MGN TGY WSN AAR GCN WSN YTN CAY GAY   60

MGN TGY YTN AAR TAY TGY GGN ATH TGY TGY AAR AAR TGY AAY TGY GTN CCN CCN GGN CAN  120

TAY GGN AAY GAR GAY WSN TGY CCN TGY TAY GCN CAY YTN AAR AAY WSN AAR GGN GGN CAY  180

AAR TGY CCN                                                                      189
```

In SEQ ID NO:50 and SEQ ID NO:51, the variable nucleotides have the same meaning as in SEQ ID NO:10, as defined above.

There is also provided herein a nucleic acid molecule comprising a nucleic acid sequence according to any one of SEQ ID NO:10, 50 or 51, or a sequence having at least 85% sequence identity therewith, such as at least 90, 91, 92, 93, 94, 95, 96, 97, 98 or 99% sequence identity therewith.

There is also provided a vector or an expression vector comprising an isolated nucleic acid molecule as disclosed herein. The isolated nucleic acid molecule may encode an isolated protein or a fragment or variant thereof as disclosed herein, and may hence comprise or consist of any nucleic acid sequence disclosed herein.

In addition, there is also provided an isolated host cell comprising a vector or an expression vector as described herein. As previously mentioned herein, said vector or expression vector comprises a nucleic acid molecule encoding an isolated protein or fragment or variant thereof as disclosed elsewhere herein.

There is also provided a method for producing an allergen composition, wherein said method comprises a step of adding an isolated protein or a functionally equivalent fragment or variant thereof as described herein to a composition comprising an allergen extract and/or at least one purified allergen component. There is also provided an allergen composition obtainable by such a method. Such an allergen composition can be "spiked" with an isolated protein, fragment or variant thereof as presented herein. Such an allergen composition may be an allergen extract or a mixture of purified or recombinant allergen components having no or a low content of the isolated proteins presented herein, wherein the isolated protein, fragment or variant thereof is added to said allergen composition (i.e. the allergen composition is "spiked") in order to bind IgE from patients whose IgE would not otherwise bind or bind poorly to the allergen composition. Accordingly, this aspect relates to a method for producing such a composition, which method comprises the step of adding said protein to an allergen composition, such as an allergen extract (as mentioned optionally spiked with other components) or a mixture of purified native or recombinant allergen components. There is also provided an allergen composition comprising an isolated protein, or fragment or variant thereof, as described herein, and an allergen extract and/or at least one purified allergen component.

There is also provided herein the use of an isolated protein or a functionally equivalent fragment or variant thereof for the in vitro diagnosis or assessment of Type 1 allergy.

There is also provided herein the use, wherein said Type 1 allergic symptoms are elicited by pollen of Cupressaceae species. In addition, there is provided the use, wherein said Type 1 allergy is a pollen-associated food allergy, with symptoms elicited by foods such as peach, apricot, plum, citrus fruits or pomegranate.

Detection or measurement of allergen-specific IgE antibodies in a human or animal specimen can be performed in several different ways but normally includes an initial step of capture of antibodies binding to the allergen in question, followed by a washing step to remove unbound antibodies, application of an IgE detection reagent, washing to remove unbound such reagent and a final step of generating and recording a signal from the IgE detection reagent.

Allergen may be immobilized on a solid or soluble support for capture of allergen-specific antibodies or complexed with the antibodies in solution for subsequent capture and quantitation of such complexes. The allergen detection reagent is typically a monoclonal antibody conjugated either with a reporter substance or with an enzyme that can catalyse the formation of a product quantifiable with fluorometric or colorimetric methods. An assay for measurement of allergen-specific antibodies also includes a calibration system allowing the conversion of primary response units to antibody concentration units. The same assay principles apply to the measurement of allergen-specific antibodies of other isotypes, the only difference being the specificity of detection regent used.

Furthermore, there is provided herein a method for the in vitro diagnosis or assessment of Type 1 allergy, said method comprising the steps of: contacting an immunoglobulin-containing body fluid sample from a subject suspected of having type 1 allergy with an isolated protein, or fragment or variant thereof as disclosed herein; and in said sample, determining the presence of antibodies specifically binding to said protein, fragment or variant thereof, such as IgE antibodies; wherein the presence of antibodies in said sample specifically binding to said protein is informative in relation to Type 1 allergy in said subject. In an embodiment where IgE antibodies are present in said sample and specifically bind to said protein, this is indicative of a Type I allergy in said subject.

A body fluid sample may be a blood or serum sample from the subject, wherein said body fluid sample is brought into contact with the isolated protein, or fragment or variant thereof, or a composition containing said protein, or fragment or variant thereof, to determine if said subject sample contains IgE antibodies that bind specifically to the isolated protein, variant or fragment thereof.

The fragments or variants of any isolated protein mentioned herein may be a natural or a man-made fragment or variant being functionally equivalent to the original protein.

There is also provided a kit of parts comprising an isolated protein, a fragment or variant thereof, immobilized to a soluble or a solid support, wherein said kit optionally further comprises a detection reagent and/or instructions for use. A solid support may be selected from the group of nitrocellulose, glass, silicon, and plastic and/or is a microarray chip, or any other suitable solid supports available in the art.

As mentioned elsewhere herein, the kit may further also comprise a detection agent capable of binding to antibodies, such as IgE antibodies bound to the immobilised protein. Such detecting agents may e.g. be anti-IgE antibodies labelled with detectable labels, such as dyes, fluorophores or enzymes, as is known in the art of immunoassays.

Supports suitable for the immobilization of proteins and peptides are well-known in the art, and herein, in this aspect, it is encompassed any support which does not negatively impact the immunogenic properties of the protein or protein fragment to any substantial extent. In this context, it is understood that the term "immobilized" may be any kind of attachment suitable for a specific support. The isolated protein or protein fragment may be immobilized to a solid support suitable for use in a diagnostic method, such as ImmunoCAP, EliA or VarelisA. Alternatively, the protein or protein fragment may be immobilized to a natural or synthetic polymeric structure in solution, such as one or more dendromeric structures in solution.

There is also provided herein an isolated protein, fragment or variant thereof as described herein, which has been provided with a label or a labelling element. Thus, herein is also provided a protein or protein fragment or variant which has been provided with a luminescent label, such as a photoluminiscent label, a fluorescent label or phosphorescent label, a chemiluminescent label or a radioluminescent label. Also encompassed by the present disclosure is an isolated protein, fragment or derivative thereof which has been derivatized with an element which may be identified, such as an affinity function. Affinity functions for the labelling of proteins and peptides are well-known in the art, and the skilled person will be able to choose any suitable function, such as biotin.

There is also provided herein an isolated protein or a functionally equivalent fragment or variant thereof, for use in the treatment or prevention of Type 1 allergy. The Type 1 allergy may be caused by pollen of Cupressaceae species, and/or may be a Cupressaceae pollen-associated food allergy with symptoms elicited by ingestion of fruits such as peach, apricot, plum, citrus fruits or pomegratate. Equally, there is also provided the use of an isolated protein or a functionally equivalent fragment or variant thereof as disclosed herein, in the manufacture of a medicament for the treatment or prevention of Type 1 allergy. The Type 1 allergy may be caused by pollen of Cupressaceae species, and/or may be a Cupressaceae pollen-associated food allergy with symptoms elicited by ingestion of fruits such as peach, apricot, plum, citrus fruits or pomegratate.

Further provided herein is a pharmaceutical composition, said pharmaceutical composition comprising an isolated protein or a functionally equivalent fragment or variant thereof and a pharmaceutically acceptable carrier and/or excipient.

A pharmaceutically acceptable carrier and/or excipient herein refers to a pharmaceutically-acceptable material, composition, or vehicle, such as a liquid or solid filler, diluent, excipient, solvent, or encapsulating material. Each component must be "pharmaceutically acceptable" in the sense of being compatible with the other ingredients of a pharmaceutical formulation. It must also be suitable for use in contact with the tissues or organs of humans and animals without excessive toxicity, irritation, allergic response, immunogenecity, or other problems or complications, commensurate with a reasonable benefit/risk ratio.

There is also provided herein a method for the treatment or prevention of a Type 1 allergy, said method comprising administering a pharmaceutically effective amount of an isolated protein, fragment or variant thereof as described herein, an allergen composition, or a pharmaceutical composition comprising said isolated protein, fragment or variant thereof, to a subject in need thereof. The use of the protein, variant or fragment thereof, in immunotherapy, includes e.g. component-resolved immunotherapy [41]. The isolated protein may be used in its natural form or in a recombinant form displaying biochemical and immunological properties similar to those of the natural protein. The isolated protein may be used in a modified form, generated chemically or genetically. Examples of modifications to the isolated protein include, but are not limited to, fragmentation, truncation, tandemerization or aggregation of the protein, deletion of internal segment(s), substitution of amino acid residue(s), domain rearrangement, or disruption at least in part of the tertiary structure by disruption of disulfide bridges or its binding to another macromolecular structure, or other low molecular weight compounds.

Any suitable methods of administration of a pharmaceutical composition as disclosed herein can be used depending on the purpose of administration of the isolated protein. The dose and timing of administration will be determined by the physician as being suitable for the subject being treated.

As mentioned elsewhere herein, the protein may be purified from its natural source. It may also be produced by recombinant DNA technology or be chemically synthesized by methods known to a person skilled in the art or as described in the present application.

There is also provided herein a method wherein said Type 1 allergy is a Type 1 allergy caused by pollen of Cupressaceae species, and/or is a Cupressaceae pollen-associated food allergy with symptoms elicited by ingestion of fruits such as peach, apricot, plum, citrus fruits or pomegratate.

The examples below further illustrate the present invention but should not be considered as limiting the invention, which is defined by the scope of the appended claims.

EXPERIMENTAL SECTION

Tables

Table 1 below identifies the SEQ ID NOs according to the sequence listing, which is part of the present disclosure, and the corresponding definitions/names of said sequences.

TABLE 1

| SEQ ID NO: | Definition/name |
|---|---|
| 1 | Pru p7 amino acid sequence (*Prunus persica*) |
| 2 | EST Record BY878079 *Cryptomeria japonica* male strobilus (*Cryptomeria japonica*), cDNA sequence |
| 3 | Amended version of record BY878079 (DNA sequence) (*Cryptomeria japonica*) |
| 4 | Cup s GRPa amino acid sequence (*Cupressus sempervirens*) |
| 5 | Cup s GRPb amino acid sequence (*Cupressus sempervirens*) |
| 6 | Jun a GRP amino acid sequence (*Juniperus ashei*) |
| 7 | EST Record BY900480 *Cryptomeria japonica* male strobilus (*Cryptomeria japonica*), cDNA sequence representing mRNA sequence |
| 8 | Cry j GRP, amino acid sequence (*Cryptomeria japonica*) |
| 9 | Cupressaceae GRP consensus sequence, including 7 variable amino acid positions |
| 10 | Cupressaceae GRP consensus nucleic acid sequence, DNA (degenerated) including synonymous codons and variable positions according to IUPAC ambiguity codes |
| 11-20 | Peptide (amino acid) sequences identified with MS/MS analysis for nCup s GRP (Table 2a) |
| 21-26 | Peptide (amino acid) sequences identified with MS/MS analysis for isoform variant of nCup s GRP (Table 2b) |
| 27-36 | Peptide (amino acid) sequences identified with MS/MS analysis for nJun a GRP (Table 2c) |
| 37-49 | Peptide (amino acid) sequences identified with MS/MS analysis for nCry j GRP (Table 2d) |
| 50 | Cup s GRPa backtranslated and including synonymous codons |
| 51 | Cup s GRPa backtranslated and in which all variable positions are changed |
| 52 | Cupressaceae - Pru p 7 GRP consensus sequence with 21 variable positions |

Table 2: List of peptide sequences identified with MS/MS analysis of a) nCup s GRP, b) isoform variants of nCup s GRP, c) nJun a GRP and d) nCry j GRP. Column 1 shows the sequence of the peptide, column 2 the corresponding SEQ ID NO, column 3 the statistical significance value −log P, column 4 the experimentally determined mass (M/Z−1.00794) of the peptide in Da, column 5 the experimentally determined mass corrected for biological or experimental modifications (PTM), column 6 the theoretically calculated mass of the peptide, column 7-8 the start and end positions in the amino acid sequence of the mature protein that the peptide represents and column 9 the modifications present in the analysed peptide. All cysteine residues were modified to propionamide residues prior to MS/MS analysis, resulting in a mass increase of 71.03712 Da per cysteine residue. In some peptides, as indicated in column 9 below, amidation of a terminal glutamic acid had occurred, causing a mass reduction of 0.984 Da. In the context of this MS/MS analysis, any biological or experimental amino acid modification is referred to as a PTM.

TABLE 2a

| Peptide | SEQ ID NO: | -10 lgP | Experimental mass * | Experimental mass – PTM § | Calculated peptide mass ¶ | Start | End | PTM # |
|---|---|---|---|---|---|---|---|---|
| AQIDCDKECNRRCSKA | 11 | 96 | 2051, 9299 | 1838, 8185 | 1838, 8181 | 1 | 16 | 3 propionamide |
| AQIDCDKECNRRCSKASAHDR | 12 | 116 | 2618, 1860 | 2405, 0746 | 2405, 0741 | 1 | 21 | 3 propionamide |
| AQIDCDKECNRRCSKASAHDRCLKY | 13 | 119 | 3196, 4746 | 2912, 3261 | 2912, 3251 | 1 | 25 | 4 propionamide |
| ASAHDRCLKYCGICCEK | 14 | 200 | 2182, 9744 | 1898, 8259 | 1898, 8251 | 16 | 32 | 4 propionamide |
| SAHDRCLKYCGICCEKC | 15 | 83 | 2285, 9836 | 1930, 7980 | 1930, 7971 | 17 | 33 | 5 propionamide |
| CGICCEKCHCVPPGTAGNEDVCPCYANL | 16 | 112 | 3395, 3994 | 2898, 1396 | 2898, 1391 | 26 | 53 | 7 propionamide |
| CGICCEKCHCVPPGTAGNEDVCPCYANLKNSKGGHKCP | 17 | 84 | 4502, 9600 | 3934, 6630 | 3934, 6631 | 26 | 63 | 8 propionamide |
| HCVPPGTAGNEDVCPCYANLKNSKGGHKCP | 18 | 96 | 3379, 5317 | 3095, 3832 | 3095, 3831 | 34 | 63 | 4 propionamide |
| CVPPGTAGNEDVCPCYANLKNSKGGHKCP | 19 | 107 | 3242, 4729 | 2958, 3244 | 2958, 3241 | 35 | 63 | 4 propionamide |
| DVCPCYANLKNSKGGHKCP | 20 | 107 | 2246, 0396 | 2032, 9282 | 2032, 9271 | 45 | 63 | 3 propionamide |

* Monoisotopic mass (M/Z-1.00794) with PTM
§ Monoisotopic mass without PTM
¶ Calculated monoisotopic mass
71.03712 Da mass gain per propionamide adduct, 0.984 Da mass loss per amidation TABLE 2b

| Peptide | SEQ ID NO: | -10 lgP | Experimental mass * | Experimental mass – PTM § | Calculated peptide mass ¶ | Start | End | PTM # |
|---|---|---|---|---|---|---|---|---|
| Peptide - Amino acid pos 18 L | | | | | | | | |
| SKASLHDRCLKYCGICCE | 21 | 112, 49 | 2311, 0693 | 2027, 9048 | 2027, 9041 | 14 | 31 | 4 propionamide; 1 amidation |
| SKASLHDRCLKYCGICCE | 22 | 105, 25 | 2311, 0693 | 2027, 9048 | 2027, 9041 | 14 | 31 | 4 propionamide; 1 amidation |
| KASLHDRCLKY | 23 | 89, 99 | 1403, 7344 | 1332, 6973 | 1332, 6961 | 15 | 25 | 1 propionamide |
| Peptide - Amino acid pos 52 H | | | | | | | | |
| CHCVPPGTAGNEDVCPCYAHLK | 24 | 114, 11 | 2597, 1284 | 2312, 9799 | 2312, 9791 | 33 | 54 | 4 propionamide |
| DVCPCYAHLK | 25 | 112, 95 | 1289, 5896 | 1147, 5154 | 1147, 5151 | 45 | 54 | 2 propionamide |
| CVPPGTAGNEDVCPCYAHLKNSKGGHKCP | 26 | 93, 12 | 3265, 4890 | 2981, 3405 | 2981, 3401 | 35 | 63 | 4 propionamide |

* Monoisotopic mass (M/Z-1.00794) with PTM
§ Monoisotopic mass without PTM
¶ Calculated monoisotopic mass
71.03712 Da mass gain per propionamide adduct, 0.984 Da mass loss per amidation TABLE 2c

| Peptide | SEQ ID NO: | -10 lgP | Experimental mass * | Experimental mass - PTM § | Calculated peptide mass ¶ | Start | End | PTM # |
|---|---|---|---|---|---|---|---|---|
| AQIDCDKECNRR | 27 | 126 | 1591,7195 | 1449,6453 | 1449,6441 | 1 | 12 | 2 propionamide |
| AQIDCDKECNRRCSKASAHDRCLKY | 28 | 100 | 3196,4746 | 2912,3261 | 2912,3251 | 1 | 25 | 4 propionamide |
| SAHDRCLKY | 29 | 91 | 1162,5553 | 1091,5182 | 1091,5181 | 17 | 25 | 1 propionamide |
| YCGLCCKK | 30 | 66 | 1129,5083 | 916,3969 | 916,3961 | 25 | 32 | 3 propionamide |
| CGLCCKKCHCVPP | 31 | 75 | 1744,7704 | 1389,5848 | 1389,5841 | 26 | 38 | 5 propionamide |
| KCHCVPPGTAGNEDVCPCYANLK | 32 | 123 | 2702,2073 | 2418,0588 | 2418,0581 | 32 | 54 | 4 propionamide |
| CHCVPPGTAGNE | 33 | 107 | 1325,5493 | 1183,4751 | 1183,4741 | 33 | 44 | 2 propionamide |
| GNEDVCPCYANLK | 34 | 129 | 1566,6807 | 1424,6065 | 1424,6061 | 42 | 54 | 2 propionamide |
| DVCPCYANLKNSKGGHKCP | 35 | 95 | 2246,0396 | 2032,9282 | 2032,9271 | 45 | 63 | 3 propionamide |
| ANLKNSKGGHKCP | 36 | 87 | 1423,7354 | 1352,6983 | 1352,6981 | 51 | 63 | 1 propionamide |

* Monoisotopic mass (M/Z-1.00794) with PTM
§ Monoisotopic mass without PTM
¶ Calculated monoisotopic mass
71.03712 Da mass gain per propionamide adduct, 0.984 Da mass loss per amidation TABLE 2d

| Peptide | SEQ ID NO: | -10 lgP | Experimental mass * | Experimental mass - PTM § | Calculated peptide mass ¶ | Start | End | PTM # |
|---|---|---|---|---|---|---|---|---|
| AHIDCDKECNR | 37 | 200 | 1444,6188 | 1302,5446 | 1302,5441 | 1 | 11 | 2 propionamide |
| AHIDCDKECNRRCSKASAHDRCLKY | 38 | 83 | 3205,4751 | 2921,3266 | 2921,3251 | 1 | 25 | 4 propionamide |
| ECNRRCSK | 39 | 62 | 1136,5179 | 994,4437 | 994,4431 | 8 | 15 | 2 propionamide |
| ASAHDRCLK | 40 | 88 | 1070,5291 | 999,4920 | 999,4911 | 16 | 24 | 1 propionamide |
| YCGICCEK | 41 | 61 | 1130,4559 | 917,3445 | 917,3441 | 25 | 32 | 3 propionamide |
| CGICCEKCNCVPP | 42 | 84 | 1722,7020 | 1367,5164 | 1367,5161 | 26 | 38 | 5 propionamide |
| CNCVPPGTYG | 43 | 95 | 1151,4740 | 1009,3998 | 1009,3991 | 33 | 42 | 2 propionamide |
| CNCVPPGTYGNEDSCPCYANL | 44 | 60 | 2502,9912 | 2218,8427 | 2218,8421 | 33 | 53 | 4 propionamide |
| GNEDSCPCYANL | 45 | 94 | 1426,5493 | 1284,4751 | 1284,4741 | 42 | 53 | 2 propionamide |
| GNEDSCPCYANLK | 46 | 120 | 1554,6443 | 1412,5701 | 1412,5691 | 42 | 54 | 2 propionamide |
| GNEDSCPCYANLKNSKGGHKCP | 47 | 40 | 2534,1101 | 2320,9987 | 2320,9981 | 42 | 63 | 3 propionamide |
| DSCPCYANLK | 48 | 95 | 1254,5372 | 1112,4630 | 1112,4621 | 45 | 54 | 2 propionamide |
| ANLKNSKGGHKCP | 49 | 81 | 1423,7354 | 1352,6983 | 1352,6981 | 51 | 63 | 1 propionamide |

* Monoisotopic mass (M/Z-1.00794) with PTM
§ Monoisotopic mass without PTM
¶ Calculated monoisotopic mass
71.03712 Da mass gain per propionamide adduct, 0.984 Da mass loss per amidation Table 3 identifies amino acids having phylogenetically restricted variability in positions X of SEQ ID NO:52, i.e. the Cupressaceae—Pru p 7 GRP consensus sequence having 21 variable positions.

TABLE 3

| | AA position | | | | | | | | |
|---|---|---|---|---|---|---|---|---|---|
| 1 | L | P | G | D | A | Q | | | |
| 2 | A | E | S | D | T | L | Y | Q | H |
| 3 | I | L | A | D | S | P | G | E | T |
| 4 | F | S | N | D | | | | | |
| 7 | A | S | G | | | | | | |
| 8 | A | K | | | | | | | |
| 10 | G | N | A | S | K | E | Q | N | D |
| 11 | V | K | E | A | Q | R | F | Y | |
| 17 | G | H | S | | | | | | |
| 18 | Y | L | I | V | F | M | R | A | |
| 19 | Q | K | M | R | H | E | | | |
| 20 | D | E | N | K | | | | | |
| 31 | E | D | Q | A | G | S | K | | |
| 34 | Q | N | H | K | | | | | |
| 41 | Y | F | A | S | | | | | |
| 44 | K | R | | | | | | | |
| 46 | E | V | A | Q | S | | | | |
| 51 | R | M | N | | | | | | |
| 52 | D | E | N | H | | | | | |
| 59 | N | E | K | G | Q | S | | | |
| 60 | P | D | S | G | N | H | | | |

The amino acid in positions 1, 3, 4, 7, 8, 10, 11, 17, 19, 20, 44, 51, 59, and 60 is conserved among the four Cupressaceae GRP proteins disclosed herein but differ from the amino acid in the corresponding positions in Pru p 7. Said positions are indicated by a Z in row A of FIG. 26 but are indicated by an X in SEQ ID NO: 52.

The amino acid in positions 2, 18, 31, 34, 41, 46, and 52 differ among the four Cupressaceae GRP proteins disclosed herein. Said positions are indicated by an X in both SEQ ID NO: 9 and SEQ ID NO: 52.

EXAMPLES

Unless stated otherwise, all filters, chromatography media and equipment were obtained from GE Healthcare Life Sciences, Uppsala, Sweden.

Example 1: Preparation of Native Pru p 7 from Canned Peaches

Purification of Native Pru p 7

Figure 2:
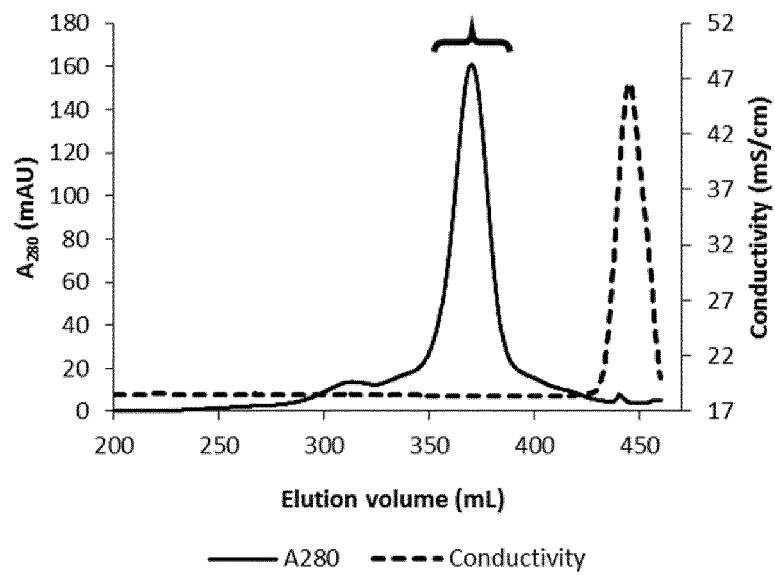
FIG. 2 shows the second purification step of native Pru p 7 by size exclusion chromatography. Absorbance at 280 nm ($A_{280}$) and conductivity are indicated by solid and hatched lines, respectively. Bracket indicates fractions pooled for further purification.
Figure 3:
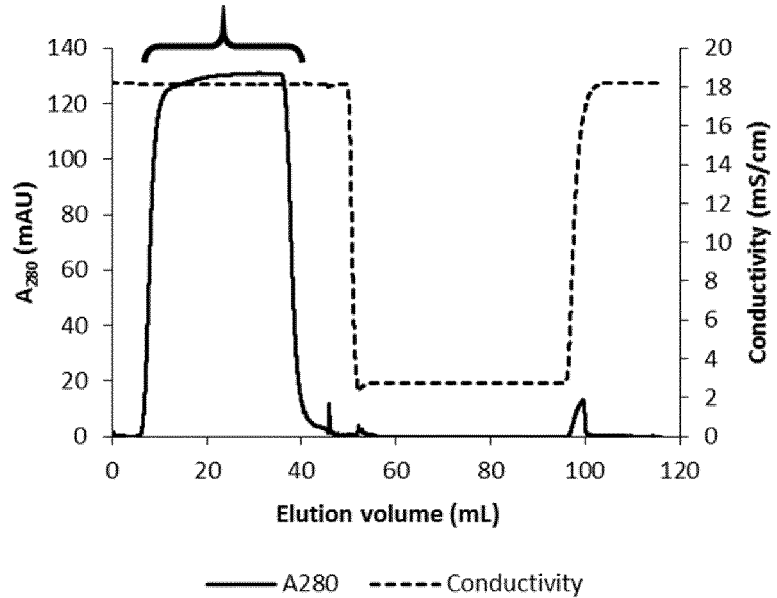
FIG. 3 shows the third purification step of native Pru p 7, comprising affinity immunoadsorption chromatography using an anti-Pru p 3 monoclonal antibody. Absorbance at 280 nm ($A_{280}$) and conductivity are indicated by solid and hatched lines, respectively. Bracket indicates unbound material collected for further purification.
Figure 4A:
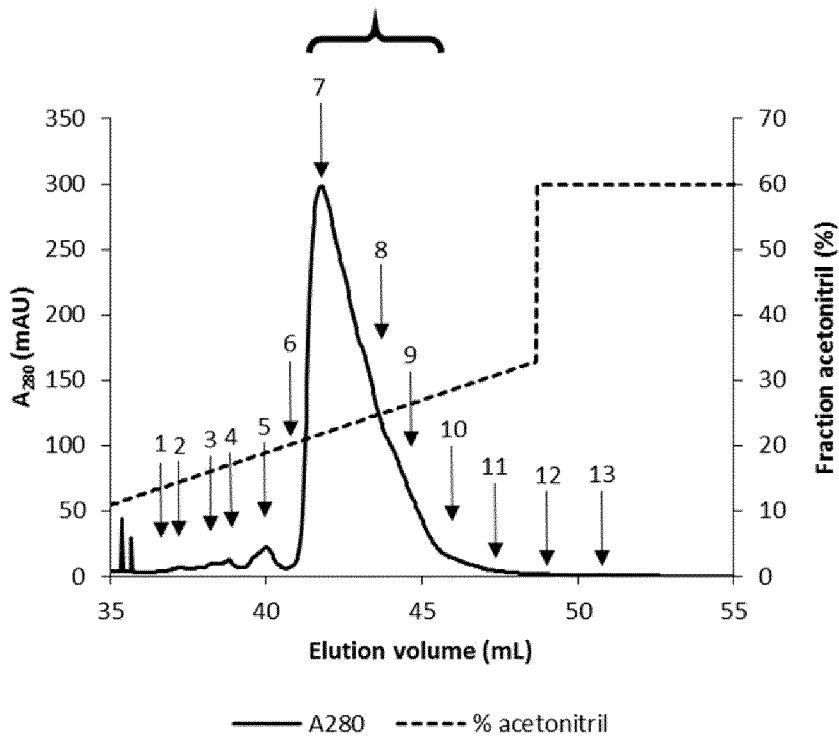
FIG. 4 shows the fourth purification step of native Pru p 7 by reversed phase chromatography. a) Chromatogram with absorbance at 280 nm ($A_{280}$) and percentage acetonitrile indicated by solid and hatched lines, respectively. Arrows indicate fractions that were analysed by SDS-PAGE and bracket indicates fractions pooled for further analysis. b) SDS-PAGE of the fractions indicated in FIG. 4a. Lanes 7-9 contain the fractions indicated by a bracket in FIG. 4a. Molecular weights of marker proteins (lane M) are indicated to the right.
Figure 4B:
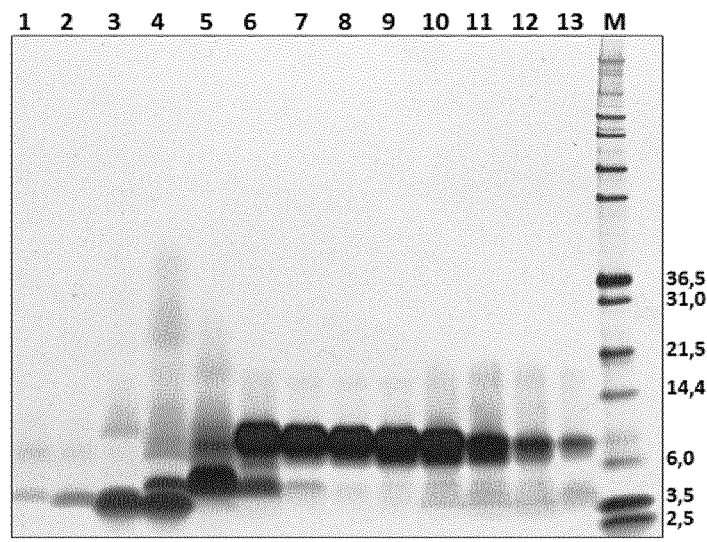

Native Pru p 7 was purified from canned peaches using four chromatographic steps. Briefly, canned peaches were mixed with a kitchen blender in 130 mM NaAc pH 4.5 and incubated 2 hrs under agitation with grinding balls (Haldenwanger MTC, Berkshire, UK) at 4° C. The extract was clarified by centrifugation, filtered and loaded on a SP Sepharose FF column equilibrated with 130 mM NaAc pH 4.5. Washing and elution were performed by isocratic steps of 0.15 and 0.5 M NaCl, respectively, in 130 mM NaAc pH 4.5 (FIG. 1). Fractions were analysed by SDS-PAGE and those containing a prominent 7 kDa band were pooled and applied to a Superdex 75 preparation grade (pg) size exclusion chromatography (SEC) column, equilibrated with 20 mM NaPO$_4$, 0.15 M NaCl, 0.02% NaN$_3$ pH 7.4. Elution was performed with the equilibration buffer (FIG. 2) and fractions containing the prominent 7 kDa band were pooled. In order to specifically remove any residual amount of Pru p 3, which has a similar size and isoelectric point as Pru p 7, a biospecific affinity adsorption step was applied. For this purpose, a proprietary monoclonal antibody against Pru p 3 antibody was coupled to an NHS-activated Sepharose HP column. The SEC pool was applied to the anti-Pru p 3 affinity column equilibrated with 20 mM NaP$_i$ pH 7.4, 150 mM NaCl, 0.02% NaN$_3$. After elution with the equilibration buffer (FIG. 3), unbound material was collected and applied to a Source 15 RPC reversed phase chromatography (RPC) column equilibrated with 0.1% TFA (FIG. 4a). Bound protein was eluted in a linear 0-55% acetonitrile gradient. Fractions were analysed by SDS-PAGE (FIG. 4b) and those containing a pure 7 kDa band were pooled as indicated in FIG. 4a and desalted to 20 mM MOPS, 0.15 M NaCl pH 7.6 on a Sephadex G25 column.

Mass Spectrometry (MS/MS) Analysis of nPru p 7

The pool of native Pru p 7 was analysed by MS/MS analysis on an Orbitrap Fusion Tribrid instrument (Thermo Fisher Scientific, CA, USA) after reduction, alkylation and enzymatic cleavage with either trypsin or chymotrypsin. Data analysis was made on a combination of MS spectra obtained from these digests. The data were analyzed against the Viridiplantae database Taxonomy ID 33090 which confirmed the identity of the purified protein as Pru p 7 (Sequence ID: NO 1). No trace of Pru p 3 or other peach proteins was detected in the preparation.

In conclusion, Example 1 describes the purification of native Pru p 7 and confirmation of its identity by MS/MS. The preparation was subsequently used for the production of polyclonal rabbit antibodies against Pru p 7.

Example 2: Expression and Purification of Recombinant Pru p 7

Figure 5:
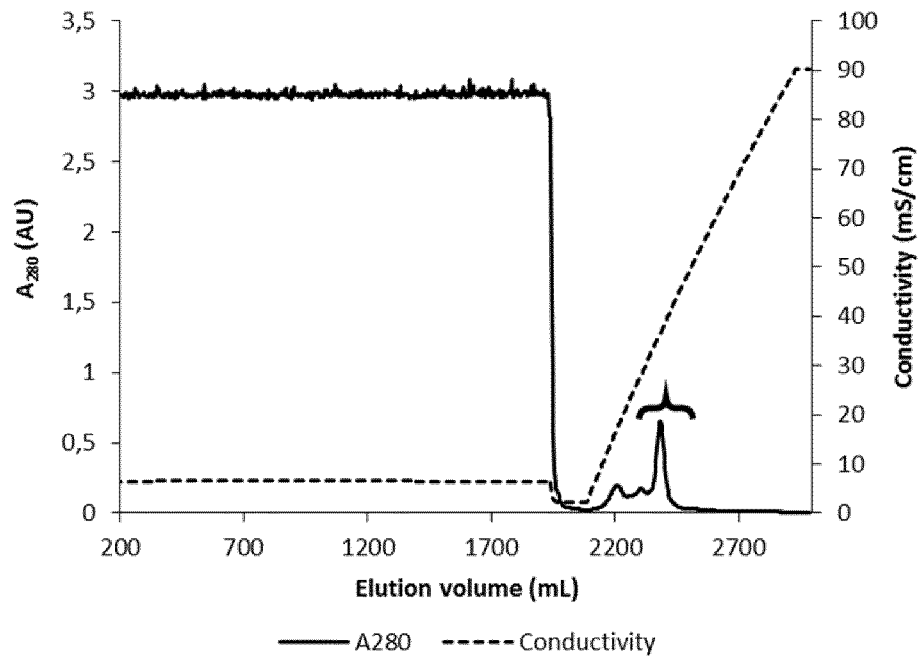
FIG. 5 shows the first purification step of recombinant Pru p 7 by cation exchange chromatography. Absorbance at 280 nm ($A_{280}$) and conductivity are indicated by solid and hatched lines, respectively. Bracket indicates fractions pooled for further purification.
Figure 6A:
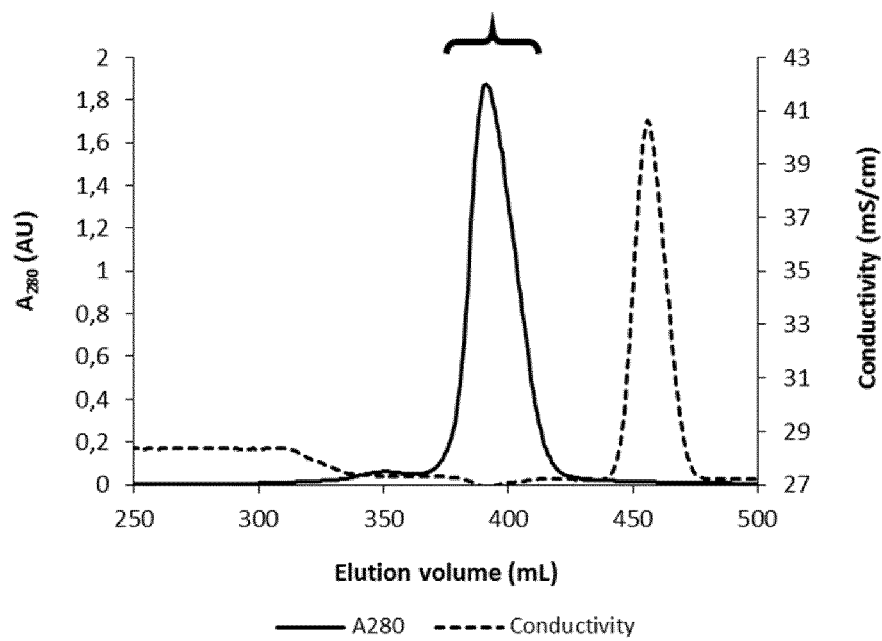
FIG. 6 shows the second purification step of recombinant Pru p 7 by size exclusion chromatography. a) Chromatogram with absorbance at 280 nm ($A_{280}$) and conductivity indicated by solid and hatched lines, respectively. Bracket indicates fractions pooled for further analysis. b) SDS-PAGE analysis of reduced (lane 1) and non-reduced (lane 2) samples of the pool from the size exclusion chromatography step. Molecular weights of marker proteins (lane M) are indicated to the right.
Figure 6B:
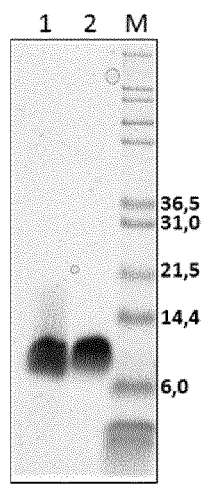

A plasmid DNA construct containing a synthetic gene encoding Pru p 7 was prepared and transformed into the yeast *Pichia pastoris* strain X-33. The transformed strain was grown and induced to produce recombinant Pru p 7 in a 3-litre bioreactor (Belach Bioteknik, Skogås, Sweden). The culture medium was harvested by centrifugation and the supernatant was collected. After adjusting the pH to 4.5 with HAc and filtration through a Whatman GF/F glass microfiber filter, the supernatant was applied to an SP Sepharose FF column equilibrated with 50 mM NaAc pH 4.5. The recombinant protein was eluted in a linear 0-1 M NaCl gradient in the same buffer (FIG. 5). rPru p 7 containing fractions were collected and further purified by SEC on a Superdex 75 pg column in 50 mM NaAc pH 4.5, 150 mM NaCl (FIG. 6a). Fractions containing rPru p 7 were pooled and the concentration determined by absorbance at 280 nm, using a calculated extinction coefficient of 0.72 mg$^{-1}$ mL cm$^{-1}$ Purity and identity of the allergen preparation were verified by SDS-PAGE (FIG. 6b) and mass spectrometry. Experimental ImmunoCAP tests (Thermo Fisher Scientific, Uppsala, Sweden) were prepared as previously described [42] and the immunological activity was evaluated using relevant patient serum samples.

In conclusion, Example 2 describes the expression of rPru p 7 in *Pichia pastoris* and purification of the recombinant protein. Recombinant Pru p 7 could be used to characterize polyclonal rabbit antibodies raised against nPru p 7 and to study IgE reactivity to Pru p 7 in relevant patient sera.

Example 3: Generation and Utilization of Polyclonal IgG Antibodies Against Pru p 7

Purified nPru p 7, prepared as described in Example 1, was used to raise polyclonal rabbit antibodies against Pru p 7. A rabbit was immunized with nPru p 7 according to a protocol comprising four booster injections of antigen. Prior to immunization, a preimmune serum sample was taken from the rabbit, to serve as control in subsequent experiments. All procedures were performed at Agrisera AB (Vannas, Sweden) under a regional ethics approval.

Figure 7A:
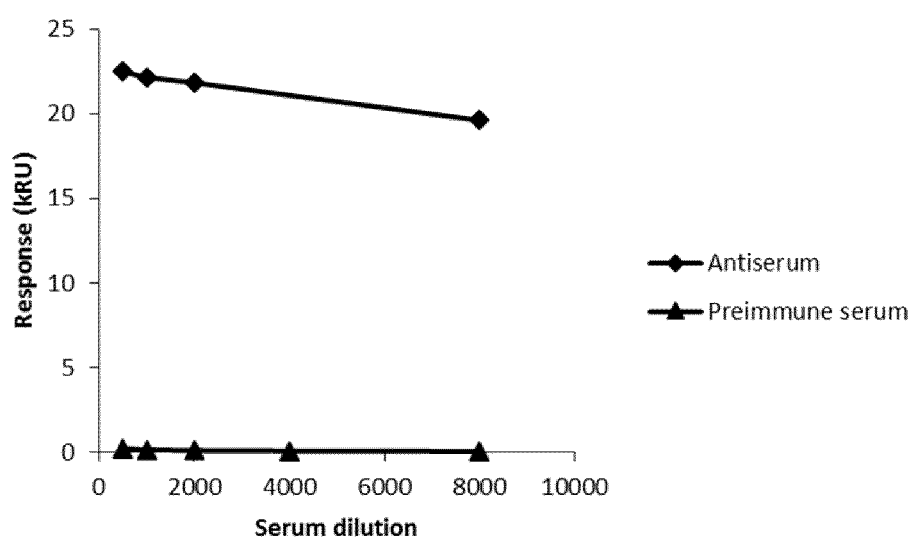
FIG. 7 shows binding of rabbit anti-Pru p 7 IgG to a) recombinant Pru p 7 and b) *Cupressus sempervirens* pollen extract at different antiserum dilutions. Preimmune serum from the same rabbit was used as a negative control.
Figure 7B:
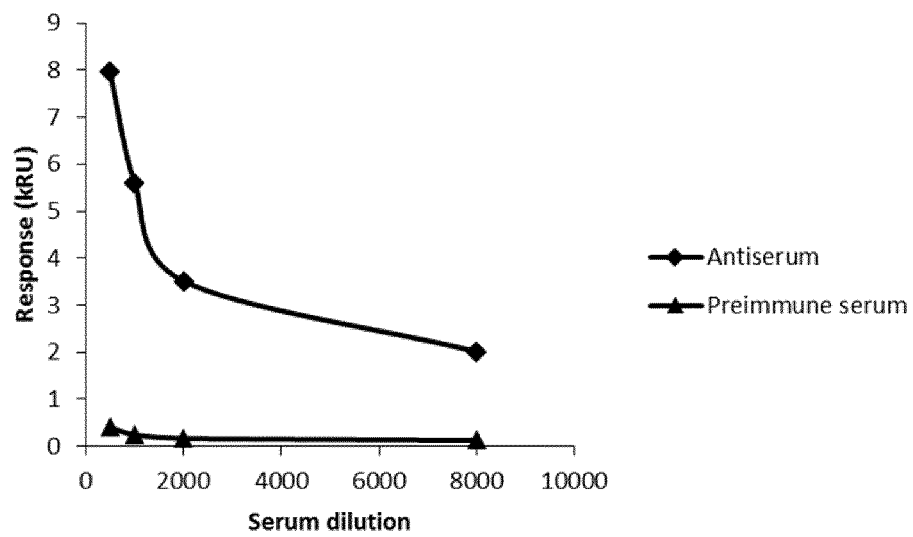

The obtained anti-Pru p 7 antiserum was tested in a series of dilutions against both rPru p 7 and *Cupressus sempervirens* pollen extract, immobilised on ImmunoCAP solid phase. The antiserum showed strong IgG binding to the immobilised rPru p 7 as compared to the pre-serum, even at the highest dilution (1:8000) (FIG. 7a), confirming its content of Pru p 7-reactive IgG. Moreover, the serum displayed binding to *C. sempervirens* pollen extract (FIG. 7b), suggesting the presence of a hitherto unknown protein cross-reactive with Pru p 7. Consequently, the anti-Pru p 7 antiserum could be used as a probe to trace this potential Cupressaceae pollen homologue of Pru p 7 in efforts to purify it, as demonstrated in the following examples.

Example 4: Purification of a Novel, Pru p 7 Related *C. sempervirens* Pollen Allergen It was shown in Example 3 that polyclonal rabbit IgG antibodies raised against Pru p 7 bound to an immobilised protein extract of *C. sempervirens* pollen. Utilizing the same antibodies, a *C. sempervirens* pollen protein cross-reactive with Pru p 7 could be identified, purified and characterised.

Figure 8:
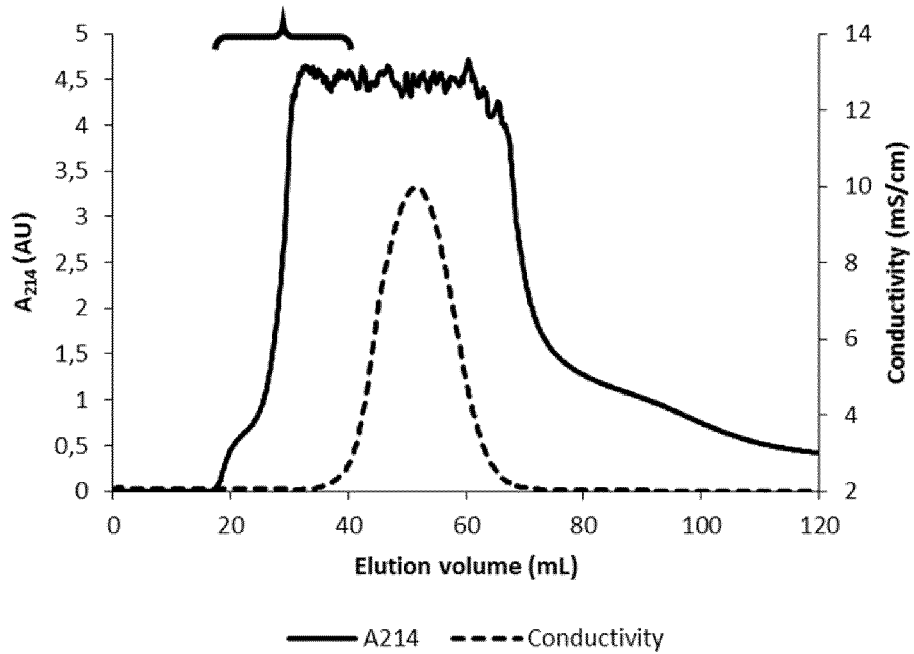
FIG. 8 shows the first step of purification of nCup s GRP from *Cupressus sempervirens* pollen extract by size exclusion chromatography. Absorbance at 214 nm ($A_{214}$) and conductivity are indicated by solid and hatched lines, respectively. Bracket indicates fractions pooled for further purification.
Figure 9A:
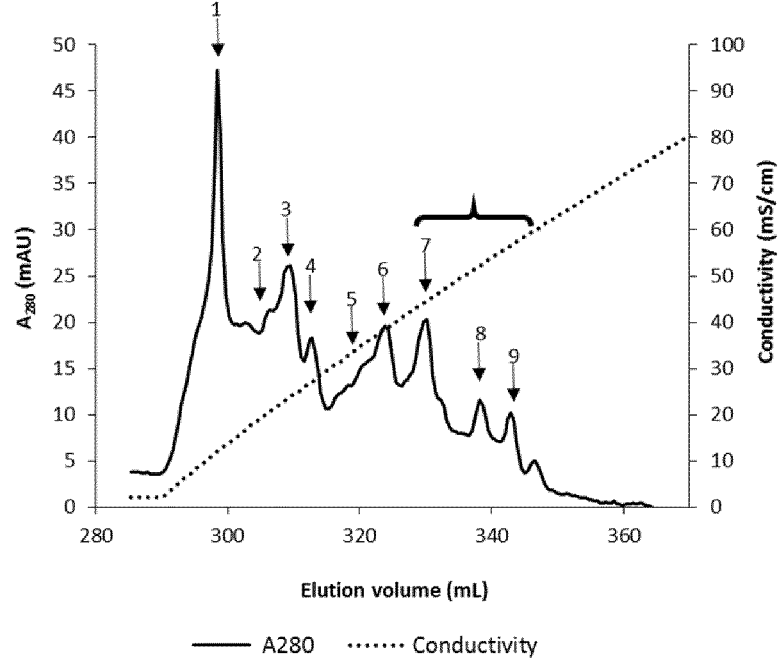
FIG. 9 shows the second step of purification of nCup s GRP by ion exchange chromatography. a) Chromatogram with absorbance at 280 nm ($A_{280}$) and conductivity indicated by solid and dotted lines, respectively. Arrows indicate fractions that were tested for binding of rabbit anti-Pru p 7 IgG. Bracket indicates fractions pooled for further purification. b) Levels of rabbit anti-Pru p 7 IgG binding to the fractions indicated in FIG. 9*a*. c) Silver stained SDS-PAGE of the fractions indicated in FIG. 9*a*. Molecular weights of marker proteins (lane M) are indicated to the right.
Figure 9B:
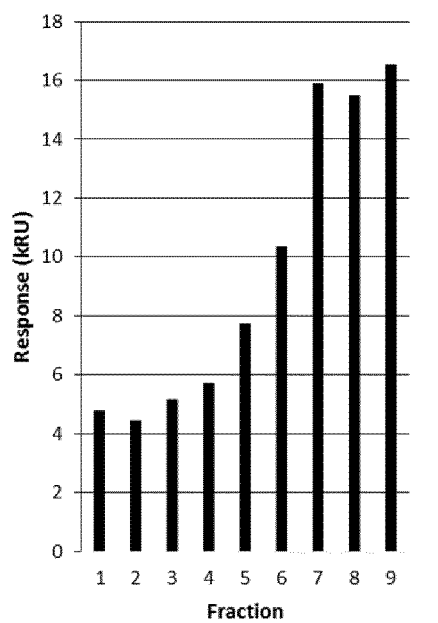
Figure 9C:
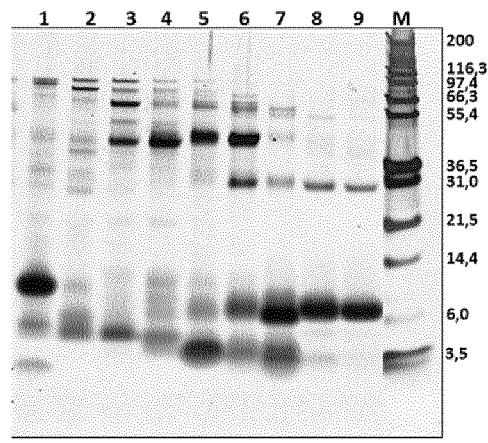
Figure 10A:
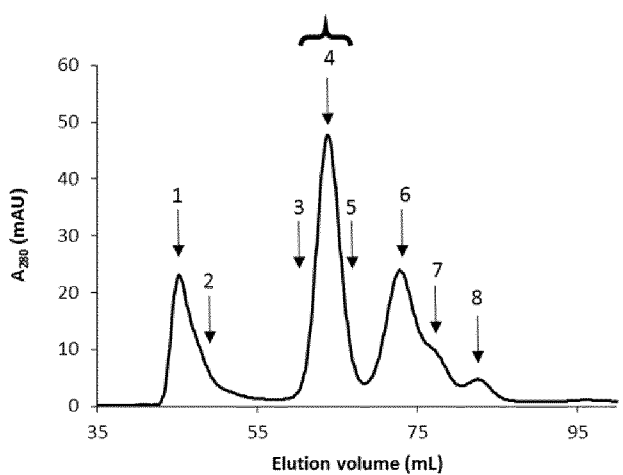
FIG. 10 shows the third step of purification of nCup s GRP by size exclusion chromatography. a) Chromatogram with absorbance at 280 nm ($A_{280}$) indicated by a solid line. Arrows indicate fractions tested for binding of rabbit anti-Pru p 7 IgG and bracket indicates fractions pooled for further purification. b) Levels of rabbit anti-Pru p 7 IgG binding to the fractions indicated in FIG. 10*a*. c) SDS-PAGE of the fractions indicated in FIG. 10*a*. Molecular weights of marker proteins (lane M) are indicated to the right. d) SDS-PAGE of the pool of fractions indicated in FIG. 10*a* (nCup s GRP, lane 1) and rPru p 7 (lane 2). Molecular weights of marker proteins (lane M) are indicated to the right.
Figure 10B:
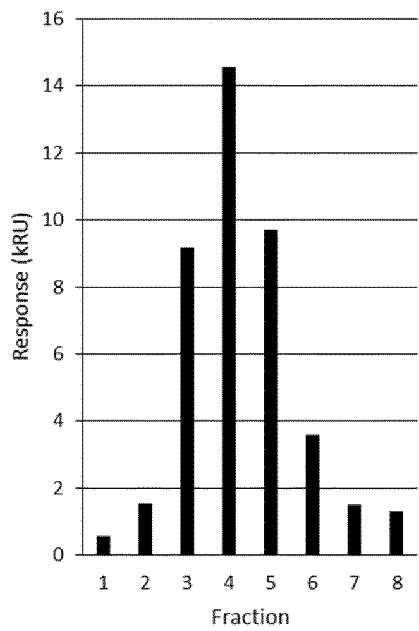
Figure 10C:
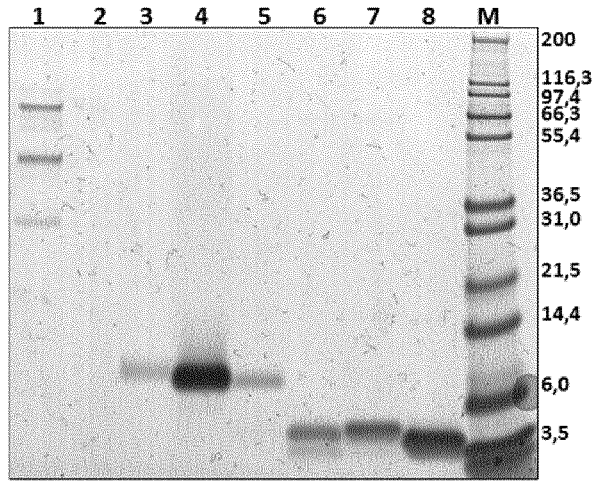
Figure 10D:
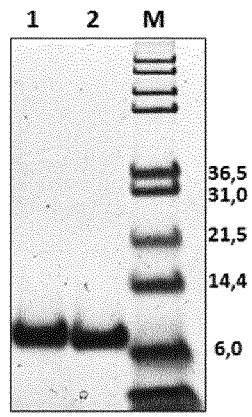

Briefly, *C. sempervirens* pollen (Allergon, Valinge, Sweden) was extracted in 50 mM NaAc, 1 M NaCl pH 4.5 under agitation for 72 hrs at 4° C., clarified by centrifugation, filtered through a Whatman GF/F glass microfiber filter and desalted on a Sephadex G25 column equilibrated with 50 mM NaAc pH 4.5 (FIG. 8). Protein-containing fractions eluting in the void volume were pooled and loaded on an SP Sepharose FF column equilibrated with 50 mM NaAc pH 4.5. Elution was performed with a linear gradient from 0 to 1 M NaCl in the same buffer (FIG. 9a). Nine selected fractions were immobilised on ImmunoCAP solid phase and assayed for anti-Pru p 7 IgG binding activity (FIG. 9b) and analysed by SDS-PAGE (FIG. 9c). Fractions 7-9, which showed the highest binding of anti-Pru p 7 IgG and contained a prominent 7 kDa protein band, were pooled as indicated in FIG. 9a and concentrated on an SP Sepharose HP column. The concentrated pool was further purified by SEC on Superdex 30 pg column, equilibrated with 20 mM NaAc pH 4.5, 250 mM NaCl. Elution was performed with the same buffer (FIG. 10a). Eight selected fractions were immobilised on ImmunoCAP solid phase and tested for anti-Pru p 7 IgG binding activity as described above (FIG. 10b) and analysed by SDS-PAGE (FIG. 10c). The highest binding of anti-Pru p 7 IgG was found in fractions 3-5 which showed a single distinct band at 7 kDa. Hence, fractions 3-5 were pooled as indicated in FIG. 10a and this extensively purified Pru p 7 related *C. sempervirens* pollen protein was analysed biochemically and immunologically as described below. The purified *C. sempervirens* protein showed an apparent molecular weight comparable to that of Pru p 7 (FIG. 10d).

In conclusion, Example 4 describes how a novel *C. sempervirens* pollen protein, hereinafter referred to as Cup s GRP, was purified using a series of chromatographic steps and the anti-Pru p 7 IgG antibodies described in Example 3.

Example 5: Elucidation of the Amino Acid Sequence of Cup s GRP

To establish the identity and primary structure of the 7 kDa *C. sempervirens* pollen protein purified in Example 4, it was analysed by MS/MS on an Orbitrap Fusion Tribrid instrument. Prior to the MS analysis, the protein was reduced by DTT, alkylated with acrylamide and enzymatically cleaved with either trypsin, chymotrypsin or Lys-C. The MS data analysis was made on a combination of the spectra obtained from the three digests of the 7 kDa protein.

No record in the NCBI protein database gave a convincing, full sequence match with the MS data. A search was therefore made against hypothetical translations of nucleotide sequences present in a Cupressaceae EST (expressed sequence tag) database. The best match in this database was record BY878079 (Sequence ID: NO 2), a cDNA sequence from male strobilus of *Cryptomeria japonica* (FIG. 11a). This EST sequence comprised an interrupted open reading frame (nucleotide position 44-397) that was translated into two hypothetical amino acid sequences (FIG. 11b) separated by a stop codon at position 302-304. Four peptides identified by MS/MS gave exact matches to the hypothetical amino acid sequences of BY878079, two on either side of the stop codon, as shown in FIG. 11b. This observation raised the possibility that the stop codon at position 302-304 was the result of a sequencing error.

In support of this notion, an alignment between the interrupted BY878079-derived sequences and the amino acid sequence of Pru p 7 showed a homology that stretched across the stop codon at position 302-304 (not shown). Indeed, if the A in that TGA stop codon were changed to either a T or a C, it would instead encode a cysteine residue, perfectly matching Pru p 7 at the corresponding position. After introducing such an amendment of BY878079 (Seq ID: NO 3), an improved overall match of the MS/MS data was obtained, indicating that the purified Cup s GRP protein indeed had a cystein at the position corresponding to residue 87 of the hypothetical amino acid sequence derived from the amended BY878079 (FIG. 11b).

Using PEAKS Studio software (Bioinformatics Solutions Inc., Ontario, Canada) for analysis of the MS/MS spectra obtained, the complete, 63-residue amino acid sequence of Cup s GRP (FIG. 11c, Seq ID: NO 4) could be determined in four iterative steps. The Cup s GRP sequence differed from the amended BY878079-derived sequence in four further positions, as indicated in FIG. 11c. The MS/MS analysis demonstrated a complete coverage of this amino acid sequence, corresponding to residues 55-117 of the sequence encoded by the amended BY878079 record. Examples of identified peptides being part of this sequence are listed in Table 2a.

Further, re-analysis of MS/MS data using the newly determined Cup s GRP sequence as a target sequence, revealed the presence of polymorphisms at two positions of the Cup s GRP sequence: position 18 (Ala/Leu) and 52 (Asn/His) (FIG. 11c, Table 2b). The Cup s GRP sequence first determined, containing Ala at position 18 and Asn at position 52, is hereinafter referred to as Cup s GRPa whereas a sequence containing both the alternative amino acid, i.e. Leu at position 18 and His at position 52, is referred to as Cup s GRPb (Seq ID: NO 5). In addition to Cup s GRPa and Cup s GRPb, the existence of two other isoforms is conceivable, containing either one or the other of the two alternative amino acids.

The amino acid sequence encoded by EST record BY878079 contained a predicted 24-residue signal peptide (underlined sequence in FIG. 11b). In addition, between that signal peptide and the sequence matching Cups GRP peptide 1 (Pep 1 in FIG. 11b) identified by MS/MS, a stretch of 30 amino acids was present to which no matching Cup s GRP peptide was identified.

In order to determine whether the purified Cup s GRP nevertheless contained such an N-terminal peptide, the protein was subjected to N-terminal sequencing by Edman degradation as described in [43]. The first four amino acid residues of the protein were identified as Ala-Gln-Ile-Asp which exactly matched the N-terminal part of Cup s GRP peptide 1 identified by MS/MS. Hence, while a precursor of Cup s GRP might include a portion corresponding to residues 25-54 of the BY878079-derived sequence, it is cleaved off and no longer present in the mature Cup s GRP protein.

Further evidence of the integrity of the Cup s GRP preparation and corroboration of the newly determined amino acid sequence of the protein was obtained by MS analysis of uncleaved protein, performed after reduction and alkylation of the sample, to determine its intact molecular weight. The analysis revealed a dominant peak at m/z=7682.43, corresponding to a molecular mass of 6828.98 Da of the unmodified protein with all cysteine residues reduced. This is in exact agreement with the monoisotopic molecular mass calculated for the Cup s GRPa sequence (Seq ID: NO 4) with all cysteine residues reduced.

The N-terminal sequence and the whole-mass MS analysis established that the amino acid sequence obtained by MS/MS analysis covers the complete amino acid sequence of the 7 kDa protein purified from C. sempervirens pollen. Analysis of this amino acid sequence of Cup s GRP for Pfam signatures (http://pfam.xfam.org/) confirmed that the protein belongs to the gibberellin regulated protein family, also known as the GASA protein family. GRP sequences are highly conserved across the plant kingdom and both the Cup s GRPa and the Cup s GRPb sequences displayed 68% sequence identity to Pru p 7 (FIG. 11d).

In conclusion, Example 5 describes how the amino acid sequence of Cup s GRP was determined by MS/MS and N-terminal sequencing. By MS analysis, the mass of the intact protein was determined and found to be in perfect agreement with the calculated theoretical mass. The 63-residue sequence was shown to have alternative amino acids in two positions, resulting in four possible isoforms of the protein in its native state.

Example 6: Purification and Amino Acid Sequence Determination of Pru p 7 Related Proteins from *Juniperus ashei* and *Cryptomeria japonica* Pollen The procedure elaborated for the purification of Cup s GRP, described in Example 4 above, was used for the purification of corresponding proteins from pollen of two other Cupressaceae species, *Juniperus ashei* and *Cryptomeria japonica*.

Figure 12A:
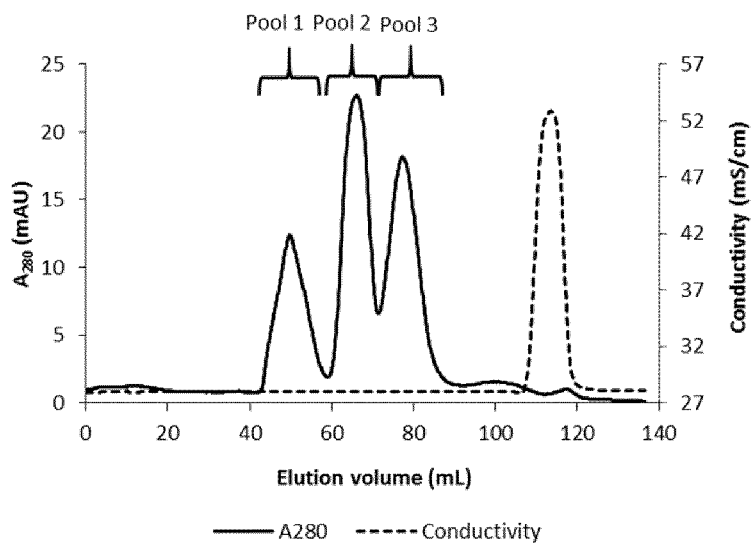
FIG. 12 shows the third and final purification step of nJun a GRP by size exclusion chromatography. a) Chromatogram with absorbance at 280 nm ($A_{280}$) and conductivity indicated by solid and hatched lines, respectively. Brackets indicate pooled fractions of the three absorbance peaks (pool 1-3) shown in the chromatogram. b) SDS-PAGE analysis of selected fractions from the size exclusion chromatography shown in FIG. 12*a*. Fractions comprising pools 1-3 are indicated by brackets. Molecular weights of marker proteins (lane M) are indicated to the right. c) Bar diagram showing levels of rabbit anti-Pru p 7 IgG binding by the three pools indicated in FIG. 12*a*.
Figure 12B:
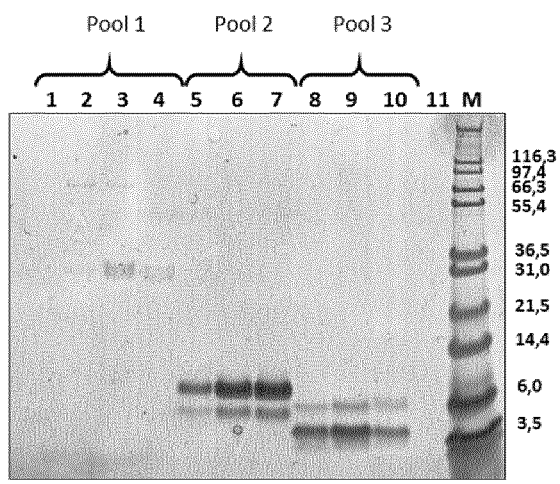
Figure 12C:
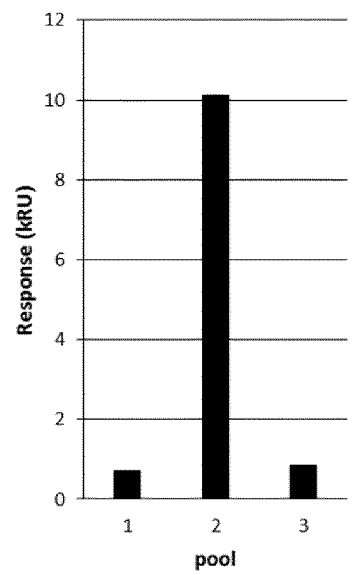

Pollen from *J. ashei* was extracted and subjected to the purification and monitoring steps described. In the third purification step, SEC was used to resolve proteins present in a concentrated pool of fractions from the previous cation exchange chromatography step. Three prominent peaks eluted from the SEC column (FIG. 12a) and analysis of individual fractions by SDS-PAGE (FIG. 12b) revealed distinctly different protein bands in each of the three peaks. The three peaks were pooled separately as indicated in FIG. 12a, coupled to ImmunoCAP solid phase and analysed for their ability to bind rabbit anti-Pru p 7 IgG antibodies (FIG. 12c).

Peak 2 was found to contain a dominant protein band at approximately 7 kDa and showed strong antibody binding activity. This protein preparation from *J. ashei* pollen, hereinafter referred to as Jun a GRP, was analysed biochemically and immunologically as described below.

Figure 13A:
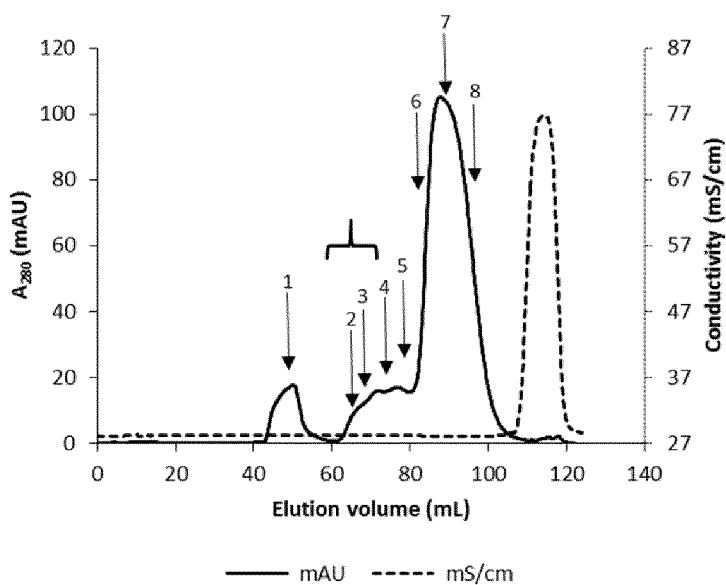
FIG. 13 shows the third and final purification step of nCry j GRP by size exclusion chromatography. a) Chromatogram with absorbance at 280 nm ($A_{280}$) and conductivity indicated by solid and hatched lines, respectively. Arrows indicate fractions selected for analysis by SDS-PAGE and binding of rabbit anti-Pru p 7 IgG. Bracket indicates fractions pooled for further purification. b) SDS-PAGE analysis of the fractions indicated in FIG. 13*a*. Molecular weights of marker proteins (lane M) are indicated to the right. c) Bar diagram showing levels of rabbit anti-Pru p 7 IgG binding by the fractions indicated in FIG. 13*a*.
Figure 13B:
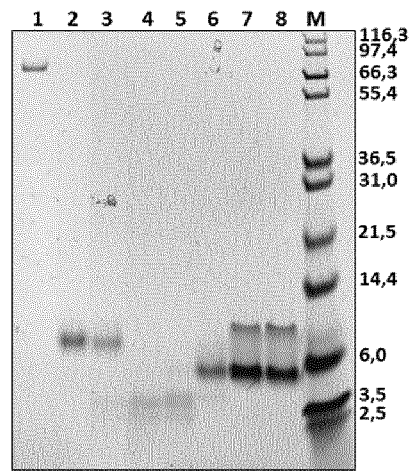
Figure 13C:
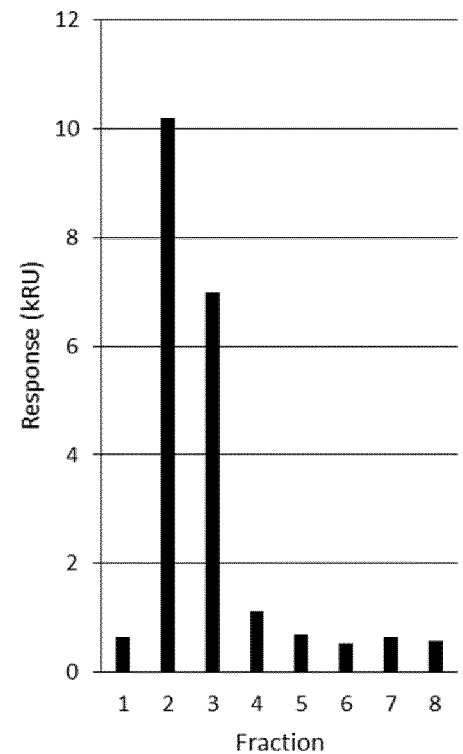

Similarly, an extract of pollen from *C. japonica* was prepared, desalted and subjected to cationic exchange chromatography. Fractions displaying antibody binding activity were pooled and applied to SEC (FIG. 13a). This SEC chromatogram showed a more complex appearance than that obtained with *J. ashei* pollen extract. Selected fractions were analysed by SDS-PAGE and for binding of anti-Pru p 7 IgG. The analyses revealed a protein band of approximately 7 kDa in fractions 2 and 3 (FIG. 13b, lane 2 and 3) and these fractions also displayed strong antibody binding activity (FIG. 13c). Based on the results, fractions 2 and 3 were pooled, as indicated by a bracket in FIG. 13a. This protein preparation from *C. japonica* pollen, hereinafter referred to as Cry j GRP, was analysed biochemically and immunologically as described below.

The Jun a GRP preparation was analysed by MS/MS analysis on an Orbitrap Fusion Tribrid instrument after sample preparation as described in Example 5. Again, the best database match of the obtained MS/MS spectra was EST record BY878079 (FIG. 11a, Seq ID: NO 2). FIG. 14a shows an amended version of BY878079 where the erroneous TGA stop codon at position 302-304, identified as such in Example 5, has been replaced by a cysteine codon TGY (Seq ID: NO 3), where Y represents C or T as defined by the IUPAC ambiguity code system [44]. In FIG. 14b, the amino acid sequence encoded by nucleotides 44-394 of the modified BY878079 (Seq ID: NO 6) is shown and Jun a GRP peptides identified by MS/MS are aligned below.

Using the PEAKS Studio software for analysis of the MS/MS spectra obtained, the complete amino acid sequence of Jun a GRP (FIG. 14c, Sequence ID: NO 6) could be determined in four iterative steps. The Jun a GRP sequence differed from the amended BY878079-derived sequence at five positions, as indicated in FIG. 14c. The MS/MS analysis demonstrated a complete coverage of this amino acid sequence, corresponding to residues 55-117 of the sequence encoded by the amended BY878079 record. Examples of identified peptides representing this sequence are listed in Table 2c. No polymorphism was detected in the analysis and the sequence displayed 67% identity to Pru p 7 (FIG. 14d).

Evidence of the integrity of the Jun a GRP preparation and corroboration of its newly determined amino acid sequence were obtained by MS analysis of the uncleaved protein, performed after reduction of the sample with Tris(2-carboxyethyl)phosphine (TCEP). The analysis revealed a dominant peak at m/z=6829.04, corresponding to a molecular mass of 6828.03 Da. This is in exact agreement with the monoisotopic mass calculated for the Jun a GRP sequence with all cysteine residues reduced, Seq ID: NO 6.

The Cry j GRP preparation was analysed by MS/MS on an Orbitrap Fusion Tribrid instrument after sample preparation as described in Example 5. The best database match of the obtained MS/MS spectra was EST record BY900480, a cDNA sequence from male strobilus of *C. japonica* (FIG. 15a, Seq ID: NO 7). In FIG. 15b, the translated amino acid sequence of the open reading frame spanning nucleotide positions 15-365 of BY900480 is shown and Cry j GRP peptides identified by MS/MS are aligned below. A listing of selected Cry j GRP peptides identified by MS/MS, representing the entire protein, is shown in Table 2d. The complete amino acid sequence of Cry j GRP is shown in FIG. 15c, Seq ID: NO 8. No polymorphism was detected in the analysis and the sequence displayed 68% identity to Pru p 7 (FIG. 15d).

As in the case of Cup s GRP and Jun a GRP, Cry j GRP lacked the first 54 residues of the amino acid sequence encoded by the best matching database record. Again, the first 24 residues comprise a predicted signal peptide and the following 30 residues are concluded to represent a propeptide cleaved off during protein maturation.

Evidence of the integrity of the Cry j GRP preparation and corroboration of its newly determined amino acid sequence were obtained by MS analysis of the uncleaved protein, performed after reduction of the sample with TCEP. The analysis revealed a large peak at m/z=6895.96, corresponding to a molecular mass of 6894.95 Da. This is in exact agreement with the monioisotopic molecular mass calculated for the Cry j GRP sequence with all cysteine residues reduced, Seq ID: NO 8.

The three Cupressaceae pollen-derived GRP sequences, Cup s GRP, Jun a GRP and Cry j GRP share 90-98% sequence identity (FIG. 16a-b) and have the same electrophoretic mobility in SDS-PAGE (FIG. 16c).

In conclusion, Example 6 describes the purification, amino acid sequence determination and mass determination of the Pru p 7-related pollen proteins Jun a GRP and Cry j GRP from *J. ashei* and *C. japonica*, respectively.

Example 7: Cloning and Purification of Two Recombinant Cups GRP Isoforms

Synthetic genes designed to encode the amino acid sequence of Cup s GRPa and Cup s GRPb from Example 5 were cloned into a expression vector pPICZa A and transformed into *Pichia pastoris* strain X-33. The two recombinant proteins were expressed and purified using the same procedures as those described for rPru p 7 in Example 2. MS/MS analysis confirmed the identity and integrity of the purified recombinant proteins. A comparison of the two recombinant isoforms of Cup s GRP, nCup s GRP and rPru p 7 by SDS-PAGE demonstrated a nearly identical electrophoretic appearance of the four protein preparations, with an apparent molecular weight of 7 kDa (FIG. 17).

In conclusion, Example 7 describes the cloning and purification of two recombinant isoforms of Cup s GRP, representing two of the amino acid sequence variants determined in Example 5.

Example 8: IgE Binding Activity of Native and Recombinant Cup s GRP in Comparison with rPru p 7

Figure 18:
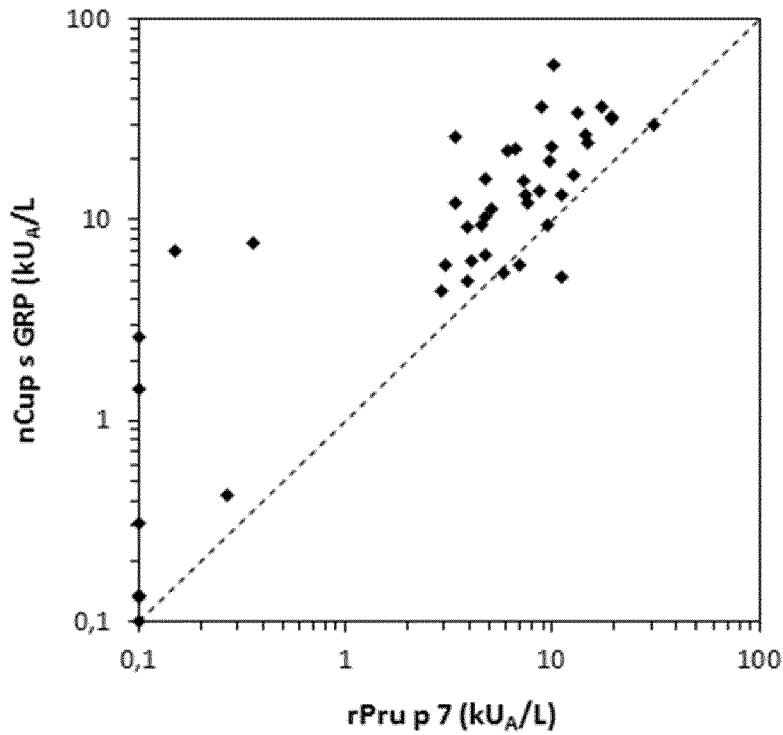
FIG. 18 shows a comparison of IgE binding to rPru p 7 and nCup s GRP among 44 peach allergic subjects. Values below the assay's 0.1 $kU_A/L$ limit of quantitation (LoQ) were set to 0.1 $kU_A/L$. Hatched diagonal line indicates 1:1 slope.

IgE antibody binding to purified nCup s GRP among sera of 44 peach allergic subjects was analysed by ImmunoCAP, in comparison to rPru p 7 (FIG. 18). Of the 44 sera tested, 43 (98%) had a detectable IgE response (0.1 kU$_A$/L) to nCup s GRP and 38 (86%) to rPru p 7. Five of the six sera that tested negative to rPru p 7 displayed a positive IgE response to nCup s GRP. The levels of IgE binding to nCup s GRP and rPru p 7 were significantly correlated (r=0.68) and the median binding was approximately twofold higher to nCup s GRP. The analysis demonstrated that Cup s GRP and Pru p 7 are immunologically related but also that Pru p 7 carries an incomplete epitope representation in comparison to Cup s GRP.

Figure 19A:
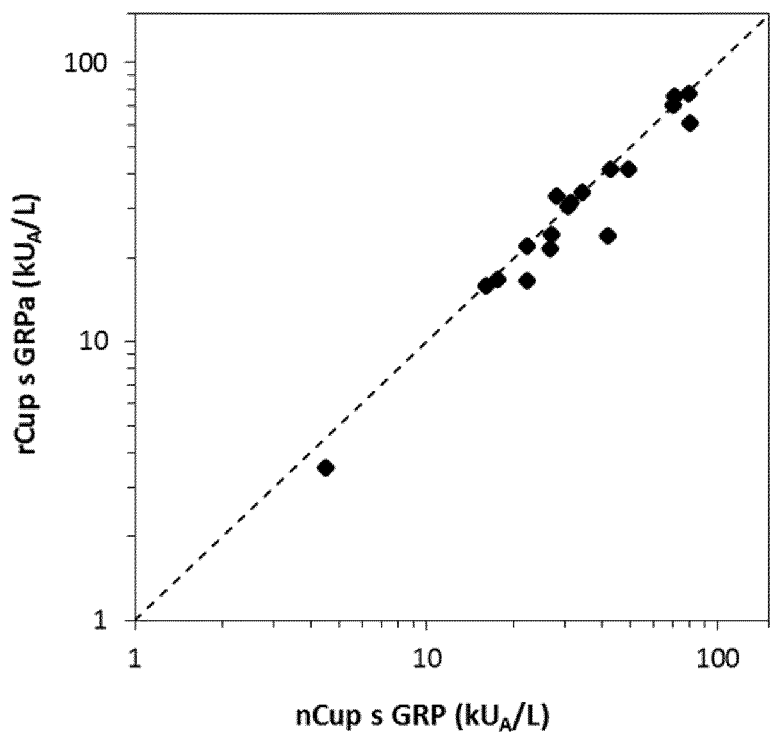
FIG. 19 shows a comparison of IgE binding to nCup s GRP and the two variants of recombinant Cup s GRP among 18 peach allergic subjects. a) rCup s GRPa vs. nCup s GRP and b) rCup s GRPb vs. nCup s GRP. c) rCup s GRPb vs. rCup s GRPa. Hatched diagonal lines indicate 1:1 slope.
Figure 19B:
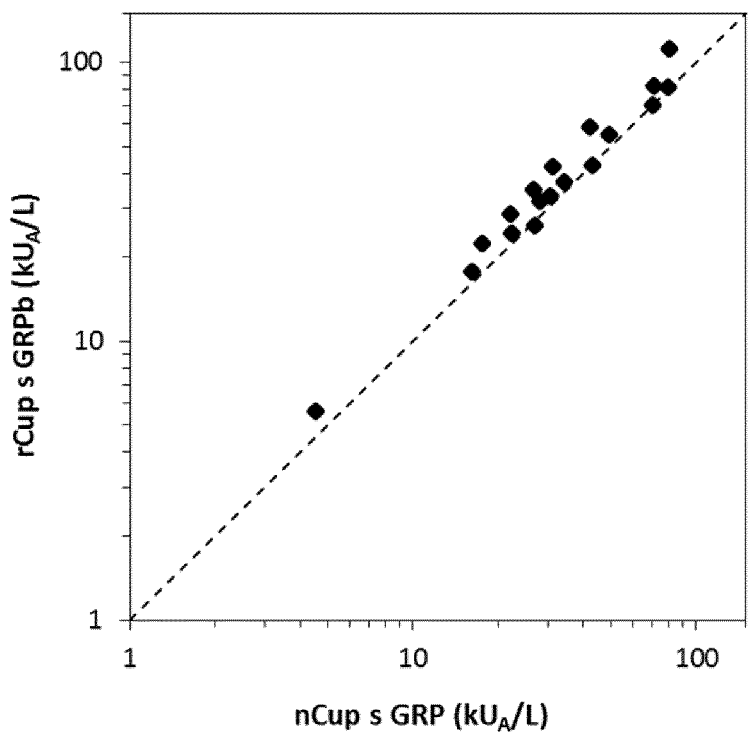
Figure 19C:
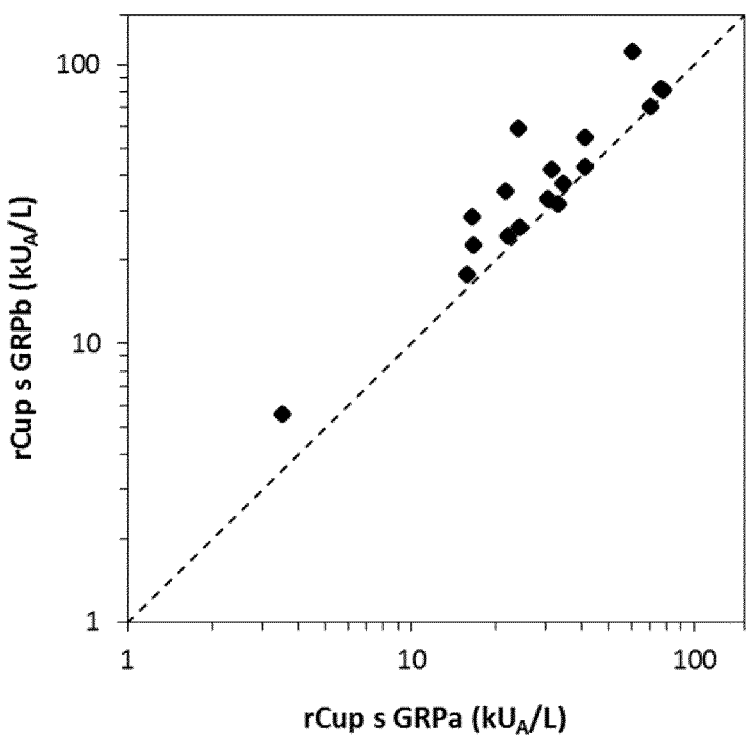

To assess the immunological activity and authenticity of the two recombinant Cup s GRP proteins produced, a comparison of IgE binding activity with nCup s GRP was performed by ImmunoCAP using sera of 19 peach allergic subjects. The data shown in FIGS. 19a and 19b revealed essentially equivalent IgE binding activity of both rCup s GRPa (Seq ID: NO 3) and rCup s GRPb (Seq ID: NO 4) in comparison to nCup s GRP (r=0.98 and r=0.99, respectively), with a slightly higher IgE binding to rCup s GRPb than to rCup s GRPa. The results provide evidence for both structural and immunological authenticity of the recombinant Cup s GRP proteins.

In conclusion, Example 8 confirms the immunological relationship between peach allergen Pru p 7 and *C. sempervirens* pollen protein Cup s GRP first established by rabbit IgG antibodies also in regard to recognition by human IgE antibodies. Secondly, the higher IgE level of IgE binding to Cup s GRP than to Pru p 7 suggests that Cup s GRP may act as a primary sensitizer, eliciting IgE antibodies cross-reacting with Pru p 7.

Example 9: Cross-Reactivity Between Pru p 7 and Cup s GRP

In order to further characterize the immunological relationship between Pru p 7 and Cup s GRP, IgE competition experiments were performed. Four Pru p 7 reactive human sera were combined separately with nCup s GRP or rCup s GRPb at a final concentration of 20 µg/mL, or with dilution buffer alone at the same volume proportion, serving as a negative control. Following incubation for 2 hrs at room temperature to allow for antibody/antigen complex formation, all samples were tested for IgE binding to Pru p 7 by ImmunoCAP. The level of inhibition of IgE binding to Pru p 7 by nCup s GRP and rCup s GRPb was calculated as percentage of the dilution buffer control.

Figure 20:
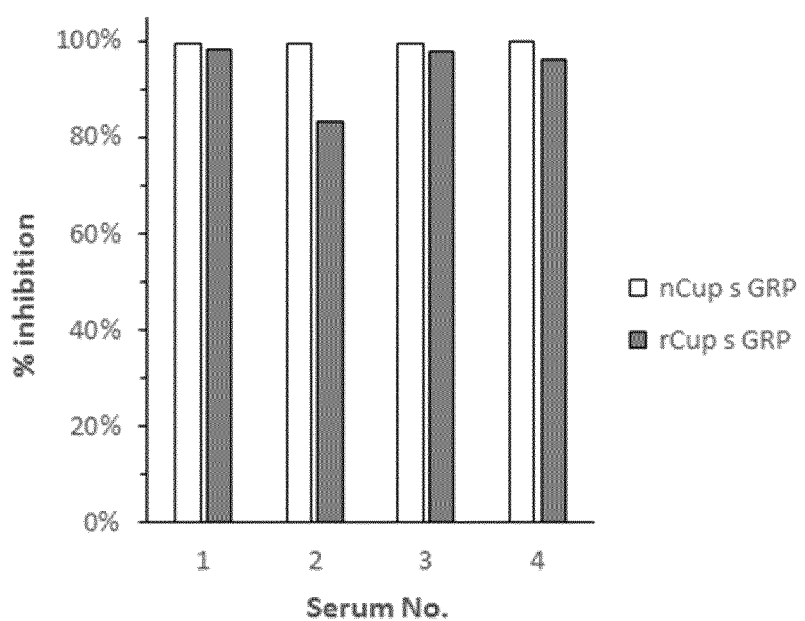
FIG. 20 shows inhibition of IgE binding to rPru p 7 by native and recombinant Cup s GRPb in sera of four different subjects. Results are expressed as percent of a dilution buffer control.

The results of the experiments are shown in FIG. 20. In three of the four sera tested, both nCup s GRP and rCup s GRPb caused essentially complete inhibition of IgE binding to rPru p 7. Also in the fourth serum, IgE binding to rPru p 7 was completely outcompeted by nCup s GRP whereas rCup s GRPb caused approximately 80% inhibition. In a separate control experiment, it was ascertained that nCup s GRP exerted no inhibitory effect on IgE binding to the unrelated birch pollen allergen Bet v 1, confirming the specificity of its effect on IgE binding to Pru p 7.

In conclusion, the IgE competition experiments demonstrate that the correlation in IgE binding to Pru p 7 and Cup s GRP is truly caused by antibody recognition of epitope structures common to the two proteins rather than covariation for other reasons.

Example 10: Immunological Similarity Between Cups GRP, Jun a GRP and Cry j GRP

Figure 21A:
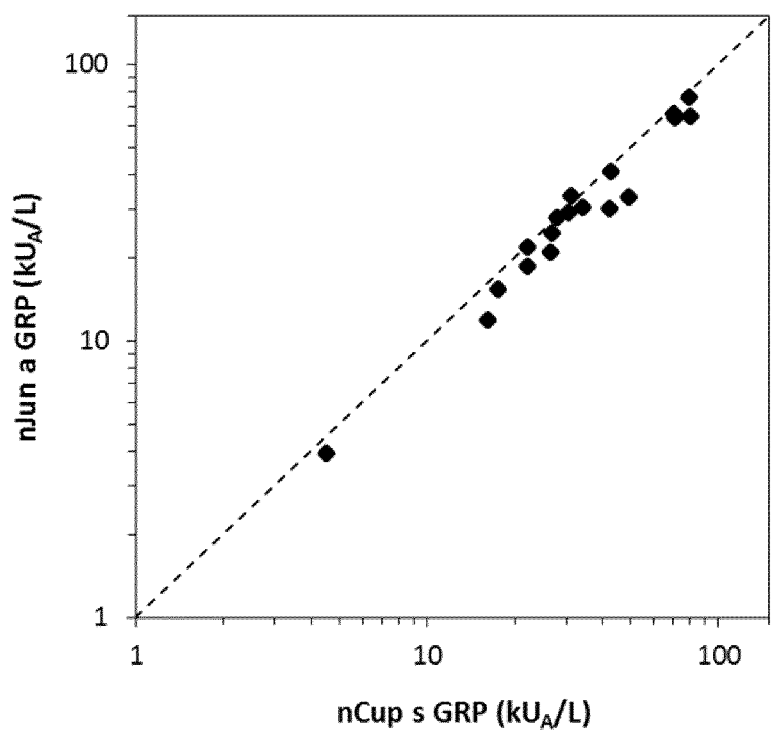
FIG. 21 shows pairwise comparison of IgE binding to a) nJun a GRP and nCup s GRP, b) nCry j GRP and nCup s GRP and c) nCry j GRP and nJun a GRP among 18 peach allergic subjects. Hatched diagonal lines indicate 1:1 slope.
Figure 21B:
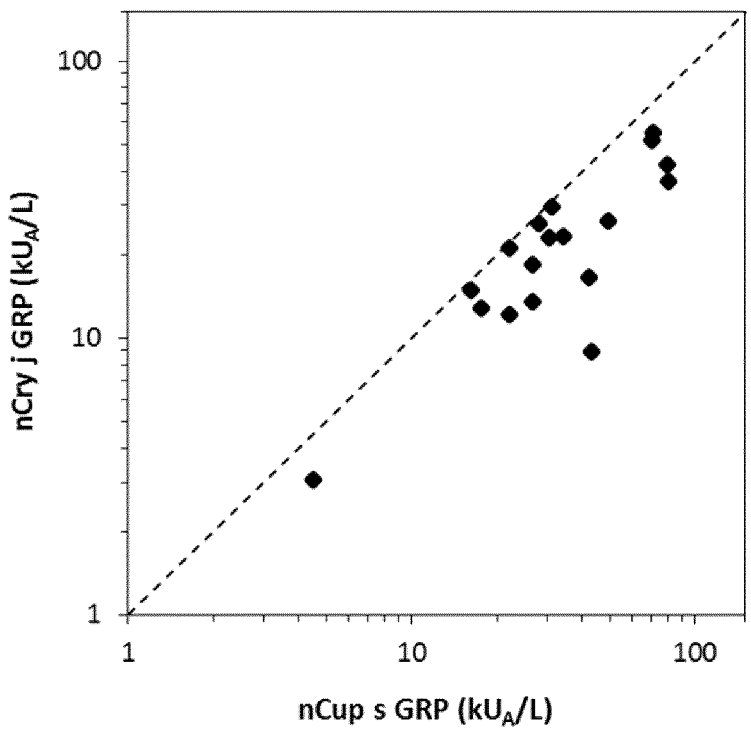
Figure 21C:
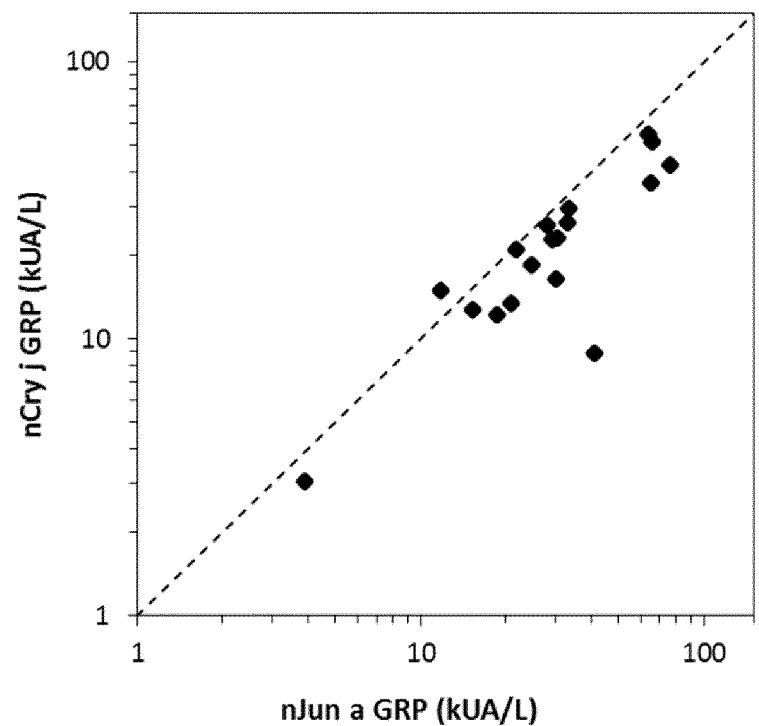

The degree of immunological similarity between the three native Cupressaceae pollen GRPs identified and purified in this work was assessed in a comparative IgE binding analysis. Each of the tree allergen was coupled to ImmunoCAP solid phase and the assays were used to measure IgE antibody binding in sera of eighteen peach allergic subjects. The comparisons are displayed in FIGS. 21a-c. The levels of IgE binding to nCup s GRP and nJun a GRP (FIG. 21a) were found to be very highly correlated (r=0.98), with a trend towards slightly higher binding to nCup s GRP (median level ratio 1.12). nCup a GRP and nCry j GRP (FIG. 21b) also showed a strong correlation in IgE binding (r=0.84), albeit with a somewhat higher binding to nCup s GRP (median level ratio 1.46), possibly reflecting a lack of primary sensitization to *C. japonica* pollen in the subjects whose sera were used in the analysis. Comparison of nJun a GRP and nCry j GRP (FIG. 21c) showed a similar correlation (r=0.87) in IgE binding but again with a slightly lower binding to nCry j GRP (median level ratio 1.28).

This example demonstrates that the four proteins (>90% sequence identity) from the GRP protein family have very similar IgE reactivity. This supports the observations made for other small allergenic proteins of high sequence identity, that despite small variations in amino acid sequence, the IgE reactivity remains essentially the same. See further Example 12, which also demonstrates that IgE reactivity, due to cross reactivity, is very similar among closely related proteins within the same protein family.

Figure 22:
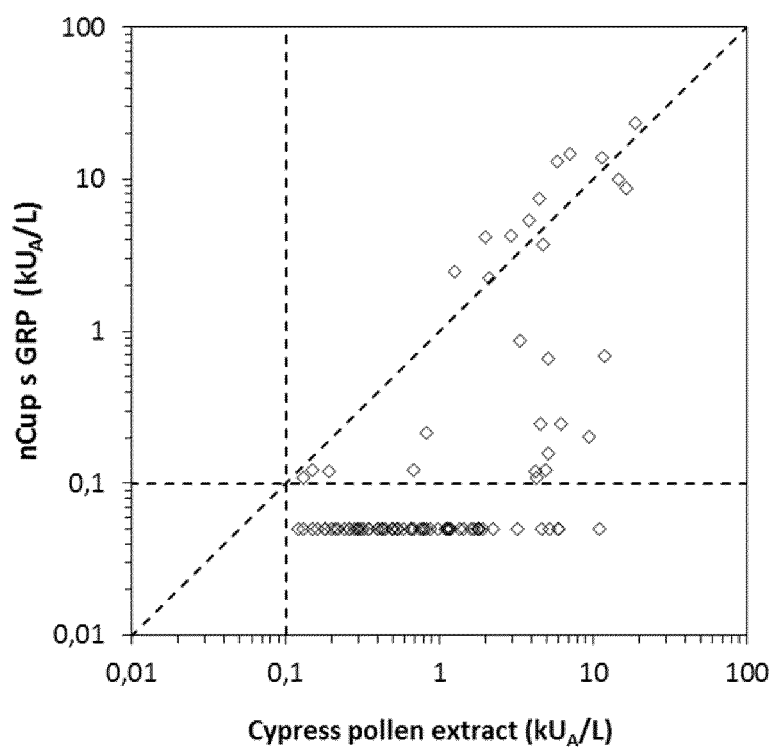
FIG. 22 shows the prevalence and level of IgE antibodies to nCup s GRP in sera of 88 subjects sensitized to cypress pollen. Values below the assay's 0.1 $kU_A/L$ limit of quantitation (LoQ) (marked by hatched vertical and horizontal lines) were set to 0.05 $kU_A/L$. Hatched diagonal line indicates 1:1 slope.

Example 11: Prevalence of Sensitization to Cup s GRP Among Subjects with Cypress Pollinosis IgE antibody binding to purified nCup s GRP among sera of 88 cypress pollen sensitised subjects (t23>0.1 kU$_A$/L) was analysed by ImmunoCAP (FIG. 22). Of these sera, 28 (32%) had a detectable IgE response (0.1 kU$_A$/L) to nCup s GRP. In thirteen (15%) of the sera, similar levels of IgE to nCup s GRP and cypress pollen extract was observed, indicating a dominant role of Cup s GRP in cypress pollen sensitization in this subset of subjects.

The analysis suggests that approximately one third of cypress pollen sensitised subjects have a sensitization profile conferring a risk of allergic reactions to foods containing proteins homologous to Cupressaceae pollen GRPs. Such individuals can be identified using an IgE test comprising a suitable representative Cupressaceae pollen GRPs.

More specifically, a molecular analysis of the pollinosis patients, unselected with respect to peach allergy, showed that only one third of these individuals had detectable IgE to Cup s GRP while a two thirds majority lacked sensitization to this allergen. This finding reveals that Cup s GRP is a minor allergen in cypress pollen and suggests that an identifiable subgroup of cypress pollen sensitized patients will be at risk of allergic reactions to peach or other GRP-containing foods. Considering the substantial absolute number of individuals comprising this subgroup in areas of high Cupressaceae pollen exposure and the potential severity of GRP-mediated food allergic reactions, identification of those with GRP sensitization would be a valuable step of risk reduction in the management of this patient group. To this end, generation of a fully immunoreactive recombinant Cup s GRP suitable as a reagent for in vitro diagnostic use, as described in Example 7, is a first important step.

Figure 23A:
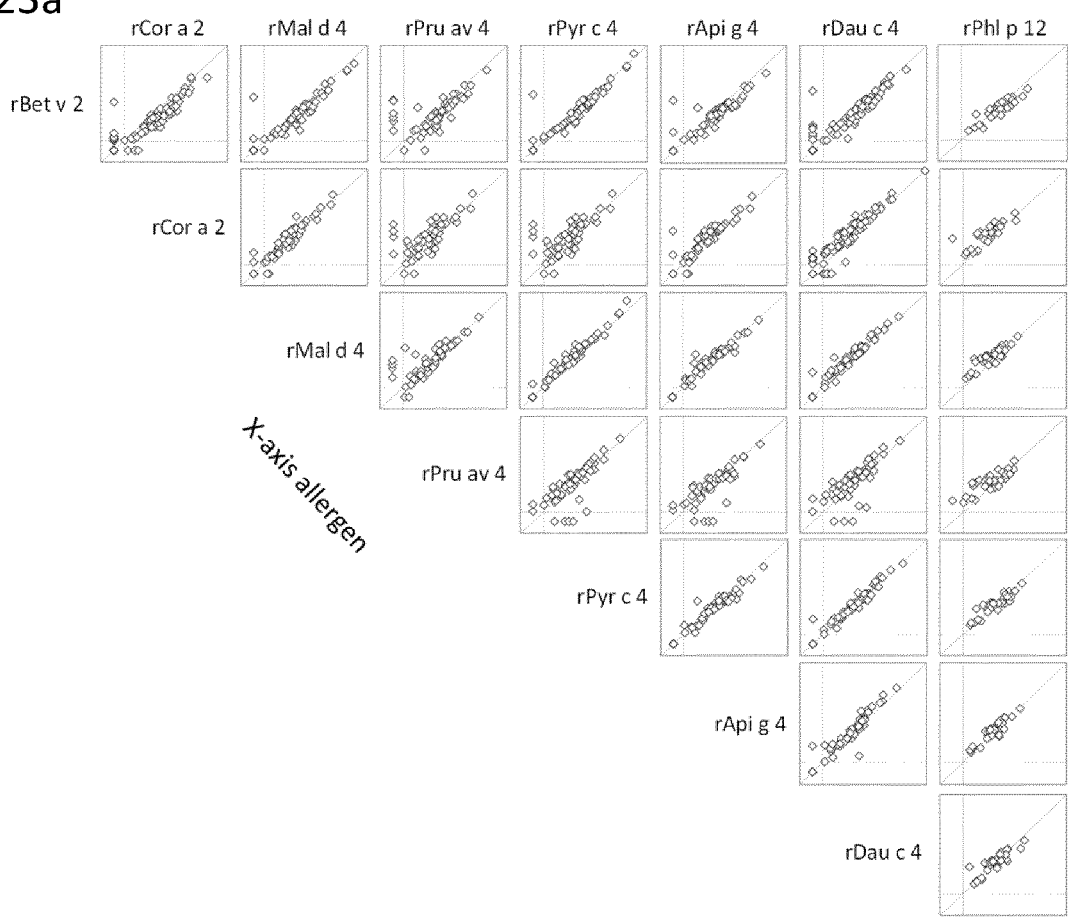
FIG. 23 shows immunological and sequence comparisons between the profilins Bet v 2, Cor a 2, Mal d 4, Pru av 4, Pyr c 4, Api g 4, Dau c 4 and Phl p 12. a) Pairwise comparisons of IgE binding to the different profilins. Hatched horizontal and vertical lines indicate the 0.35 $kU_A/L$ level and diagonal lines indicate 1:1 slope. b) Pairwise sequence comparisons, showing percent sequence identity.

Example 12: Analysis of IgE Reactivity of Closely Related Proteins From the Same Protein Family—Profilins In an attempt to demonstrate the interchangeability of similar allergens, eight different profilin proteins from different allergen sources were compared. Recombinant profilins from birch (rBet v 2), hazelnut (Cor a 2), apple (Mal d 4), cherry (Pru av 4), pear (Pyr c 4), celery (Api g 4), carrot (Dau c 4) and timothy grass (Phl p 12) were immobilized to immunoCAP and tested using a number of sera. Comparison of IgE reactivity between each pair of proteins demonstrated strong correlations and very similar IgE binding activity of all tested proteins for the vast majority of sera tested (FIG. 23a).

The sequences of these proteins were pairwise aligned using the Emboss needle program [45] (FIG. 23b). The pairwise sequence identity ranged between 74% and 93% among these proteins.

When the sequence data were analyzed by a structure predicting program, such as Phyre2 [46], it could be concluded that all these eight sequences conform to folded structures close to those determined experimentally for profilins (data not shown).

The IgE data are well in line with those of Scheurer et al. where four of these profilins were compared [47]. In that study, Bet v 2, Pru av 4, Pyr c 4 and Api g 4 were compared and it was concluded that these proteins presented almost identical allergenic properties in cellular mediator release tests. The pairwise sequence identity of these four proteins varied between 76 and 86%. Similar conclusions and further evidence of the high cross reactivity among profilins were presented in a study by Villalta et al [48].

In conclusion, this example demonstrates that IgE reactivity is, due to cross reactivity, very similar among closely related proteins within the same protein family. In this study, the proteins were soluble and folded proteins of small size, with a pairwise sequence identity of around 80%. Although the studies described above were all performed with naturally occurring protein variants, it is highly likely that also artificial variants of these proteins with a high sequence identity to a specific profilin will demonstrate highly similar IgE reactivity, provided that the variant is a soluble folded protein. Artificial variants of profilins that are still soluble and folded may be designed by a limited number of amino acid substitutions in positions where the amino acid is not phylogenetically conserved. If such substitutions are made with amino acids that occur in other profilins at any such position, this will increase the likelihood of producing a soluble folded protein.

Example 13: Analysis of the Experimentally Determined Sequences of GRP From Pollen of Different Cupressaceae Species The four sequences to which we have assigned similar IgE antibody binding reactivity were aligned, (FIG. 24). From these four sequences we could construct a Cupressaceae pollen GRP consensus sequence where all non-conserved amino acids are marked with an X.

Furthermore, a BLAST search using this consensus sequence was performed, identifying all known sequences that have homology to this consensus sequence. Notably, there are no known sequences that show more than 70% (44/63) amino acid identity to this Cupressaceae pollen GRP consensus sequence, indicating that the sequences from Cupressaceae pollen identified here are phylogenetically relatively distant from GRP proteins present in foods, such as Pru p 7.

A multiple sequence alignment was done using a selection of 37 recorded sequences having a sequence identity to the consensus sequence of more than 59% (37/63). From this multiple sequence alignment (FIG. 25), made using the clustal omega program, 22 highly conserved amino acids were identified that were identical in all sequences analysed, as indicated in row C of FIG. 26. Amino acid exchanges in these positions may result in structural changes that could affect the protein's IgE binding capacity. In addition, 20 amino acids were identical between Pru p 7 and the phylogenetically relatively distant Cupressaceae pollen consensus sequence, see row B of FIG. 26. Amino acid exchanges in these positions will have a high probability of inducing structural changes that would affect the protein's IgE binding capacity. Finally, there are 14 amino acid residues that differ between Cupressaceae pollen consensus sequence and Pru p 7, indicated by Z in row A of FIG. 26. Amino acid substitution of any one or more of these 14 amino acid positions Z, to an amino acid residue that occurs in phylogenetically related proteins, as listed in table 3, would much likely not disturb the overall structure of the protein.

From these sequences, we designed a Cupressaceae Pru p 7 GRP consensus sequence (SEQ ID NO:52) where all amino acids that are either non-conserved among Cupressaceae pollen GRP or are non-conserved among Cupressaceae pollen and Pru p 7 GRP are indicated by X (FIG. 26 and SEQ ID NO:52).

By examination of the alignment shown in FIG. 25, we could determine all of the amino acids that have been used in the phylogenetically non-conserved positions (the 21 X positions in FIG. 26) of Cupressaceae—Pru p 7 GRP consensus sequence. In table 3, these phylogenetically tested amino acids are listed, including those determined experimentally from our Cupressaceae pollen GRP sequences (FIG. 24).

REFERENCES

1. Matricardi, P. M., et al., *EAACI Molecular Allergology User's Guide*. 2016. p. 1-401.
2. Akdis, C. A., *Allergy and hypersensitivity: mechanisms of allergic disease*. Curr Opin Immunol, 2006. 18(6): p. 718-26.
3. Wainstein, B. K., et al., *Combining skin prick, immediate skin application and specific-IgE testing in the diagnosis of peanut allergy in children*. Pediatr Allergy Immunol, 2007. 18(3): p. 231-9.
4. Valenta, R., et al., *The recombinant allergen-based concept of component-resolved diagnostics and immunotherapy* (*CRD and CRIT*). Clinical and Experimental Allergy, 1999. 29(7): p. 896-904.
5. Asarnoj, A., et al., *IgE to peanut allergen components: relation to peanut symptoms and pollen sensitization in* 8-*year-olds*. Allergy, 2010. 65(9): p. 1189-95.
6. Asarnoj, A., et al., *Peanut component Ara h* 8 *sensitization and tolerance to peanut*. J Allergy Clin Immunol, 2012. 130(2): p. 468-72.
7. Matsuo, H., et al., *Sensitivity and specificity of recombinant omega*-5 *gliadin-specific IgE measurement for the diagnosis of wheat-dependent exercise-induced anaphylaxis*. Allergy, 2008. 63(2): p. 233-6.
8. Nicolaou, N., et al., *Allergy or tolerance in children sensitized to peanut: prevalence and differentiation using component-resolved diagnostics*. J Allergy Clin Immunol, 2010. 125(1): p. 191-7 e1-13.
9. Codreanu, F., et al., *A novel immunoassay using recombinant allergens simplifies peanut allergy diagnosis*. Int Arch Allergy Immunol, 2011. 154(3): p. 216-26.
10. Ebisawa, M., et al., *Measurement of Ara h* 1-, 2-, and 3-*specific IgE antibodies is useful in diagnosis of peanut allergy in Japanese children*. Pediatr Allergy Immunol, 2012. 23(6): p. 573-581.
11. Masthoff, L. J., et al., *Sensitization to Cora* 9 and Cora 14 *is highly specific for a hazelnut allergy with objective symptoms in Dutch children and adults*. J Allergy Clin Immunol, 2013. 132(2): p. 393-9.
12. Savvatianos, S., et al., *Sensitization to cashew nut* 2*S albumin, Ana o* 3, *is highly predictive of cashew and pistachio allergy in Greek children*. J Allergy Clin Immunol, 2015. 136(1): p. 192-4.
13. Lange, L., et al., *Ana o* 3-*specific IgE is a good predictor for clinically relevant cashew allergy in children*. Allergy, 2017. 72(4): p. 598-603.
14. Stumvoll, S., et al., I*dentification of cross-reactive and genuine Parietaria judaica pollen allergens*. Journal of Allergy and Clinical Immunology, 2003. 111(5): p. 974-979.
15. Jutel, M., et al., *Allergen-specific immunotherapy with recombinant grass pollen allergens*. J Allergy Clin Immunol, 2005. 116(3): p. 608-13.
16. Cromwell, O., et al., *Strategies for recombinant allergen vaccines and fruitful results from first clinical studies*. Immunol Allergy Clin North Am, 2006. 26(2): p. 261-81, vii.
17. Nony, E., et al., *Development and evaluation of a sublingual tablet based on recombinant Bet v* 1 *in birch pollen-allergic patients*. Allergy, 2015. 70(7): p. 795-804.
18. Gronlund, H., et al., *The Major Cat Allergen, Fel d* 1, *in Diagnosis and Therapy*. Int Arch Allergy Immunol, 2009. 151(4): p. 265-274.
19. Akdis, M. and C. A. Akdis, *Mechanisms of allergen-specific immunotherapy*. J Allergy Clin Immunol, 2007. 119(4): p. 780-91.
20. Uermosi, C., et al., *Mechanisms of allergen-specific desensitization*. J Allergy Clin Immunol, 2010. 126(2): p. 375-83.
21. Uermosi, C., et al., *IgG-mediated down-regulation of IgE bound to mast cells: a potential novel mechanism of allergen-specific desensitization*. Allergy, 2014. 69(3): p. 338-47.
22. Pablos, I., et al., *Pollen Allergens for Molecular Diagnosis*. Curr Allergy Asthma Rep, 2016. 16(4): p. 31.
23. Asam, C., et al., *Tree pollen allergens-an update from a molecular perspective*. Allergy, 2015. 70(10): p. 1201-11.
24. Charpin, D., et al., *Cypress Pollinosis: from Tree to Clinic*. Clin Rev Allergy Immunol, 2019. 56(2): p. 174-95.
25. Scala, E., et al., *Cross-sectional survey on immunoglobulin E reactivity in* 23,077 *subjects using an allergenic molecule-based microarray detection system*. Clin Exp Allergy, 2010. 40(6): p. 911-21.
26. Aceituno, E., et al., *Molecular cloning of major allergen from Cupressus arizonical pollen: Cup a* 1. Clinical and Experimental Allergy, 2000. 30(12): p. 1750-1758.
27. Cortegano, I., et al., *Cloning and expression of a major allergen from Cupressus arizonica pollen, Cup a* 3, a PR-5 *protein expressed under polluted environment*. Allergy, 2004. 59(5): p. 485-490.
28. Pico de Coana, Y., et al., *Molecular cloning and characterization of Cup a* 4, *a new allergen from Cupressus arizonica*. Biochem Biophys Res Commun, 2010. 401(3): p. 451-7.
29. Mattsson, L., et al., *Molecular and immunological characterization of Can f* 4: *a dog dander allergen cross-reactive with a* 23 *kDa odorant-binding protein in cow dander*. Clin Exp Allergy, 2010. 40(8): p. 1276-87.
30. Rashid, R. S., et al., *Pollen-food syndrome is related to Bet v* 1/*PR*-10 *protein sensitisation, but not all patients have spring rhinitis*. Allergy, 2011. 66(10): p. 1391-2.
31. Worm, M., et al., *Food allergies resulting from immunological cross-reactivity with inhalant allergens: Guidelines from the German Society for Allergology and Clinical Immunology* (*DGAKI*), *the German Dermatology Society* (*DDG*), *the Association of German Allergologists* (*AeDA*) *and the Society for Pediatric Allergology and Environmental Medicine* (*GPA*). Allergo J Int, 2014. 23(1): p. 1-16.
32. Rosace, D., et al., *Profilin-mediated food-induced allergic reactions are associated with oral epithelial remodeling*. J Allergy Clin Immunol, 2019. 143(2): p. 681-690 el.
33. Hugues, B., A. Didierlaurent, and D. Charpin, *Cross-reactivity between cypress pollen and peach: a report of seven cases*. Allergy, 2006. 61(10): p. 1241-3.

34. Tuppo, L., et al., *Peamaclein—A new peach allergenic protein: similarities, differences and misleading features compared to Pru p 3*. Clin Exp Allergy, 2013. 43(1): p. 128-40.
35. Inomata, N., et al., *Identification of peamaclein as a marker allergen related to systemic reactions in peach allergy*. Ann Allergy Asthma Immunol, 2014. 112(2): p. 175-177 e3.
36. Klingebiel, C., et al., *Pru p 7 sensitisation is a predominant cause of severe, cypress pollen-associated peach allergy*. Clin Exp Allergy, 2019. 49(4): p. 526-36.
37. Senechal, H., et al., *A new allergen family involved in pollen food-associated syndrome: Snakin/gibberellin-regulated proteins*. J Allergy Clin Immunol, 2018. 141(1): p. 411-414 e4.
38. Altschul, S. F., et al., *Basic local alignment search tool*. J Mol Biol, 1990. 215(3): p. 403-10.
39. Altschul, S. F., et al., *Gapped BLAST and PSI-BLAST: a new generation of protein database search programs*. Nucleic Acids Res, 1997. 25(17): p. 3389-402.
40. Coligan, J. E., et al., *Production of Recombinant Proteins, in Current Protocols in Protein Science*. 2016, John Wiley & Sons, Inc. p. 5.1.1-5.26.21.
41. Valenta, R. and V. Niederberger, *Recombinant allergens for immunotherapy*. J Allergy Clin Immunol, 2007. 119(4): p. 826-30.
42. Marknell DeWitt, Å., et al., *Molecular and immunological characterization of a novel timothy grass (Phleum pratense) pollen allergen, Phl p 11*. Clinical & Experimental Allergy, 2002. 32(9): p. 1329-1340.
43. Mattsson, L., et al., *Prostatic kallikrein: A new major dog allergen*. J Allergy Clin Immunol, 2009. 123(2): p. 362-8.
44. Johnson, A. D., *An extended IUPAC nomenclature code for polymorphic nucleic acids*. Bioinformatics, 2010. 26(10): p. 1386-9.
45. Madeira, F., et al., *The EMBL-EBI search and sequence analysis tools APIs in 2019*. Nucleic Acids Res, 2019. in press.
46. Kelley, L. A., et al., *The Phyre2 web portal for protein modeling, prediction and analysis*. Nature Protocols, 2015. 10(6): p. 845-58.
47. Scheurer, S., et al., *Cross-reactivity within the profilin panallergen family investigated by comparison of recombinant profilins from pear (Pyr c 4), cherry (Pru av 4) and celery (Api g 4) with birch pollen profilin Bet v 2*. J Chromatogr B Biomed Sci Appl, 2001. 756(1-2): p. 315-25.
48. Villalta, D. and R. Asero, *Sensitization to the pollen pan-allergen profilin. Is the detection of immunoglobulin E to multiple homologous proteins from different sources clinically useful?* J Investig Allergol Clin Immunol, 2010. 20(7): p. 591-5.

The invention claimed is:

1. An isolated allergenic protein comprising an amino acid sequence according to any one of SEQ ID NO's: 4, 5, 6 or 8.

2. The isolated allergenic protein of claim 1, said protein comprising an amino acid sequence according to SEQ ID NO:4.

3. The isolated allergenic protein of claim 1, said protein comprising an amino acid sequence according to SEQ ID NO:5.

4. The isolated allergenic protein of claim 1, said protein comprising an amino acid sequence according to SEQ ID NO:6.

5. The isolated allergenic protein of claim 1, said protein comprising an amino acid sequence according to SEQ ID NO:8.

6. An isolated nucleic acid molecule encoding the isolated allergenic protein of claim 1.

7. The isolated nucleic acid of claim 6, wherein said nucleic acid molecule is encoded by SEQ ID NO:10, SEQ ID NO: 50 or SEQ ID NO: 51.

8. An expression vector comprising the isolated nucleic acid molecule of claim 7.

9. An isolated host cell comprising an expression vector of claim 8.

10. A method for producing an allergen composition, said method comprising the step of adding an isolated allergenic protein of claim 1 to a composition comprising an allergen extract and/or at least one purified allergen component.

11. A method for an in vitro diagnosis or assessment of Type 1 allergy, said method comprising the steps of:
contacting an immunoglobulin-containing body fluid sample from a subject suspected of having type 1 allergy with the isolated allergenic protein of claim 1; and
in said sample, determining the presence of IgE antibodies specifically binding to said allergenic protein;

wherein the presence of antibodies in said sample specifically binding to said protein, fragment or variant is informative in relation to Type 1 allergy in said subject.

12. A kit of parts comprising an isolated allergenic protein of claim 1 immobilized to a soluble or a solid support, said kit optionally further comprising a detection reagent and/or instructions for use.

13. A pharmaceutical composition comprising the isolated allergenic protein of claim 1 and a pharmaceutically acceptable carrier and/or excipient.

14. A method for the treatment or prevention of a Type 1 allergy, said method comprising administering a pharmaceutically effective amount of the isolated allergenic protein of claim 1 to a subject in need thereof.

15. The method of claim 14, wherein said Type 1 allergy is Type 1 allergy caused by pollen of the species Cupressaceae, is a food-associated allergy and/or is associated with pollen food-associated syndrome (PFAS).

\* \* \* \* \*

SEQUENCE LISTING

```
<160> NUMBER OF SEQ ID NOS: 52

<210> SEQ ID NO 1
<211> LENGTH: 63
<212> TYPE: PRT
<213> ORGANISM: Prunus persica

<400> SEQUENCE: 1

Gly Ser Ser Phe Cys Asp Ser Lys Cys Gly Val Arg Cys Ser Lys Ala
1               5                   10                  15

Gly Tyr Gln Glu Arg Cys Leu Lys Tyr Cys Gly Ile Cys Cys Glu Lys
            20                  25                  30

Cys His Cys Val Pro Ser Gly Thr Tyr Gly Asn Lys Asp Glu Cys Pro
        35                  40                  45

Cys Tyr Arg Asp Leu Lys Asn Ser Lys Gly Asn Pro Lys Cys Pro
    50                  55                  60

<210> SEQ ID NO 2
<211> LENGTH: 524
<212> TYPE: DNA
<213> ORGANISM: Cryptomeria japonica

<400> SEQUENCE: 2
gccagttgta tgttttcaat tttgaagttg aagcatagtt tggatgccaa tggactgctt      60
tcaccctcgt tatcccatct ttgtattcct caccctgctg atcatagtgc aggcttggaa    120
agtatccaca catgcagtcg aggatgatgt gaagtatgta gagcctcaga ttgatgtggg    180
tgaaaacagt tatagaggag tgaaggctca gatcgactgt gataaggagt gcaagaggag    240
atgctccaag gcttcattgc atgataggtg tctcaagtac tgtggaatat gctgtgagaa    300
atgaaactgt gttccaccgg gtacatctgg caacgaagat gtgtgcccTT gctatgccaa    360
tttgaaaaac tctaagggtg gacacaaatg cccttagcac atactcatac gcatataata    420
atccccattg cttcctcaga ataatggatt atgtgttatg ttacaaagaa atgctataat    480
``` cccccattctt tccttgagaa tggattatat actattgaat ttat 524

<210> SEQ ID NO 3
<211> LENGTH: 524
<212> TYPE: DNA
<213> ORGANISM: Cryptomeria japonica

<400> SEQUENCE: 3
gccagttgta tgttttcaat tttgaagttg aagcatagtt tggatgccaa tggactgctt    60
tcaccctcgt tatcccatct ttgtattcct caccctgctg atcatagtgc aggcttggaa   120
agtatccaca catgcagtcg aggatgatgt gaagtatgta gagcctcaga ttgatgtggg   180
tgaaaacagt tatagaggag tgaaggctca gatcgactgt gataaggagt gcaagaggag   240
atgctccaag gcttcattgc atgataggtg tctcaagtac tgtggaatat gctgtgagaa   300
atgyaactgt gttccaccgg gtacatctgg caacgaagat gtgtgccctt gctatgccaa   360
tttgaaaaac tctaagggtg acacaaatg cccttagcac atactcatac gcatataata   420
atccccattg cttcctcaga ataatggatt atgtgttatg ttacaaagaa atgctataat   480
ccccattctt ccttgagaa tggattatat actattgaat ttat                    524

<210> SEQ ID NO 4
<211> LENGTH: 63
<212> TYPE: PRT
<213> ORGANISM: Cupressus sempervirens

<400> SEQUENCE: 4

Ala Gln Ile Asp Cys Asp Lys Glu Cys Asn Arg Arg Cys Ser Lys Ala
1               5                   10                  15

Ser Ala His Asp Arg Cys Leu Lys Tyr Cys Gly Ile Cys Cys Glu Lys
            20                  25                  30

Cys His Cys Val Pro Pro Gly Thr Ala Gly Asn Glu Asp Val Cys Pro
        35                  40                  45

Cys Tyr Ala Asn Leu Lys Asn Ser Lys Gly Gly His Lys Cys Pro
    50                  55                  60

<210> SEQ ID NO 5
<211> LENGTH: 63
<212> TYPE: PRT
<213> ORGANISM: Cupressus sempervirens

<400> SEQUENCE: 5

Ala Gln Ile Asp Cys Asp Lys Glu Cys Asn Arg Arg Cys Ser Lys Ala
1               5                   10                  15

Ser Leu His Asp Arg Cys Leu Lys Tyr Cys Gly Ile Cys Cys Glu Lys
            20                  25                  30

Cys His Cys Val Pro Pro Gly Thr Ala Gly Asn Glu Asp Val Cys Pro
        35                  40                  45

Cys Tyr Ala His Leu Lys Asn Ser Lys Gly Gly His Lys Cys Pro
    50                  55                  60

<210> SEQ ID NO 6
<211> LENGTH: 63
<212> TYPE: PRT
<213> ORGANISM: Juniperus ashei

<400> SEQUENCE: 6

Ala Gln Ile Asp Cys Asp Lys Glu Cys Asn Arg Arg Cys Ser Lys Ala
1               5                   10                  15

```
Ser Ala His Asp Arg Cys Leu Lys Tyr Cys Gly Ile Cys Cys Lys Lys
            20                  25                  30

Cys His Cys Val Pro Pro Gly Thr Ala Gly Asn Glu Asp Val Cys Pro
            35                  40                  45

Cys Tyr Ala Asn Leu Lys Asn Ser Lys Gly Gly His Lys Cys Pro
        50                  55                  60

<210> SEQ ID NO 7
<211> LENGTH: 516
<212> TYPE: DNA
<213> ORGANISM: Cryptomeria japonica

<400> SEQUENCE: 7
gaagcataat ttggatgcca atggcctgct tcacccctca ttcttccatg tttgtattcc      60
tcaccctact gctcatagtg caggcttgga agtatccac acatgtagtt gaggatgatg     120
tgaagtatgt agagctgcag actgctgtgg gtgacaaaag ttacggaggg gtgaaagctc    180
acattgactg tgataaggaa tgcaatagga gatgctccaa ggcatcagct catgataggt    240
gtctcaagta ttgtggaata tgttgtgaga aatgtaactg cgttccacct ggtacatatg    300
gcaacgaaga ttcttgccct tgctatgcca atttgaagaa ctccaagggt ggacacaaat    360
gcccttagca cattgtcata ctgatactat aatgcccatt gcttgggcaa aataatggat    420
tatgtttcta gatagcaatg ctataatccc cattctttcc agagaatgg atgatatgtt     480 attgaattta tcatgaatct aaattataat tttatt                              516

<210> SEQ ID NO 8
<211> LENGTH: 63
<212> TYPE: PRT
<213> ORGANISM: Cryptomeria japonica

<400> SEQUENCE: 8

Ala His Ile Asp Cys Asp Lys Glu Cys Asn Arg Arg Cys Ser Lys Ala
1               5                   10                  15

Ser Ala His Asp Arg Cys Leu Lys Tyr Cys Gly Ile Cys Cys Glu Lys
            20                  25                  30

Cys Asn Cys Val Pro Pro Gly Thr Tyr Gly Asn Glu Asp Ser Cys Pro
            35                  40                  45

Cys Tyr Ala Asn Leu Lys Asn Ser Lys Gly Gly His Lys Cys Pro
        50                  55                  60

<210> SEQ ID NO 9
<211> LENGTH: 63
<212> TYPE: PRT
<213> ORGANISM: Unknown
<220> FEATURE:
<223> OTHER INFORMATION: Cupressaceae-based
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: misc_feature
<222> LOCATION: (18)..(18)
<223> OTHER INFORMATION: Xaa can be any naturally occurring amino acid
<220> FEATURE:
<221> NAME/KEY: misc_feature
<222> LOCATION: (31)..(31)
<223> OTHER INFORMATION: Xaa can be any naturally occurring amino acid
<220> FEATURE:
<221> NAME/KEY: misc_feature
<222> LOCATION: (34)..(34)
<223> OTHER INFORMATION: Xaa can be any naturally occurring amino acid
```

```
<220> FEATURE:
<221> NAME/KEY: misc_feature
<222> LOCATION: (41)..(41)
<223> OTHER INFORMATION: Xaa can be any naturally occurring amino acid
<220> FEATURE:
<221> NAME/KEY: misc_feature
<222> LOCATION: (46)..(46)
<223> OTHER INFORMATION: Xaa can be any naturally occurring amino acid
<220> FEATURE:
<221> NAME/KEY: misc_feature
<222> LOCATION: (52)..(52)
<223> OTHER INFORMATION: Xaa can be any naturally occurring amino acid

<400> SEQUENCE: 9

Ala Xaa Ile Asp Cys Asp Lys Glu Cys Asn Arg Arg Cys Ser Lys Ala
1               5                   10                  15

Ser Xaa His Asp Arg Cys Leu Lys Tyr Cys Gly Ile Cys Cys Xaa Lys
            20                  25                  30

Cys Xaa Cys Val Pro Pro Gly Thr Xaa Gly Asn Glu Asp Xaa Cys Pro
        35                  40                  45

Cys Tyr Ala Xaa Leu Lys Asn Ser Lys Gly Gly His Lys Cys Pro
    50                  55                  60

<210> SEQ ID NO 10
<211> LENGTH: 189
<212> TYPE: DNA
<213> ORGANISM: Cupressus sempervirens
<220> FEATURE:
<221> NAME/KEY: misc_feature
<222> LOCATION: (3)..(3)
<223> OTHER INFORMATION: n is a, c, g, or t
<220> FEATURE:
<221> NAME/KEY: misc_feature
<222> LOCATION: (6)..(6)
<223> OTHER INFORMATION: n is a, c, g, or t
<220> FEATURE:
<221> NAME/KEY: misc_feature
<222> LOCATION: (33)..(33)
<223> OTHER INFORMATION: n is a, c, g, or t
<220> FEATURE:
<221> NAME/KEY: misc_feature
<222> LOCATION: (36)..(36)
<223> OTHER INFORMATION: n is a, c, g, or t
<220> FEATURE:
<221> NAME/KEY: misc_feature
<222> LOCATION: (42)..(42)
<223> OTHER INFORMATION: n is a, c, g, or t
<220> FEATURE:
<221> NAME/KEY: misc_feature
<222> LOCATION: (48)..(48)
<223> OTHER INFORMATION: n is a, c, g, or t
<220> FEATURE:
<221> NAME/KEY: misc_feature
<222> LOCATION: (51)..(51)
<223> OTHER INFORMATION: n is a, c, g, or t
<220> FEATURE:
<221> NAME/KEY: misc_feature
<222> LOCATION: (54)..(54)
<223> OTHER INFORMATION: n is a, c, g, or t
<220> FEATURE:
<221> NAME/KEY: misc_feature
<222> LOCATION: (63)..(63)
<223> OTHER INFORMATION: n is a, c, g, or t
<220> FEATURE:
<221> NAME/KEY: misc_feature
<222> LOCATION: (69)..(69)
<223> OTHER INFORMATION: n is a, c, g, or t
<220> FEATURE:
<221> NAME/KEY: misc_feature
<222> LOCATION: (81)..(81)
<223> OTHER INFORMATION: n is a, c, g, or t
<220> FEATURE:
<221> NAME/KEY: misc_feature
<222> LOCATION: (108)..(108)
```

```
<223> OTHER INFORMATION: n is a, c, g, or t
<220> FEATURE:
<221> NAME/KEY: misc_feature
<222> LOCATION: (111)..(111)
<223> OTHER INFORMATION: n is a, c, g, or t
<220> FEATURE:
<221> NAME/KEY: misc_feature
<222> LOCATION: (114)..(114)
<223> OTHER INFORMATION: n is a, c, g, or t
<220> FEATURE:
<221> NAME/KEY: misc_feature
<222> LOCATION: (117)..(117)
<223> OTHER INFORMATION: n is a, c, g, or t
<220> FEATURE:
<221> NAME/KEY: misc_feature
<222> LOCATION: (120)..(120)
<223> OTHER INFORMATION: n is a, c, g, or t
<220> FEATURE:
<221> NAME/KEY: misc_feature
<222> LOCATION: (123)..(123)
<223> OTHER INFORMATION: n is a, c, g, or t
<220> FEATURE:
<221> NAME/KEY: misc_feature
<222> LOCATION: (126)..(126)
<223> OTHER INFORMATION: n is a, c, g, or t
<220> FEATURE:
<221> NAME/KEY: misc_feature
<222> LOCATION: (138)..(138)
<223> OTHER INFORMATION: n is a, c, g, or t
<220> FEATURE:
<221> NAME/KEY: misc_feature
<222> LOCATION: (144)..(144)
<223> OTHER INFORMATION: n is a, c, g, or t
<220> FEATURE:
<221> NAME/KEY: misc_feature
<222> LOCATION: (153)..(153)
<223> OTHER INFORMATION: n is a, c, g, or t
<220> FEATURE:
<221> NAME/KEY: misc_feature
<222> LOCATION: (159)..(159)
<223> OTHER INFORMATION: n is a, c, g, or t
<220> FEATURE:
<221> NAME/KEY: misc_feature
<222> LOCATION: (168)..(168)
<223> OTHER INFORMATION: n is a, c, g, or t
<220> FEATURE:
<221> NAME/KEY: misc_feature
<222> LOCATION: (174)..(174)
<223> OTHER INFORMATION: n is a, c, g, or t
<220> FEATURE:
<221> NAME/KEY: misc_feature
<222> LOCATION: (177)..(177)
<223> OTHER INFORMATION: n is a, c, g, or t
<220> FEATURE:
<221> NAME/KEY: misc_feature
<222> LOCATION: (189)..(189)
<223> OTHER INFORMATION: n is a, c, g, or t

<400> SEQUENCE: 10
gcncanathg aytgygayaa rgartgyaay mgnmgntgyw snaargcnws nbyncaygay      60
mgntgyytna artaytgygg nathtgytgy raraartgym aytgygtncc nccnggnacn

<210> SEQ ID NO 12
<211> LENGTH: 21
<212> TYPE: PRT
<213> ORGANISM: Cupressus sempervirens

<400> SEQUENCE: 12

Ala Gln Ile Asp Cys Asp Lys Glu Cys Asn Arg Arg Cys Ser Lys Ala
1               5                   10                  15

Ser Ala His Asp Arg
            20

<210> SEQ ID NO 13
<211> LENGTH: 25
<212> TYPE: PRT
<213> ORGANISM: Cupressus sempervirens

<400> SEQUENCE: 13

Ala Gln Ile Asp Cys Asp Lys Glu Cys Asn Arg Arg Cys Ser Lys Ala
1               5                   10                  15

Ser Ala His Asp Arg Cys Leu Lys Tyr
            20                  25

<210> SEQ ID NO 14
<211> LENGTH: 17
<212> TYPE: PRT
<213> ORGANISM: Cupressus sempervirens

<400> SEQUENCE: 14

Ala Ser Ala His Asp Arg Cys Leu Lys Tyr Cys Gly Ile Cys Cys Glu
1               5                   10                  15

Lys

<210> SEQ ID NO 15
<211> LENGTH: 17
<212> TYPE: PRT
<213> ORGANISM: Cupressus sempervirens

<400> SEQUENCE: 15

Ser Ala His Asp Arg Cys Leu Lys Tyr Cys Gly Ile Cys Cys Glu Lys
1               5                   10                  15

Cys

<210> SEQ ID NO 16
<211> LENGTH: 28
<212> TYPE: PRT
<213> ORGANISM: Cupressus sempervirens

<400> SEQUENCE: 16

Cys Gly Ile Cys Cys Glu Lys Cys His Cys Val Pro Pro Gly Thr Ala
1               5                   10                  15

Gly Asn Glu Asp Val Cys Pro Cys Tyr Ala Asn Leu
            20                  25

<210> SEQ ID NO 17
<211> LENGTH: 38
<212> TYPE: PRT
<213> ORGANISM: Cupressus sempervirens

<400> SEQUENCE: 17

Cys Gly Ile Cys Cys Glu Lys Cys His Cys Val Pro Pro Gly Thr Ala
1               5                   10                  15

-continued

Gly Asn Glu Asp Val Cys Pro Cys Tyr Ala Asn Leu Lys Asn Ser Lys
                20                  25                  30

Gly Gly His Lys Cys Pro
        35

<210> SEQ ID NO 18
<211> LENGTH: 30
<212> TYPE: PRT
<213> ORGANISM: Cupressus sempervirens

<400> SEQUENCE: 18

His Cys Val Pro Pro Gly Thr Ala Gly Asn Glu Asp Val Cys Pro Cys
1               5                   10                  15

Tyr Ala Asn Leu Lys Asn Ser Lys Gly Gly His Lys Cys Pro
                20                  25                  30

<210> SEQ ID NO 19
<211> LENGTH: 29
<212> TYPE: PRT
<213> ORGANISM: Cupressus sempervirens

<400> SEQUENCE: 19

Cys Val Pro Pro Gly Thr Ala Gly Asn Glu Asp Val Cys Pro Cys Tyr
1               5                   10                  15

Ala Asn Leu Lys Asn Ser Lys Gly Gly His Lys Cys Pro
                20                  25

<210> SEQ ID NO 20
<211> LENGTH: 19
<212> TYPE: PRT
<213> ORGANISM: Cupressus sempervirens

<400> SEQUENCE: 20

Asp Val Cys Pro Cys Tyr Ala Asn Leu Lys Asn Ser Lys Gly Gly His
1               5                   10                  15

Lys Cys Pro

<210> SEQ ID NO 21
<211> LENGTH: 18
<212> TYPE: PRT
<213> ORGANISM: Cupressus sempervirens

<400> SEQUENCE: 21

Ser Lys Ala Ser Leu His Asp Arg Cys Leu Lys Tyr Cys Gly Ile Cys
1               5                   10                  15

Cys Glu

<210> SEQ ID NO 22
<211> LENGTH: 18
<212> TYPE: PRT
<213> ORGANISM: Cupressus sempervirens

<400> SEQUENCE: 22

Ser Lys Ala Ser Leu His Asp Arg Cys Leu Lys Tyr Cys Gly Ile Cys
1               5                   10                  15

Cys Glu

<210> SEQ ID NO 23
<211> LENGTH: 11
<212> TYPE: PRT
<213> ORGANISM: Cupressus sempervirens

```
<400> SEQUENCE: 23

Lys Ala Ser Leu His Asp Arg Cys Leu Lys Tyr
1               5                   10

<210> SEQ ID NO 24
<211> LENGTH: 22
<212> TYPE: PRT
<213> ORGANISM: Cupressus sempervirens

<400> SEQUENCE: 24

Cys His Cys Val Pro Pro Gly Thr Ala Gly Asn Glu Asp Val Cys Pro
1               5                   10                  15

Cys Tyr Ala His Leu Lys
            20

<210> SEQ ID NO 25
<211> LENGTH: 10
<212> TYPE: PRT
<213> ORGANISM: Cupressus sempervirens

<400> SEQUENCE: 25

Asp Val Cys Pro Cys Tyr Ala His Leu Lys
1               5                   10

<210> SEQ ID NO 26
<211> LENGTH: 29
<212> TYPE: PRT
<213> ORGANISM: Cupressus sempervirens

<400> SEQUENCE: 26

Cys Val Pro Pro Gly Thr Ala Gly Asn Glu Asp Val Cys Pro Cys Tyr
1               5                   10                  15

Ala His Leu Lys Asn Ser Lys Gly Gly His Lys Cys Pro
            20                  25

<210> SEQ ID NO 27
<211> LENGTH: 12
<212> TYPE: PRT
<213> ORGANISM: Juniperus ashei

<400> SEQUENCE: 27

Ala Gln Ile Asp Cys Asp Lys Glu Cys Asn Arg Arg
1               5                   10

<210> SEQ ID NO 28
<211> LENGTH: 25
<212> TYPE: PRT
<213> ORGANISM: Juniperus ashei

<400> SEQUENCE: 28

Ala Gln Ile Asp Cys Asp Lys Glu Cys Asn Arg Arg Cys Ser Lys Ala
1               5                   10                  15

Ser Ala His Asp Arg Cys Leu Lys Tyr
            20                  25

<210> SEQ ID NO 29
<211> LENGTH: 9
<212> TYPE: PRT
<213> ORGANISM: Juniperus ashei

<400> SEQUENCE: 29

Ser Ala His Asp Arg Cys Leu Lys Tyr
1               5
```

<210> SEQ ID NO 30
<211> LENGTH: 8
<212> TYPE: PRT
<213> ORGANISM: Juniperus ashei

<400> SEQUENCE: 30

Tyr Cys Gly Leu Cys Cys Lys Lys
1               5

<210> SEQ ID NO 31
<211> LENGTH: 13
<212> TYPE: PRT
<213> ORGANISM: Juniperus ashei

<400> SEQUENCE: 31

Cys Gly Leu Cys Cys Lys Lys Cys His Cys Val Pro Pro
1               5                   10

<210> SEQ ID NO 32
<211> LENGTH: 23
<212> TYPE: PRT
<213> ORGANISM: Juniperus ashei

<400> SEQUENCE: 32

Lys Cys His Cys Val Pro Pro Gly Thr Ala Gly Asn Glu Asp Val Cys
1               5                   10                  15

Pro Cys Tyr Ala Asn Leu Lys
            20

<210> SEQ ID NO 33
<211> LENGTH: 12
<212> TYPE: PRT
<213> ORGANISM: Juniperus ashei

<400> SEQUENCE: 33

Cys His Cys Val Pro Pro Gly Thr Ala Gly Asn Glu
1               5                   10

<210> SEQ ID NO 34
<211> LENGTH: 13
<212> TYPE: PRT
<213> ORGANISM: Juniperus ashei

<400> SEQUENCE: 34

Gly Asn Glu Asp Val Cys Pro Cys Tyr Ala Asn Leu Lys
1               5                   10

<210> SEQ ID NO 35
<211> LENGTH: 19
<212> TYPE: PRT
<213> ORGANISM: Juniperus ashei

<400> SEQUENCE: 35

Asp Val Cys Pro Cys Tyr Ala Asn Leu Lys Asn Ser Lys Gly Gly His
1               5                   10                  15

Lys Cys Pro

<210> SEQ ID NO 36
<211> LENGTH: 13
<212> TYPE: PRT
<213> ORGANISM: Juniperus ashei

<400> SEQUENCE: 36

```
Ala Asn Leu Lys Asn Ser Lys Gly Gly His Lys Cys Pro
1               5                   10

<210> SEQ ID NO 37
<211> LENGTH: 11
<212> TYPE: PRT
<213> ORGANISM: Cryptomeria japonica

<400> SEQUENCE: 37

Ala His Ile Asp Cys Asp Lys Glu Cys Asn Arg
1               5                   10

<210> SEQ ID NO 38
<211> LENGTH: 25
<212> TYPE: PRT
<213> ORGANISM: Cryptomeria japonica

<400> SEQUENCE: 38

Ala His Ile Asp Cys Asp Lys Glu Cys Asn Arg Arg Cys Ser Lys Ala
1               5                   10                  15

Ser Ala His Asp Arg Cys Leu Lys Tyr
            20                  25

<210> SEQ ID NO 39
<211> LENGTH: 8
<212> TYPE: PRT
<213> ORGANISM: Cryptomeria japonica

<400> SEQUENCE: 39

Glu Cys Asn Arg Arg Cys Ser Lys
1               5

<210> SEQ ID NO 40
<211> LENGTH: 9
<212> TYPE: PRT
<213> ORGANISM: Cryptomeria japonica

<400> SEQUENCE: 40

Ala Ser Ala His Asp Arg Cys Leu Lys
1               5

<210> SEQ ID NO 41
<211> LENGTH: 8
<212> TYPE: PRT
<213> ORGANISM: Cryptomeria japonica

<400> SEQUENCE: 41

Tyr Cys Gly Ile Cys Cys Glu Lys
1               5

<210> SEQ ID NO 42
<211> LENGTH: 13
<212> TYPE: PRT
<213> ORGANISM: Cryptomeria japonica

<400> SEQUENCE: 42

Cys Gly Ile Cys Cys Glu Lys Cys Asn Cys Val Pro Pro
1               5                   10

<210> SEQ ID NO 43
<211> LENGTH: 10
<212> TYPE: PRT
<213> ORGANISM: Cryptomeria japonica
```

```
<400> SEQUENCE: 43

Cys Asn Cys Val Pro Pro Gly Thr Tyr Gly
1               5                   10

<210> SEQ ID NO 44
<211> LENGTH: 21
<212> TYPE: PRT
<213> ORGANISM: Cryptomeria japonica

<400> SEQUENCE: 44

Cys Asn Cys Val Pro Pro Gly Thr Tyr Gly Asn Glu Asp Ser Cys Pro
1               5                   10                  15

Cys Tyr Ala Asn Leu
            20

<210> SEQ ID NO 45
<211> LENGTH: 12
<212> TYPE: PRT
<213> ORGANISM: Cryptomeria japonica

<400> SEQUENCE: 45

Gly Asn Glu Asp Ser Cys Pro Cys Tyr Ala Asn Leu
1               5                   10

<210> SEQ ID NO 46
<211> LENGTH: 13
<212> TYPE: PRT
<213> ORGANISM: Cryptomeria japonica

<400> SEQUENCE: 46

Gly Asn Glu Asp Ser Cys Pro Cys Tyr Ala Asn Leu Lys
1               5                   10

<210> SEQ ID NO 47
<211> LENGTH: 22
<212> TYPE: PRT
<213> ORGANISM: Cryptomeria japonica

<400> SEQUENCE: 47

Gly Asn Glu Asp Ser Cys Pro Cys Tyr Ala Asn Leu Lys Asn Ser Lys
1               5                   10                  15

Gly Gly His Lys Cys Pro
            20

<210> SEQ ID NO 48
<211> LENGTH: 10
<212> TYPE: PRT
<213> ORGANISM: Cryptomeria japonica

<400> SEQUENCE: 48

Asp Ser Cys Pro Cys Tyr Ala Asn Leu Lys
1               5                   10

<210> SEQ ID NO 49
<211> LENGTH: 13
<212> TYPE: PRT
<213> ORGANISM: Cryptomeria japonica

<400> SEQUENCE: 49

Ala Asn Leu Lys Asn Ser Lys Gly Gly His Lys Cys Pro
1               5                   10

<210> SEQ ID NO 50
```

```
<211> LENGTH: 189
<212> TYPE: DNA
<213> ORGANISM: Cupressus sempervirens
<220> FEATURE:
<221> NAME/KEY: misc_feature
<222> LOCATION: (3)..(3)
<223> OTHER INFORMATION: n is a, c, g, or t
<220> FEATURE:
<221> NAME/KEY: misc_feature
<222> LOCATION: (33)..(33)
<223> OTHER INFORMATION: n is a, c, g, or t
<220> FEATURE:
<221> NAME/KEY: misc_feature
<222> LOCATION: (36)..(36)
<223> OTHER INFORMATION: n is a, c, g, or t
<220> FEATURE:
<221> NAME/KEY: misc_feature
<222> LOCATION: (42)..(42)
<223> OTHER INFORMATION: n is a, c, g, or t
<220> FEATURE:
<221> NAME/KEY: misc_feature
<222> LOCATION: (48)..(48)
<223> OTHER INFORMATION: n is a, c, g, or t
<220> FEATURE:
<221> NAME/KEY: misc_feature
<222> LOCATION: (51)..(51)
<223> OTHER INFORMATION: n is a, c, g, or t
<220> FEATURE:
<221> NAME/KEY: misc_feature
<222> LOCATION: (54)..(54)
<223> OTHER INFORMATION: n is a, c, g, or t
<220> FEATURE:
<221> NAME/KEY: misc_feature
<222> LOCATION: (63)..(63)
<223> OTHER INFORMATION: n is a, c, g, or t
<220> FEATURE:
<221> NAME/KEY: misc_feature
<222> LOCATION: (69)..(69)
<223> OTHER INFORMATION: n is a, c, g, or t
<220> FEATURE:
<221> NAME/KEY: misc_feature
<222> LOCATION: (81)..(81)
<223> OTHER INFORMATION: n is a, c, g, or t
<220> FEATURE:
<221> NAME/KEY: misc_feature
<222> LOCATION: (108)..(108)
<223> OTHER INFORMATION: n is a, c, g, or t
<220> FEATURE:
<221> NAME/KEY: misc_feature
<222> LOCATION: (111)..(111)
<223> OTHER INFORMATION: n is a, c, g, or t
<220> FEATURE:
<221> NAME/KEY: misc_feature
<222> LOCATION: (114)..(114)
<223> OTHER INFORMATION: n is a, c, g, or t
<220> FEATURE:
<221> NAME/KEY: misc_feature
<222> LOCATION: (117)..(117)
<223> OTHER INFORMATION: n is a, c, g, or t
<220> FEATURE:
<221> NAME/KEY: misc_feature
<222> LOCATION: (120)..(120)
<223> OTHER INFORMATION: n is a, c, g, or t
<220> FEATURE:
<221> NAME/KEY: misc_feature
<222> LOCATION: (123)..(123)
<223> OTHER INFORMATION: n is a, c, g, or t
<220> FEATURE:
<221> NAME/KEY: misc_feature
<222> LOCATION: (126)..(126)
<223> OTHER INFORMATION: n is a, c, g, or t
<220> FEATURE:
<221> NAME/KEY: misc_feature
<222> LOCATION: (138)..(138)
<223> OTHER INFORMATION: n is a, c, g, or t
<220> FEATURE:
<221> NAME/KEY: misc_feature
<222> LOCATION: (144)..(144)
<223> OTHER INFORMATION: n is a, c, g, or t
```

```
<220> FEATURE:
<221> NAME/KEY: misc_feature
<222> LOCATION: (153)..(153)
<223> OTHER INFORMATION: n is a, c, g, or t
<220> FEATURE:
<221> NAME/KEY: misc_feature
<222> LOCATION: (159)..(159)
<223> OTHER INFORMATION: n is a, c, g, or t
<220> FEATURE:
<221> NAME/KEY: misc_feature
<222> LOCATION: (168)..(168)
<223> OTHER INFORMATION: n is a, c, g, or t
<220> FEATURE:
<221> NAME/KEY: misc_feature
<222> LOCATION: (174)..(174)
<223> OTHER INFORMATION: n is a, c, g, or t
<220> FEATURE:
<221> NAME/KEY: misc_feature
<222> LOCATION: (177)..(177)
<223> OTHER INFORMATION: n is a, c, g, or t
<220> FEATURE:
<221> NAME/KEY: misc_feature
<222> LOCATION: (189)..(189)
<223> OTHER INFORMATION: n is a, c, g, or t

<400> SEQUENCE: 50 gncarathg aytgygayaa rgartgyaay mgnmgntgyw snaargcnws ngcncaygay      60
mgntgyytna artaytgygg nathtgytgy garaartgyc aytgygtncc nccnggnacn    120
gcnggnaayg argaygtntg yccntgytay gcnaayytna araaywsnaa rggnggncay    180 aartgyccn                                                           189

<210> SEQ ID NO 51
<211> LENGTH: 189
<212> TYPE: DNA
<213> ORGANISM: Cupressus sempervirens
<220> FEATURE:
<221> NAME/KEY: misc_feature
<222> LOCATION: (3)..(3)
<223> OTHER INFORMATION: n is a, c, g, or t
<220> FEATURE:
<221> NAME/KEY: misc_feature
<222> LOCATION: (33)..(33)
<223> OTHER INFORMATION: n is a, c, g, or t
<220> FEATURE:
<221> NAME/KEY: misc_feature
<222> LOCATION: (36)..(36)
<223> OTHER INFORMATION: n is a, c, g, or t
<220> FEATURE:
<221> NAME/KEY: misc_feature
<222> LOCATION: (42)..(42)
<223> OTHER INFORMATION: n is a, c, g, or t
<220> FEATURE:
<221> NAME/KEY: misc_feature
<222> LOCATION: (48)..(48)
<223> OTHER INFORMATION: n is a, c, g, or t
<220> FEATURE:
<221> NAME/KEY: misc_feature
<222> LOCATION: (51)..(51)
<223> OTHER INFORMATION: n is a, c, g, or t
<220> FEATURE:
<221> NAME/KEY: misc_feature
<222> LOCATION: (54)..(54)
<223> OTHER INFORMATION: n is a, c, g, or t
<220> FEATURE:
<221> NAME/KEY: misc_feature
<222> LOCATION: (63)..(63)
<223> OTHER INFORMATION: n is a, c, g, or t
<220> FEATURE:
<221> NAME/KEY: misc_feature
<222> LOCATION: (69)..(69)
<223> OTHER INFORMATION: n is a, c, g, or t
<220> FEATURE:
<221> NAME/KEY: misc_feature
<222> LOCATION: (81)..(81)
```

```
<223> OTHER INFORMATION: n is a, c, g, or t
<220> FEATURE:
<221> NAME/KEY: misc_feature
<222> LOCATION: (108)..(108)
<223> OTHER INFORMATION: n is a, c, g, or t
<220> FEATURE:
<221> NAME/KEY: misc_feature
<222> LOCATION: (111)..(111)
<223> OTHER INFORMATION: n is a, c, g, or t
<220> FEATURE:
<221> NAME/KEY: misc_feature
<222> LOCATION: (114)..(114)
<223> OTHER INFORMATION: n is a, c, g, or t
<220> FEATURE:
<221> NAME/KEY: misc_feature
<222> LOCATION: (117)..(117)
<223> OTHER INFORMATION: n is a, c, g, or t
<220> FEATURE:
<221> NAME/KEY: misc_feature
<222> LOCATION: (120)..(120)
<223> OTHER INFORMATION: n is a, c, g, or t
<220> FEATURE:
<221> NAME/KEY: misc_feature
<222> LOCATION: (126)..(126)
<223> OTHER INFORMATION: n is a, c, g, or t
<220> FEATURE:
<221> NAME/KEY: misc_feature
<222> LOCATION: (138)..(138)
<223> OTHER INFORMATION: n is a, c, g, or t
<220> FEATURE:
<221> NAME/KEY: misc_feature
<222> LOCATION: (144)..(144)
<223> OTHER INFORMATION: n is a, c, g, or t
<220> FEATURE:
<221> NAME/KEY: misc_feature
<222> LOCATION: (153)..(153)
<223> OTHER INFORMATION: n is a, c, g, or t
<220> FEATURE:
<221> NAME/KEY: misc_feature
<222> LOCATION: (159)..(159)
<223> OTHER INFORMATION: n is a, c, g, or t
<220> FEATURE:
<221> NAME/KEY: misc_feature
<222> LOCATION: (168)..(168)
<223> OTHER INFORMATION: n is a, c, g, or t
<220> FEATURE:
<221> NAME/KEY: misc_feature
<222> LOCATION: (174)..(174)
<223> OTHER INFORMATION: n is a, c, g, or t
<220> FEATURE:
<221> NAME/KEY: misc_feature
<222> LOCATION: (177)..(177)
<223> OTHER INFORMATION: n is a, c, g, or t
<220> FEATURE:
<221> NAME/KEY: misc_feature
<222> LOCATION: (189)..(189)
<223> OTHER INFORMATION: n is a, c, g, or t

<400> SEQUENCE: 51
gcncayathg aytgygayaa rgartgyaay mgnmgntgyw snaargcnws nytncaygay      60
mgntgyytna artaytgygg nathtgytgy aaraartgya aytgygtncc nccnggnacn     120
tayggnaayg argaywsntg yccntgytay gcncayytna araaywsnaa rggnggncay    180 aartgyccn                                                             189

<210> SEQ ID NO 52
<211> LENGTH: 63
<212> TYPE: PRT
<213> ORGANISM: Unknown
<220> FEATURE:
<223> OTHER INFORMATION: Cupressaceae-based
<220> FEATURE:
<221> NAME/KEY: misc_feature
<222> LOCATION: (1)..(4)
<223> OTHER INFORMATION: Xaa can be any naturally occurring amino acid
```

```
<220> FEATURE:
<221> NAME/KEY: misc_feature
<222> LOCATION: (7)..(8)
<223> OTHER INFORMATION: Xaa can be any naturally occurring amino acid
<220> FEATURE:
<221> NAME/KEY: misc_feature
<222> LOCATION: (10)..(11)
<223> OTHER INFORMATION: Xaa can be any naturally occurring amino acid
<220> FEATURE:
<221> NAME/KEY: misc_feature
<222> LOCATION: (17)..(20)
<223> OTHER INFORMATION: Xaa can be any naturally occurring amino acid
<220> FEATURE:
<221> NAME/KEY: misc_feature
<222> LOCATION: (31)..(31)
<223> OTHER INFORMATION: Xaa can be any naturally occurring amino acid
<220> FEATURE:
<221> NAME/KEY: misc_feature
<222> LOCATION: (34)..(34)
<223> OTHER INFORMATION: Xaa can be any naturally occurring amino acid
<220> FEATURE:
<221> NAME/KEY: misc_feature
<222> LOCATION: (41)..(41)
<223> OTHER INFORMATION: Xaa can be any naturally occurring amino acid
<220> FEATURE:
<221> NAME/KEY: misc_feature
<222> LOCATION: (44)..(44)
<223> OTHER INFORMATION: Xaa can be any naturally occurring amino acid
<220> FEATURE:
<221> NAME/KEY: misc_feature
<222> LOCATION: (46)..(46)
<223> OTHER INFORMATION: Xaa can be any naturally occurring amino acid
<220> FEATURE:
<221> NAME/KEY: misc_feature
<222> LOCATION: (51)..(52)
<223> OTHER INFORMATION: Xaa can be any naturally occurring amino acid
<220> FEATURE:
<221> NAME/KEY: misc_feature
<222> LOCATION: (59)..(60)
<223> OTHER INFORMATION: Xaa can be any naturally occurring amino acid

<400> SEQUENCE: 52

Xaa Xaa Xaa Xaa Cys Asp Xaa Xaa Cys Xaa Xaa Arg Cys Ser Lys Ala
1               5                   10                  15

Xaa Xaa Xaa Xaa Arg Cys Leu Lys Tyr Cys Gly Ile Cys Cys Xaa Lys
                20                  25                  30

Cys Xaa Cys Val Pro Pro Gly Thr Xaa Gly Asn Xaa Asp Xaa Cys Pro
        35                  40                  45

Cys Tyr Xaa Xaa Leu Lys Asn Ser Lys Gly Xaa Xaa Lys Cys Pro
    50                  55                  60
```